United States Patent [19]

Chen

[11] 4,304,769

[45] Dec. 8, 1981

[54] PROCESS FOR ACHIEVING UNIFORM, EFFICIENT DISTRIBUTION OF HYDROPHOBIC MATERIALS THROUGH HYDROPHILIC COLLOID LAYERS AND LOADED LATEX COMPOSITIONS

[75] Inventor: Tsang J. Chen, Rochester, N.Y.

[73] Assignee: Eastman Kodak Company, Rochester, N.Y.

[21] Appl. No.: 882,282

[22] Filed: Feb. 27, 1978

Related U.S. Application Data

[60] Division of Ser. No. 778,184, Mar. 16, 1977, abandoned, which is a continuation-in-part of Ser. No. 653,816, Jan. 30, 1976, abandoned, which is a continuation-in-part of Ser. No. 575,689, May 5, 1975, abandoned, which is a continuation-in-part of Ser. No. 506,919, Sep. 17, 1974, abandoned, said Ser. No. 778,184, is a continuation-in-part of Ser. No. 744,182, Nov. 24, 1976, abandoned, which is a continuation-in-part of Ser. No. 653,816, , abandoned.

[51] Int. Cl.[3] .................. A01N 25/22; A01N 57/00

[52] U.S. Cl. .................. 424/218; 424/78; 424/81; 424/174; 424/83

[58] Field of Search .................. 424/78, 81, 83, 174, 424/268; 260/29.6 MP, 29.6 MQ

[56] References Cited

U.S. PATENT DOCUMENTS

| | | | |
|---|---|---|---|
| 2,772,163 | 11/1956 | Tong | 96/97 |
| 2,801,171 | 7/1957 | Fierke et al. | 96/97 |
| 2,852,386 | 9/1969 | Tong | 96/114 |
| 3,350,265 | 10/1967 | Rubinstein et al. | 424/81 |
| 3,359,102 | 12/1967 | Pattign et al. | 96/1.8 |
| 3,418,127 | 12/1968 | Millihan | 96/82 |
| 3,518,088 | 6/1970 | Dunn et al. | 96/114 |
| 3,566,874 | 3/1971 | Shepherd et al. | 424/81 |
| 3,619,195 | 11/1971 | VanCampen | 96/100 |
| 3,660,071 | 5/1972 | Gould et al. | 424/81 |
| 3,689,271 | 9/1972 | Nittel et al. | 96/84 |
| 3,725,327 | 4/1973 | Stearns et al. | 260/29.6 MQ |
| 3,736,280 | 5/1973 | Grivas | 260/22 A |
| 3,748,129 | 7/1973 | Autges et al. | 96/3 |
| 3,900,619 | 8/1975 | Lalh et al. | 260/39.6 MQ |
| 3,929,705 | 12/1975 | Minieri | 424/273 |
| 4,057 517 | 11/1977 | Mixan et al. | 260/22 R |

FOREIGN PATENT DOCUMENTS 1265492 3/1972 United Kingdom .

OTHER PUBLICATIONS

Pesticide Index, 4th Ed. (1969), p. 285.

*Primary Examiner*—Allen J. Robinson
*Attorney, Agent, or Firm*—J. Frederick Thomsen; Daniel B. Reece, III

[57] ABSTRACT

An improved process is disclosed for uniformly dispersing hydrophobic materials through a hydrophilic colloid layer such as, for example, a photographically useful layer containing gelatin. The process over which the present invention is a valuable improvement comprises the steps:

(a) forming an aqueous dispersion by intermixing the hydrophobic material and an aqueous polymeric latex, optionally including gelatin in the dispersion;

(b) forming a wet layer by coating onto a suitable support the aqueous dispersion from step (a); and (c) thereafter removing a substantial proportion of the water from the wet layer through which the hydrophobic material is dispersed.

The present process relates particularly to improvements in step (a), wherein the "aqueous dispersion" is formed by blending a loadable polymeric latex into a solution of the hydrophobic material dissolved in a water-miscible solvent using techniques which avoid coagulation of the hydrophobic material or the particles of the latex. Removal of the water-miscible solvent results in the hydrophobic material being sorbed ("loaded") directly onto and through the particles of latex without coagulating the latex. Use of this process provides products having valuable, unexpected properties, possibly due to a combination of the size and the nature of the loaded particles. The process is particularly advantageous in achieving a distribution of hydrophobic material in small particles within a hydrophilic colloid layer or aqueous medium.

13 Claims, 1 Drawing Figure

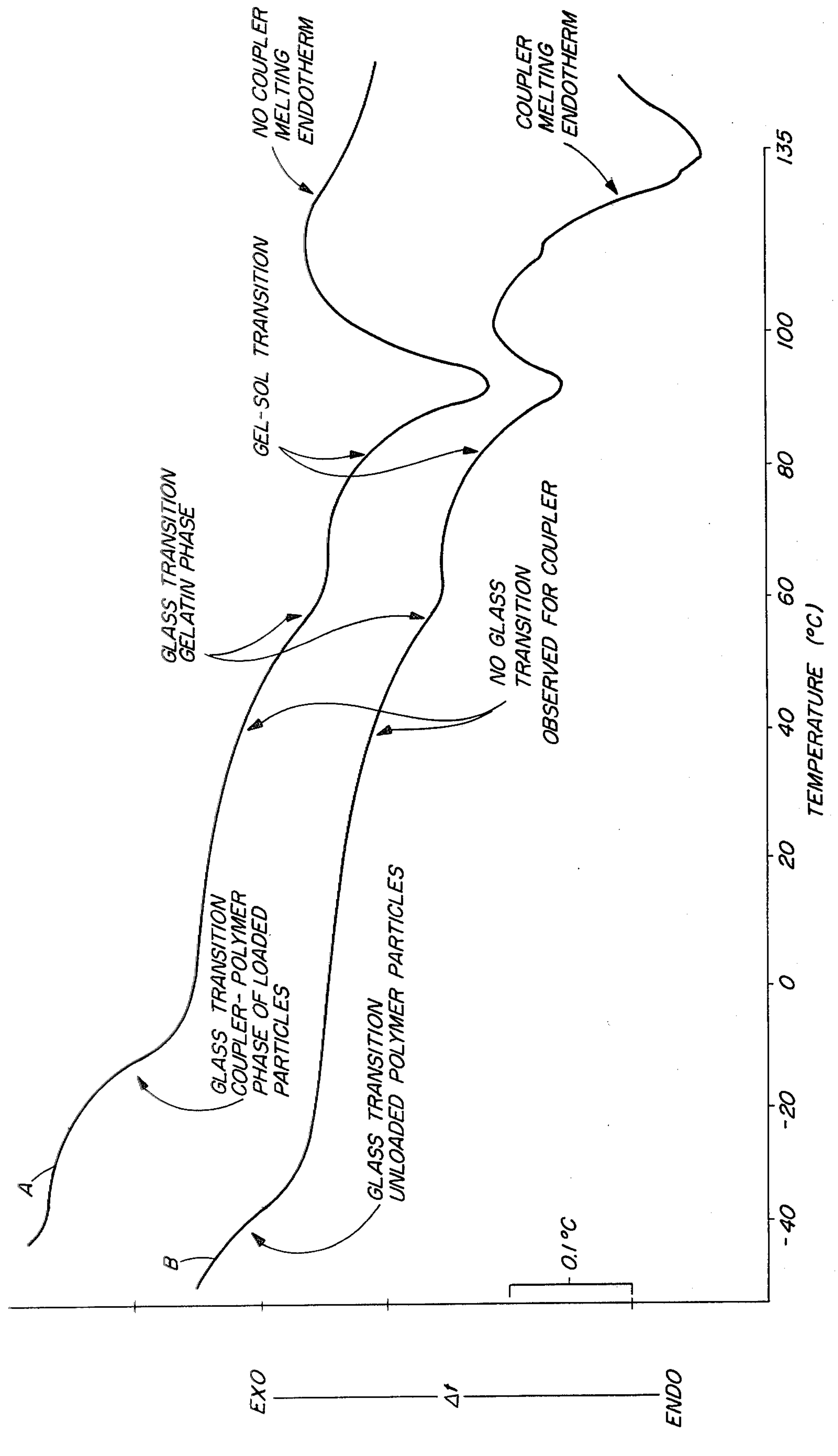
NO COUPLER MELTING ENDOTHERM
COUPLER MELTING ENDOTHERM
GEL-SOL TRANSITION
GLASS TRANSITION GELATIN PHASE
NO GLASS TRANSITION OBSERVED FOR COUPLER
GLASS TRANSITION COUPLER-POLYMER PHASE OF LOADED PARTICLES
GLASS TRANSITION UNLOADED POLYMER PARTICLES
A
B
0.1°C
-40
-20
0
20
40
60
80
100
135
TEMPERATURE (°C)
EXO
Δt
ENDO

PROCESS FOR ACHIEVING UNIFORM, FFICIENT DISTRIBUTION OF HYDROPHOBIC MATERIALS THROUGH HYDROPHILIC COLLOID LAYERS AND LOADED LATEX COMPOSITIONS

CROSS-REFERENCE TO RELATED APPLICATIONS

This application is a division of U.S. Ser. No. 778,184, filed Mar. 16, 1977, now abandoned, which is a continuation-in-part application of Ser. No. 653,816, filed Jan. 30, 1976, now abandoned, which is a continuation-in-part application of Ser. No. 575,689, filed May 5, 1975, now abandoned, which in turn is a continuation-in-part application of Ser. No. 506,919, filed Sept. 17, 1974, now abandoned. Ser. No. 778,184 is also a continuation-in-part of Ser. No. 744,182, filed Nov. 24, 1976, now abandoned, which is also a continuation-in-part of Ser. No. 653,816.

This invention relates to processes for the manufacture of novel compositions which contain both (a) hydrophobic materials and (b) polymeric latex materials, during which manufacture hydrophobic compounds are absorbed into the polymer particles which constitute the discontinuous or dispersed phase of a latex. This invention also relates to the use of the polymeric latex compositions containing hydrophobic compounds dispersed in polymer particles of latex (herein sometimes referred to as "loaded latex" compositions) which result from such processes in the manufacture of coating compositions and coated products. This invention is particularly valuable in the manufacture of photographic products which comprise a photographic support coated with at least one layer containing a hydrophilic colloid such as gelatin through which layer is distributed one or more hydrophobic compounds.

BACKGROUND

Several techniques have been used successfully and commercially heretofore to distribute hydrophobic compounds, particularly non-polymeric compounds such as color-forming couplers, ultraviolet absorbing materials and the like, fairly uniformly through layers of gelatin or other hydrophilic colloids in the manufacture of photographic products. One of the simplest of these techniques involves mechanically dispersing (i) the hydrophobic compound(s) in solid or liquid form through (ii) an appropriate hydrophilic colloid solution or emulsion by first blending together (i) and (ii), and then passing the resulting blend several times through a high energy mill such as a colloid mill. This technique produces inferior dispersions (as compared to other conventional dispersion techniques), which inferior dispersions are often unstable. Also large amounts of energy are consumed by this technique to accomplish the desired degree of particle comminution and dispersion. The large consumption of energy is often accompanied by heat buildup or undesirable localized heating and by undesirable chemical degradation of some of the ingredients involved.

Another technique for distributing hydrophobic compounds through a hydrophilic colloid solution or dispersion (which is subsequently coated and dried to yield a solid hydrophilic colloid layer in which the hydrophobic compounds are dispersed) is described in U.S. Pat. Nos. 2,304,940 and 2,322,027. This technique involves initially forming a solution by dissolving the hydrophobic compound(s) in oils or higher boiling solvents and then dispersing the resulting oily solution into the hydrophilic colloid solution or dispersion. Variations of this general technique have included the use of a lower molecular weight auxiliary solvent such as ethyl acetate or a lower molecular weight ketone to aid in the solubilization of the hydrophobe in the oily solvent, like for example the method described in U.S. Pat. No. 2,801,171. For the manufacture of "color" (dye image) photographic elements containing, incorporated therein, ballasted color-forming coupler compounds, techniques involving the use of such oily, higher boiling solvents, so-called "coupler solvents" have become widespread commercially. However, the techniques of dispersion of such coupler solutions require a high energy milling step (to obtain the desired degree of dispersion and particle size), and this usually results in some undesired degradation of some of the ingredients in the milled product. Also, such a milling step is both time consuming and expensive. Thus for many years there has existed a need for an improved method for dispersing hydrophobic compounds, like ballasted color-forming couplers, uniformly through photographic emulsions and other hydrophilic colloid-containing dispersions and solutions, which method would at least obviate the necessity to use a high energy mill to prepare useful dispersions of the hydrophobic materials through the hydrophilic colloid-containing materials and layers.

The present invention comprises a use of certain polymeric latexes (latices) in conjunction with the dispersion of hydrophobic materials into and through coatings or layers, such as those found in photographic elements, which use differs substantially from prior uses of latexes.

Some prior uses of latexes, for example, involved the use of latexes merely as one source for a polymeric ingredient in the coating layers. Conventional latexes have often been simply blended into a photographic emulsion which usually contained gelatin, silver halide and the usual photographic addenda. When organic solvents and hydrophobic compounds such as color-forming couplers were used heretofore in conjunction with synthetic polymers in the manufacture of coating compositions, often both the hydrophobe and the polymer were dissolved in the solvent prior to being formulated into the remainder of the coating compositions. (See for example, U.S. Pat. Nos. 3,518,088; 2,269,158; and 3,619,195).

In Tong U.S. Pat. No. 2,772,163, issued Nov. 27, 1956, the utility of latexes in distributing color-forming couplers in photographic element hydrophilic colloid layers was recognized. Tong discovered that couplers of limited solubility could be dissolved in alkali and, optionally, alcohol. By mixing the dissolved coupler containing alkali solution with a latex followed by neutralizing the alkali the coupler is precipitated from solution so that finally dispersed particles of the coupler are formed. The particles are, however, more finely dispersed than when the latex particles are absent.

Millikan U.S. Pat. No. 3,418,127, issued Dec. 24, 1968, discloses a method of finely dispersing a mixture of fluorescent compounds in a latex. This is accomplished by mixing the fluors, the monomeric precursors for the latex polymer particles and a polymerization initiator. Upon polymerization the combination of fluors is highly dispersed within the resulting latex. While this approach for dispersing fluors is potentially useful for dispersing other types of photographic hydrophobes, the dispersing process is not applicable to dispersing hydrophobes in preformed latexes and is limited to hydrophobes and hydrophobe concentrations which are compatible and attainable, respectively, with the polymerization technique disclosed.

SUMMARY OF THE INVENTION

In one aspect this invention is directed to a process of preparing a loaded polymeric latex composition. A hydrophobe dissolved in a water-miscible organic solvent is provided. An aqueous latex is provided consisting essentially of water as a continuous phase and loadable polymer particles as a dispersed phase. The loadable polymer particles are chosen from among those which, at 25° C., are capable of forming a latex with water at a polymer particle concentration of from 12 to 20 weight percent, based on total weight of the mixture, form a latex and, when 250 ml of the latex is then mixed with an equal volume of the water-miscible organic solvent, stirred and allowed to stand for 10 minutes, exhibit no observable coagulation of the polymer particles. The aqueous latex is blended with the water-miscible organic solvent while retaining the hydrophobe in solution and the polymer particles dispersed so that (a) the hydrophobe and the polymer particles are brought into intimate association and (b) the water-miscible organic solvent is diluted with water to reduce the solubility of the hydrophobe in the resulting continuing phase. The equilibrium distribution of the hydrophobe is thereby driven away from the resulting continuous phase toward the polymer particles of the dispersed phase, with the result being the loading of the dissolved hydrophobe into the polymer particles.

In another aspect this invention is directed to a process of preparing a hydrophilic colloid coating having a loaded polymeric latex distributed therein. A loaded polymeric latex composition is provided as described above wherein the loadable polymer particles consist essentially of a hydrophobic polymer with greater than about 2 percent by weight of the polymer being derived from a monomer capable of forming a water soluble homopolymer. A hydrophilic colloid is blended with the loaded polymeric latex composition so that the colloid is distributed within the resulting continuous phase of the latex. At least about half of the water-miscible organic solvent is removed from the loaded polymeric latex composition prior or subsequent to colloid blending to reduce further the solubility of the hydrophobe in the resulting continuous phase and thereby drive the equilibrium distribution of the hydrophobe away from the resulting continuous phase toward the polymer particles, so that the polymer particles are further loaded with hydrophobe. The loaded polymeric latex composition with the hydrophilic colloid dispersed in the continuous phase is coated onto a support, and at least a portion of the water is removed from the continuous phase of the coated loaded polymeric latex composition to form a solid hydrophilic colloid coating.

The drawing is a plot of temperature versus baseline temperature differentials, each in degrees centigrade.

BRIEF DESCRIPTION OF THE LOADING PROCEDURE

The present invention relates ultimately to a novel, valuable process for manufacturing and coating onto a support a hydrophilic colloid layer containing one or more hydrophobic materials uniformly dispersed therethrough and to a process for manufacturing improved polymeric latex compositions which are useful in the manufacture of such hydrophilic colloid layers and in other applications.

The loaded polymeric latex compositions prepared according to this invention are polymeric latexes comprised of an aqueous continuous phase and a dispersed or discontinuous phase consisting essentially of loadable polymer particles. Within the loadable polymer particles one or more hydrophobic compounds is distributed or dissolved.

The process of loading (distributing or dissolving) a hydrophobic compound within the loadable polymer particles is accomplished in the following manner:

The hydrophobic compound (or hydrophobe) to be loaded is provided dissolved in a water-miscible organic solvent, and an aqueous latex consisting essentially of water as a continuous phase and loadable polymer particles as a dispersed phase is then blended into the water-miscible organic solvent containing the hydrophobe. Blending is undertaken so that the hydrophobe remains in solution and the loadable polymer particles remain dispersed. That is, coagulation of either the hydrophobe or the polymer particles is avoided.

By avoiding coagulation of either the hydrophobe or the polymer particles a two phase system is established in which the continuous phase—the mixture of water-miscible organic solvent and water—constitutes one phase and the polymer particles constitute a second phase. Initially the hydrophobe is entirely within the continuous phase, dissolved within the water-miscible organic solvent. In the two phase system resulting from blending, the hydrophobe is brought into intimate association with both the continuous and the dispersed phases. The hydrophobe is then free to distribute itself between these phases based on its relative solubilities therein. Dilution of the water-miscible organic solvent with water by blending has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles are loaded with hydrophobe. This loading procedure requires that the hydrophobe remain dissolved. Precipitation of the hydrophobe, as practiced by Tong, for example, would interfere with the desired loading.

In most instances all the water desired to dilute the water-miscible organic solvent and shift the equilibrium distribution of the hydrophobe is present in the aqueous latex during initial blending. Where it is desired to introduce additional water, as where a concentrated latex is employed, additional water can be blended with the loaded latex composition resulting from the initial step of blending. The additional water will have the effect of further reducing the affinity of the hydrophobe for the continuous phase. This will further drive or shift the equilibrium distribution of the hydrophobe away from the continuous phase toward the dispersed phase and will further contribute to loading the polymer particles with hydrophobe.

While blending of water and loadable polymer particles with the water-miscible organic solvent containing hydrophobe dissolved therein results in significant loading of the hydrophobe into the polymer particles, a substantial portion of the hydrophobe remains in the continuous phase dissolved in the water-miscible organic solvent. Further loading of the hydrophobe into the polymer particles can be achieved by removing water-miscible organic solvent from the continuous phase. This has the effect of further increasing the affinity of the hydrophobe for the dispersed phase. I prefer to remove at least a major portion—in other words, at least about half—of the water-miscible organic solvent. This again drives or shifts the equilibrium distribution of the hydrophobe away from the continuous phase toward the dispersed phase. A still higher proportion of hydrophobe becomes dissolved or dispersed in the polymer particles so that their loading is further increased.

It is unnecessary to practice all of the loading steps indicated above following initial blending and loading. For certain applications the loaded latex composition resulting from initial blending and loading can be used directly. Or the loaded polymer particles can be separated from the continuous phase and used directly.

Where it is desired to form hydrophilic colloid coatings, as in photographic applications, the polymer particles of the aqueous latex are chosen to be readily dispersible in a hydrophilic colloid composition, such as an aqueous gelatin solution. This can be accomplished by employing particles consisting essentially of a loadable polymer at least 2 percent by weight of which is derived from an acidic monomer. This allows the hydrophilic colloid composition to be readily uniformly blended with the loaded latex composition prepared by at least the initial blending step and preferably a combination of the loading steps described above. The resulting hydrophilic colloid containing loaded latex composition can then be coated onto a suitable substrate, such as a conventional photographic support. Water and, if any remains present, water-miscible organic solvent can then be removed from the coating so that a solid hydrophilic colloid coating results. Depending upon the specific photographic application, the hydrophilic coating containing the loaded polymer particles can be the sole coating on the support, an undercoat, interlayer or overcoat. In one preferred form the loaded polymer particles are incorporated in a gelatino-silver halide emulsion layer.

Some of the benefits that can result from practicing the present invention include:

(a) Hydrophobic compounds, such as hydrophobic silver halide photographic element addenda, can be uniformly distributed through a hydrophilic colloid-containing layer without the use of a high energy mill. As a result, satisfactory dispersions can be obtained by the process of this invention at considerably lower cost, and with substantially less undesired degradation of materials, as compared with conventional dispersion techniques which require high energy milling.

(b) Some of the loaded polymeric latex compositions of this invention possess unique properties; for example, the hydrophobe portion thereof in some cases, appears to be more effective and/or more available for reaction in the desired manner.

(c) When hydrophobic compounds which are ordinarily very susceptible to air oxidation are distributed within loadable polymeric latex particles in accordance with the present invention, a significant resistance to oxidation can be imparted to them. Thus, the present process offers a means to distribute into hydrophilic colloid layers materials which, as a practical matter, could not be easily incorporated heretofore without excessive degradation. Examples of such materials which are susceptible to air oxidation include organic aromatic amino color developing agents such as the p-phenylenediamines, the p-aminophenols, certain pesticides and the like.

(d) In many instances, the present process makes it possible to incorporate considerably larger amounts of hydrophobe into loadable polymeric latex particles than was possible heretofore.

(e) In some instances, the use of a loaded polymeric latex composition prepared according to this invention makes it possible to incorporate a hydrophobic material into a given layer in which the hydrophobic material had heretofore been incompatible or too reactive (due to the general reactivity of the hydrophobic material with other ingredients in the layer, for example). In such cases, use of the present invention can obviate the necessity for providing more than one layer on a substrate to accomodate materials which would otherwise be too reactive to be contained in a single layer.

DETAILED DESCRIPTION OF THE INVENTION

Water-Miscible Organic Solvents

The water-miscible organic solvents useful in the practice of this invention are those which:

(a) can be dissolved in (i.e., are "miscible" with) distilled water at 20° C. to the extent of at least about 20 parts by volume of solvent in 80 parts by volume of water;

(b) have boiling points (at atmospheric pressure) above about −10° C.;

(c) do not detrimentally react chemically with aqueous latexes containing the loadable polymer particles which are useful in the practice of this invention; and (d) do not dissolve more than about 5 weight percent of such loadable polymer particles at 20° C.

Regarding requirement "c" for solvents useful in the practice of this invention, reaction between the solvent and polymer may be possible under certain circumstances, but is believed to be unlikely. Typical non-limiting examples of such useful water-miscible organic solvents are water-miscible alcohols, ketones and amides, (e.g. acetone, ethyl alcohol, methyl alcohol, isopropyl alcohol, dimethylformamide, methyl ethyl ketone), tetrahydrofuran, N-methyl-2-pyrrolidone, dimethyl sulfoxide and mixtures thereof. Of these, acetone, dimethylformamide and/or tetrahydrofuran are preferred when the hydrophobic material in question is soluble therein.

Aqueous Latexes

The aqueous latexes which are employed as starting materials in the practice of my process consist essentially of water as a continuous phase and loadable polymer particles as a dispersed phase. The loadable polymer particles which are useful in the practice of my process can be chosen from among those which meet the Loadable Polymer Particle Test.

Loadable Polymer Particle Test

At 25° C., the loadable polymer particles being tested must (a) be capable of forming a latex with water at a polymer particle concentration of from 10 to 20 percent by weight, based on total weight of the latex, and (b) when 100 ml of the latex is then mixed with an equal volume of the watermiscible organic solvent to be employed in forming the loaded polymeric latex composition desired, stirred and allowed to stand for 10 minutes, exhibit no observable coagulation of the polymer particles.

It is appreciated that the loadable polymer particles useful in the practice of my process can be formed by a variety of different loadable polymers. A preferred class of polymers capable of forming loadable polymer particles satisfying the Loadable Polymer Test set forth above are the following polymers which are comprised of repeating units in the proportions indicated:

(a) The repeating units forming from 40 to 100 percent by weight of the preferred class of polymers are derived from one or a mixture in any proportion of the following monomers:

(i) The monomers of this class can be generically designated as ethenic monomers of the formula:

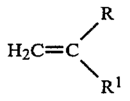

(I)

where

R is hydrogen, halogen or vinyl and $R^1$ is hydrogen, halogen or methyl or, when R is hydrogen, cyano.

Specific preferred monomers satisfying Formula I above are isoprene, chloroprene, 1,3-butadiene, propenenitrile, and vinylidene chloride. The use of other conventional polymerization monomers satisfying Formula I, such as vinyl chloride, vinyl fluoride, vinylidene fluoride, ethylene, propylene and the like, is specifically contemplated.

(ii) The monomers of this class can be generically designated as styrene-type monomers of the formula:

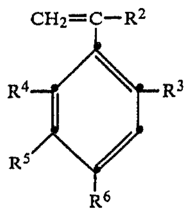

(II)

where $R^2$ is hydrogen or methyl, $R^3$, $R^4$ and $R^6$ are hydrogen or lower alkyl of from 1 to 5 carbon atoms, $R^5$ is hydrogen and with $R^4$ constitutes the atoms necessary to complete a fused benzene ring or one of $R^5$ and $R^6$ is halomethyl.

Exemplary of monomers satisfying Formula II are styrene, o-vinyltoluene, p-vinyltoluene, p-chloromethylstyrene, m-chloromethylstyrene, α-methylstyrene, 2-ethylstyrene, 4-butylstyrene, 4-pentylstyrene, 2-vinylmesitylene and 1-vinylnaphthalene.

(iii) The monomers of this class can be generally designated as esters of 2-alkenoic acids having the formula

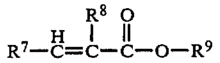

(III)

where $R^7$ is hydrogen or lower alkyl of from 1 to 5 carbon atoms, $R^8$ is hydrogen, chlorine or lower alkyl of from 1 to 5 carbon atoms and $R^9$ is alkyl or haloalkyl having from 1 to 20 carbon atoms.

In a preferred form $R^7$ is hydrogen and $R^8$ is hydrogen or methyl, so that the esters are formed from acrylic or methacrylic acid. In this preferred form $R^9$ contains from one to five carbon atoms. The preferred esters of 2-alkenoic acids are then lower alkyl esters of acrylic and methacrylic acid, such as methyl, ethyl, propyl, iso-propyl, butyl, isobutyl, tert-butyl, pentyl, neo-pentyl and similar esters of acrylic and methacrylic acid. The use of other esters of 2-alkenoic acids as defined by Formula III is specifically contemplated. In addition to esters of acrylic and methacrylic acid, esters of acids such as α-ethylacrylic acid, α-propylacrylic acid, α-butylacrylic acid, α-pentylacrylic acid, 2-butenoic acid, 2-methyl-2-butenoic acid, 2-hexenoic acid, 2-octenoic acid, 2-methyl-2-octenoic acid and similar acids are specifically contemplated. In addition to the lower alkyl esters, hexyl, heptyl, octyl, undecyl, dodecyl, tetradecyl, hexadecyl, octadecyl, eicosyl and isomeric branched chain esters of the above-noted 2-alkenoic acids are specifically contemplated.

(iv) The repeating units of this class can be formed in whole or in part by vinyl acetate.

As was indicated above, the repeating units of this class (a) can make up the entire polymer or as little as 40 percent by weight of the polymer. In the preferred form the repeating units of this class form from 60 to 95 percent by weight of the loadable polymer. The remaining portion of the polymer is made up of repeating units which, with the exception of the acrylamide repeating units (c), have as their purpose to modify the properties of the polymer, as is indicated below.

(b) The repeating units of this class form from 0 to 25 percent by weight of the preferred class of polymers. Where the loadable polymer particles are to be blended with a hydrophilic colloid such as gelatin, as in photographic applications, it is preferred that at least 2 percent by weight of the polymer be derived from monomers forming the repeating units of this class. In a specifically preferred form about 5 to 15 percent by weight of the polymer is derived from monomers of this class. The monomers of this class are hydrophilic ethenic monomers having a molecular weight of at most about 300 capable of forming a water soluble homopolymer. The monomers typically incorporate an acid, ammonium or hydroxy solubilizing group. In a specific preferred form the hydrophilic ethenic monomers forming the repeating units of this class are those having a molecular weight of less than 300 of the following formula:

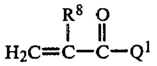 (IV)

where $R^8$ is as defined above;

$Q^1$ is —OM or an organic radical which together with the carbonyl group of the formula forms an ester or amide group terminating in a hydroxy, quaternary ammonium, COOM or $SO_3M$ solubilizing group; and M is hydrogen, ammonium or alkali metal. Exemplary monomers of this type are disclosed, for example, in U.S. Pat. Nos. 2,933,734 (issued Feb. 2, 1960); 3,024,221 (issued Mar. 6, 1962); 3,411,911 (issued Nov. 19, 1968) and 3,506,707 (issued Apr. 14, 1970). Specific exemplary hydrophilic ethenic monomers useful in the practice of this invention include the following:

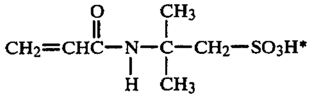 (b-1)

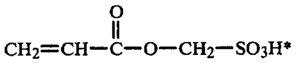 (b-2)

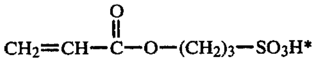 (b-3)

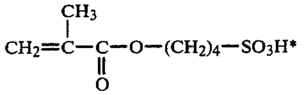 (b-4)

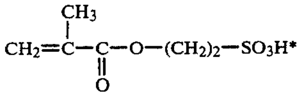 (b-5)

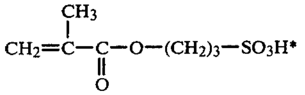 (b-6)

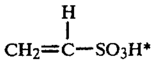 (b-7)

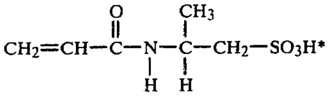 (b-8)

-continued

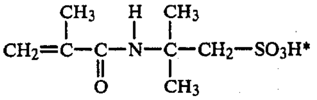 (b-9)

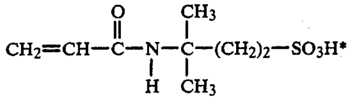 (b-10)

| | |
|---|---|
| p-styrene sulfonic acid* | (b-11) |
| 2-(methacryloyloxy)ethyltrimethylammonium methosulfate | (b-12) |
| acrylic acid* | (b-13) |
| methacrylic acid* | (b-14) |

(*In place of the acidic hydrogen can be an alkali metal cation, preferably Na or K, or an ammonium ion.)

(c) The repeating units of this class form from 0 to 30 percent by weight of the preferred class of polymers. These repeating units are derived from acrylamide monomers of the following formula:

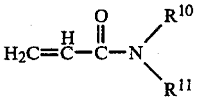 (V)

where $R^{10}$ and $R^{11}$ are hydrogen or alkyl or haloalkyl substituents having from 1 to 5 carbon atoms.

Specifically preferred acrylamide monomers according to Formula V are acrylamide, N-methylacrylamide, N,N-dimethylacrylamide, N-iso-propylacrylamide, N-butylacrylamide and N-pentylacrylamide. N-haloalkyl acrylamides are specifically contemplated such as, for example, N-chloromethylacrylamide, N-(4-chlorobutyl)acrylamide, N-(2,2-dichloroethyl)acrylamide, N-bromomethylacrylamide and the like.

The quantity of repeating units derived from acrylamide monomers is limited to maintain the desirable loading properties of the preferred class of polymers. Excessive amounts of acrylamide monomers can lead to excessive hydrophilic characteristics in the polymers. Accordingly, where polymers are employed containing repeating units derived from higher proportions of acrylamide monomers, their suitability is confirmed by applying the Loadable Polymer Particle Test.

(d) The repeating units of this class form from 0 to 60 percent by weight of the preferred class of polymers. The repeating units of this class are derived from hardenable (i.e. crosslinkable after polymerization) ethenic monomers having a molecular weight of at most about 300. In a preferred form the repeating units of this class can be formed by one or more hardenable ethenic monomers which contain one or more groups which can be crosslinked after polymerization by reaction with a photographic hardener, such as an aldehydic hardener (e.g. formaldehyde or succinaldehyde), a mucohalic acid hardener, a triazine chloride hardener, a vinyl sulfone hardener (e.g. bis(vinlsulfonylmethyl) ether, bis(vinylsulfonyl)methane, etc.), an aziridine hardener and the like.

The repeating units of this class perform the function of rendering the preferred class of polymers hardenable after polymerization has occurred, typically after loading of the polymer particles. In photographic applications it is advantageous to harden hydrophilic colloid vehicles after adding photographic addenda and coating. By incorporating hardenable repeating units in the preferred class of polymers they can be hardened concurrently with hydrophilic colloid in which they are present using conventional photographic hardeners and hardening procedures. Hardening of the loaded polymer particles can also be undertaken before coating independently of any hydrophilic colloid. Hardening of the polymer particles can offer advantages similar to those achieved in hardening photographic vehicles and, in addition, can serve to regulate the release of loaded hydrophobes and improve the abrasion resistance of the polymer particles. Hardening after loading of the polymer particles is, of course, advantageous in that the rate at which the hydrophobe is introduced is not limited, as occurs if the polymer particles are formed of initially crosslinked polymers. Thus, the rates of loading and release of hydrophobe can be independently adjusted through hardening.

For photographic applications I prefer that at least 0.2 percent by weight of the preferred class of polymers be formed of hardenable repeating units. I generally prefer that from 0.2 to 10 percent by weight of the preferred class of polymers be formed of the hardenable repeating units of this class.

A specific preferred class of monomers capable of forming hardenable repeating units are those monomers which contain both vinyl unsaturation and active methylene groups. The active methylene groups serve as hardening sites. In one specific form the active methylene group takes the form of a methylene group linking two carbonyl groups or a carbonyl and a cyano group. A specific preferred monomer of this type can be generically designated by the following formula:

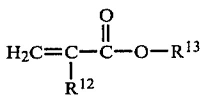

(VI)

where $R^{12}$ is hydrogen, alkyl having from 1 to 12 carbon atoms or

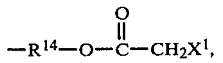

$R^{13}$ is alkyl having from 1 to 10 carbon atoms, cycloalkyl having from 3 to 10 carbon atoms, phenyl or

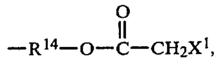

$R^{14}$ is alkylene having from 1 to 10 carbon atoms and $X^1$ is cyano or alkylcarbonyl having from 1 to 8 carbon atoms, provided that one and only one of $R^{12}$ and $R^{13}$ is always

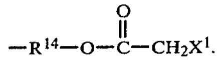

Specific exemplary monomers of this type are disclosed in U.S. Pat. Nos. 3,459,790 (issued Aug. 5, 1969); 3,488,708 (issued Jan. 6, 1970) and 3,554,986 (issued Jan. 12, 1971). Examples of such preferred hardenable ethenic monomers include:

(d-1) N-allylcyanoacetamide,
(d-2) ethyl methacryloylacetoacetate,
(d-3) N-cyanoacetyl-N'-methacryloylhydrazine,
(d-4) 2-acetoacetoxyethyl methacrylate,
(d-5) N-(3-methylacryloyloxypropyl)cyanoacetamide,
(d-6) 2-cyanoacetoxyethyl methacrylate,
(d-7) N-(2-methacryloyloxyethyl)cyanoacetamide,
(d-8) ethyl alpha-acetoacetoxymethylacrylate,
(d-9) 2-acetoacetoxypropyl methacrylate,
(d-10) 3-acetoacetoxy-2,2-dimethylpropyl methacrylate,
(d-11) N-(methacryloyloxymethyl)acetoacetamide,
(d-12) N-t-butyl-N-(methacryloyloxyethyl-)acetoacetamide,
(d-13) 2-acetoacetoxyethyl acrylate and
(d-14) 2-acetoacetoxy-2-methylpropyl methacrylate.

(e) The repeating units of this class form from 0 to 5 percent by weight of the preferred class of polymers. These repeating units are derived from crosslinking monomers. Specifically, these repeating units are typically formed by monomers containing at least two independently polymerizable, usually nonconjugated, vinyl groups. These repeating units can be incorporated into the preferred class of polymers for increasing their hydrophobicity; reducing their tendency to swell, in aqueous solutions, at elevated temperatures or when brought into contact with the water-miscible organic solvents; reducing any tendency of the polymer particles to agglomerate or coagulate; improving the abrasion resistance of polymer particles and/or regulating the loading of the polymer particles. It is generally preferred that from 0.2 to 3 percent by weight of the preferred class of polymers be derived from the crosslinking monomers. It is recognized that the crosslinking monomers of this class of repeating units can be employed independently of the repeating units (d). Taking into account the similarities in the repeating units (d) and (e), it is apparent that the crosslinking achieved by these units can be achieved by one or a combination of these repeating units used as alternatives or in combination. The repeating units of this class differ from those of class (d) above in that they cause crosslinking to occur concurrently with polymerization.

Suitable examples of monomers from which the repeating units (e) are formed are divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylene-dimethylene dimethacrylate, ethylene glycol dimethacrylate, diisopropylene glycol dimethacrylate, divinyloxymethane, ethylene diacrylate, ethylidene diacrylate, propylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidyne triacrylate, vinyl allyloxyacetate, vinyl methacrylate, 1-vinyloxy-2-allyloxyethane, and the like. Divinylbenzene and ethylene glycol dimethacrylate are particularly preferred monomers.

The aqueous latexes are characterized in that the loadable polymer particles are typically highly dispersed as compared to coupler solvent and similar hydrophobic particle dispersions in hydrophilic colloid coatings. The loadable polymer particles exhibit an average diameter in the range of from 0.02 to 0.2 micron, preferably in the range of from about 0.02 to 0.08 micron. (Although some swelling can occur during loading, the loaded polymeric latex particles also typically and preferably fall within these same ranges of average diameters.) The loadable polymer particles form at least 2 percent by weight of the aqueous latex and preferably form at least 10 percent by weight thereof. Preferably the aqueous latex contains about 20 percent by weight or less of the loadable polymer particles.

Procedures for producing aqueous latexes useful as starting materials in the practice of my process will be readily apparent to those skilled in the art and do not form a part of my invention. The aqueous latexes employed in the practice of my process can be formed, for example, using conventional free radical polymerization techniques for forming organic polymer hydrosols. Typically the aqueous latex with the polymer particles distributed therein can be conveniently formed by charging into water various monomers necessary to form the desired loadable polymer together with minor amounts of ingredients such as polymerization initiators, surfactants to disperse the monomers, etc. The proportions in which the monomers are employed will determine approximately the proportions of the repeating units in the resulting loadable polymers. More exact control of the proportions of repeating units in the resulting loadable polymers can be achieved by taking into account the known differences in the polymerization rates of the monomers. The proportions of the repeating units in the preferred class of loadable polymers discussed above can be taken alternately as the proportions of the monomers to be introduced for polymerization, since the differences in proportions introduced by this variance are not significant for the purposes of this process. Upon polymerization, the desired aqueous latex with the loadable polymer particles dispersed in an aqueous continuous phase is produced. The latex composition produced can be used directly as the aqueous latex employed in the practice of my process or, optionally, any minor amounts of materials other than water and loadable polymer particles which may be present can be at least partially separated from the aqueous latex by conventional techniques. Exemplary of useful free radical polymerization techniques which can be employed in forming the aqueous latexes are those described in U.S. Pat. Nos. 2,914,499; 3,033,833; 3,547,899 and Canadian Pat. No. 704,778. A preferred method for manufacturing the aqueous latexes useful in the practice of this process is described below, preceding the Examples.

Illustrative of aqueous latexes containing loadable polymer particles useful in the practice of my process are those set forth below. The proportions of the monomers reacted to form the loadable polymers are given in terms of the relative proportions of the monomers when introduced into the polymerization vessel. The proportion of the continuous phase, consisting essentially of water, not separately listed, can be anywhere within the preferred range of from 80 to 90 percent by weight, since even broader variations in the proportion of the continuous phase have little observable effect on the utility of the aqueous latexes in practicing my process.

L-1—Poly(sec-Butyl acrylate-co-3-Acryloyloxypropane-1-sulfonic acid, sodium salt-co-2-Acetoacetoxyethyl methacrylate) (85/10/5)

L-2—Poly(Ethyl acrylate-co-3-Acryloyloxypropane-1-sulfonic acid, sodium salt-co-2-Acetoacetoxyethyl methacrylate) (85/10/5)

L-3—Poly(Methyl acrylate-co-3-Acryloyloxypropane-1-sulfonic acid, sodium salt-co-2-Acetoacetoxyethyl methacrylate) (85/10/5)

L-4—Poly(n-Butyl acrylate-co-3-Acryloyloxypropane-1-sulfonic acid, sodium salt-co-2-Acetoacetoxyethyl methacrylate) (85/10/5)

L-5—Poly(Isobutyl acrylate-co-3-Acryloyloxypropane-1-sulfonic acid, sodium salt-co-2-Acetoacetoxyethyl methacrylate) (85/10/5)

L-6—Poly(Vinyl acetate-co-3-Acryloyloxypropane-1-sulfonic acid, sodium salt-co-2-Acetoacetoxyethyl methacrylate) (85/10/5)

L-7—Poly(n-Butyl methacrylate-co-3-Methacryloyloxypropane-1-sulfonic acid, sodium salt) (90/10)

L-8—Poly(n-Butyl acrylate-co-3-Methacryloyloxypropane-1-sulfonic acid, sodium salt) (85/15)

L-9—Poly(n-Butyl acrylate-co-3-Methacryloyloxypropane-1-sulfonic acid, sodium salt) (80/20)

L-10—Poly(Methyl acrylate-co-3-Methacryloyloxypropane-1-sulfonic acid, sodium salt) (80/20)

L-11—Poly(n-Butyl acrylate-co-3-Methacryloyloxypropane-1-sulfonic acid, sodium salt-co-2-Acetoacetoxyethyl methacrylate) (85/10/5)

L-12—Poly(n-Butyl acrylate-co-3-Methacryloyloxypropane-1-sulfonic acid, sodium salt-co-2-Acetoacetoxyethyl methacrylate) (80/15/5)

L-13—Poly(Ethyl acrylate-co-3-Methacryloyloxypropane-1-sulfonic acid, sodium salt-co-2-Acetoacetoxyethyl methacrylate) (85/10/5)

L-14—Poly(Isobutyl acrylate-co-3-Methacryloyloxypropane-1-sulfonic acid, sodium salt-co-2-Acetoacetoxyethyl methacrylate) (85/10/5)

L-15—Poly(sec-Butyl acrylate-co-3-Methacryloyloxypropane-1-sulfonic acid, sodium salt-co-2-Acetoacetoxyethyl methacrylate) (85/10/5)

L-16—Poly(n-Butyl methacrylate-co-3-Methacryloyloxypropane-1-sulfonic acid, sodium salt-co-2-Acetoacetoxyethyl methacrylate) (85/10/5)

L-17—Poly(n-Butyl methacrylate-co-3-Methacryloyloxypropane-1-sulfonic acid, sodium salt-co-Acrylic acid) (80/10/10)

L-18—Poly(n-Butyl methacrylate-co-3-methacryloyloxypropane-1-sulfonic acid, sodium salt-co-2-Acetoacetoxyethyl methacrylate) (90/5/5)

L-19—Poly(Methyl methacrylate-co-3-Methacryloyloxypropane-1-sulfonic acid, sodium salt-co-2-Acetoacetoxyethyl methacrylate) (85/10/5)

L-20—Poly(n-Butyl acrylate-co-Methyl methacrylate-co-3-Methacryloyloxypropane-1-sulfonic acid, sodium salt-co-2-Acetoacetoxymethyl methacrylate) (55/30/10/5)

L-21—Poly(n-Butyl methacrylate-co-Methyl methacrylate-co-3-Methacryloyloxypropane-1-sulfonic acid, sodium salt-co-2-Acetoacetoxyethyl methacrylate) (70/15/10/5)

L-22—Poly(n-Butyl acrylate-co-2-Ethylhexyl acrylate-co-3-Methacryloyloxypropane-1-sulfonic acid, sodium salt-co-2-Acetoacetoxyethyl methacrylate) (60/25/10/5)

L-23—Poly(n-Butyl acrylate-co-n-Butyl methacrylate-co-3-Methacryloyloxypropane-1-sulfonic acid, sodium salt-co-2-Acetoacetoxyethyl methacrylate) (40/45/10/5)

L-24—Poly(Methyl acrylate-co-3-Methacryloyloxypropane-1-sulfonic acid, sodium salt-co-2-Acetoacetoxyethyl methacrylate) (85/10/5)

L-25—Poly(n-Butyl acrylate-co-3-Methacryloyloxypropane-1-sulfonic acid, sodium salt-co-2-Acrylamido-2-methylpropane sulfonic acid) (70/20/10)

L-26—Poly(n-Butyl acrylate-co-2-Acrylamido-2-methylpropane sulfonic acid) (97.5/2.5)

L-27—Poly(n-Butyl acrylate-co-2-Acrylamido-2-methylpropane sulfonic acid) (95/5)

L-28—Poly(n-Butyl acrylate-co-2-Acrylamido-2-methylpropane sulfonic acid) (90/10)

L-29—Poly(n-Butyl acrylate-co-2-Acrylamido-2-methylpropane sulfonic acid) (85/15)

L-30—Poly(n-Butyl acrylate-co-2-Acrylamido-2-methylpropane sulfonic acid) (80/20)

L-31—Poly(n-Butyl methacrylate-co-2-Acrylamido-2-methylpropane sulfonic acid) (90/10)

L-32—Poly(Styrene-co-2-Acrylamido-2-methylpropane sulfonic acid) (90/10)

L-33—Poly(Vinyl acetate-co-2-Acrylamido-2-methylpropane sulfonic acid) (90/10)

L-34—Poly(n-Butyl methacrylate-co-2-Acrylamido-2-methylpropane sulfonic acid-co-Acrylic acid) (80/10/10)

L-35—Poly(n-Butyl methacrylate-co-2-Acrylamido-2-methylpropane sulfonic acid-co-Divinyl benzene) (88/10/2)

L-36—Poly(n-Butyl acrylate-co-Styrene-co-2-Acrylamido-2-methylpropane sulfonic acid) (30/65/5)

L-37—Poly(n-Butyl acrylate-co-Vinylidene chloride-co-2-Acrylamido-2-methylpropane sulfonic acid) (50/45/5)

L-38—Poly(Styrene-co-Methyl methacrylate-co-2-Acrylamido-2-methylpropane sulfonic acid) (45/45/10)

L-39—Poly(n-Butyl methacrylate-co-2-Acrylamido-2-methylpropane sulfonic acid-co-2-Acetoacetoxyethyl methacrylate) (85/10/5)

L-40—Poly(n-Butyl methacrylate-co-Styrene-co-2-Acrylamido-2-methylpropane sulfonic acid) (50/40/10)

L-41—Poly(Ethyl acrylate-co-2-Acrylamido-2-methylpropane sulfonic acid-co-2-Acetoacetoxyethyl methacrylate) (85/10/5)

L-42—Poly(2-Ethylhexyl acrylate-co-2-Acrylamido-2-methylpropane sulfonic acid-co-2-Acetoacetoxyethyl methacrylate) (85/10/5)

L-43—Poly(n-Butyl acrylate-co-N-Isopropylacrylamide-co-2-Acrylamido-2-methylpropane sulfonic acid) (80/10/10)

L-44—Poly(n-Butyl methacrylate-co-2-Acrylamido-2-methylpropane sulfonic acid-co-2-Acetoacetoxyethyl methacrylate-co-Divinyl benzene) (85/10/4/1)

L-45—Poly(n-Butyl methacrylate-co-Methyl methacrylate-co-2-Acrylamido-2-methylpropane sulfonic acid-co-2-Acetoacetoxyethyl methacrylate) (75/10/10/5)

L-46—Poly(n-Butyl acrylate-co-n-Butyl methacrylate-co-Styrene-co-2-Acrylamido-2-methylpropane sulfonic acid) (10/10/70/10)

L-47—Poly(n-Butyl acrylate-co-Methyl acrylate-co-2-Acrylamido-2-methylpropane sulfonic acid-co-2-Acetoacetoxyethyl methacrylate) (45/40/10/5)

L-48—Poly(n-Butyl acrylate-co-Methyl methacrylate-co-2-Acrylamido-2-methylpropane sulfonic acid-co-2-Acetoacetoxyethyl methacrylate) (75/10/10/5)

L-49—Poly(n-Butyl acrylate-co-Acrylamide-co-Styrene-co-2-Acrylamido-2-methylpropane sulfonic acid) (20/30/45/5)

L-50—Poly(n-Butyl acrylate-co-2-Acrylamido-2-methylpropane sulfonic acid-co-2-Acetoacetoxyethyl methacrylate) (85/10/5)

L-51—Poly(n-Butyl acrylate-co-2-Acetoacetoxyethyl methacrylate-co-2-Acrylamido-2-methylpropane sulfonic acid) (40/50/10)

L-52—Poly(2-Acetoacetoxyethyl methacrylate-co-n-Butyl acrylate-co-2-Acrylamido-2-methylpropane sulfonic acid) (60/30/10)

L-53—Poly(n-Butyl acrylate-co-2-Acetoacetoxyethyl methacrylate-co-2-Acrylamido-2-methylpropane sulfonic acid) (50/40/10)

L-54—Poly(Ethyl acrylate-co-2-Acrylamido-2-methylpropane sulfonic acid-co-2-Acetoacetoxyethyl methacrylate) (85/10/5)

L-55—Poly(Methyl acrylate-co-2-Acrylamido-2-methylpropane sulfonic acid-co-2-Acetoacetoxyethyl methacrylate) (85/10/5)

L-56—Poly(sec-Butyl acrylate-co-3-Methacryloyloxy propane-1-methyl-1-sulfonic acid, sodium salt-co-2-Acetoacetoxyethyl methacrylate) (85/10/5)

L-57—Poly(n-Butyl methacrylate-co-3-Methacryloyloxypropane-1-methyl-1-sulfonic acid, sodium salt-co-2-Acetoacetoxyethyl methacrylate) (85/10/5)

L-58—Poly(n-Butyl methacrylate-co-3-Methacryloyloxypropane-1-methyl-1-sulfonic acid, sodium salt-co-Methyl methacrylate-co-2-Acetoacetoxyethyl methacrylate) (70/15/10/5)

L-59—Poly(n-Butyl acrylate-co-3-Methacryloyloxypropane-1-methyl-1-sulfonic acid, sodium salt-co-2-Acetoacetoxymethyl methacrylate) (85/10/5)

L-60—Poly[Styrene-co-2-(Methacryloyloxy)ethyltrimethylammonium methosulfate] (90/10)

L-61—Poly[n-Butyl methacrylate-co-2-(Methacryloyloxy)ethyltrimethylammonium methosulfate] (90/10)

L-62—Poly[n-Butyl acrylate-co-Styrene-co-2-(Methacryloyloxy)ethyltrimethylammonium methosulfate] (30/55/15)

L-63—Poly[Vinylidene chloride-co-Styrene-co-2(Methacryloyloxy)ethyltrimethylammonium methosulfate] (50/45/5)

L-64—Poly[n-Butyl acrylate-co-Vinylidene chloride-co-2-(Methacryloyloxy)ethyltrimethylammonium methosulfate] (50/45/5)

L-65—Poly[n-Butyl acrylate-co-2-(Methacryloyloxy)ethyltrimethylammonium methosulfate-co-2-Acrylamido-2-methylpropane sulfonic acid] (80/15/5)

L-66—Poly[n-Butyl methacrylate-co-2-(Methacryloyloxy)ethyltrimethylammonium methosulfate-co-2-Acrylamido-2-methylpropane sulfonic acid] (80/15/5)

L-67—Poly[Methyl methacrylate-co-2-(Methacryloyloxy)ethyltrimethylammonium methosulfate-co-2-Acrylamido-2-methylpropane sulfonic acid] (80/15/5)

L-68—Poly[Ethyl acrylate-co-2-(Methacryloyloxy)ethyltrimethylammonium methosulfate-co-2-Acrylamido-2-methylpropane sulfonic acid] (80/15/5)

L-69—Poly[Styrene-co-2-(Methacryloyloxy)ethyltrimethylammonium methosulfate-co-2-Acrylamido-2-methylpropane sulfonic acid] (80/15/5)

L-70—Poly[n-Butyl methacrylate-co-Styrene-co-2-(Methacryloyloxy)ethyltrimethylammonium methosulfate-co-2-Acrylamido-2-methylpropane sulfonic acid] (40/40/15/5)

L-71—Poly[n-Butyl acrylate-co-Styrene-co-2-(Methacryloyloxy)ethyltrimethylammonium methosulfate-co-2-Acrylamido-2-methylpropane sulfonic acid] (40/40/15/5)

L-72—Poly[Ethyl acrylate-co-Styrene-co-2-(Methacryloyloxy)ethyltrimethylammonium methosulfate-co-2-Acrylamido-2-methylpropane sulfonic acid] (40/40/15/5)

L-73—Poly[n-Butyl methacrylate-co-2-(Methacryloyloxy)ethyltrimethylammonium methosulfate-co-2-Acrylamido-2-methylpropane sulfonic acid] (85/10/5)

L-74—Poly[Ethyl acrylate-co-2-(Methacryloyloxy)ethyltrimethylammonium methosulfate-co-2-Acrylamido-2-methylpropane sulfonic acid] (85/10/5)

L-75—Poly(n-Butyl acrylate-co-p-Styrene sulfonic acid, potassium salt) (95/5)

L-76—Poly(n-Butyl acrylate-co-2-Acrylamido-2-methylpropane sulfonic acid-co-2-Hydroxyethyl methacrylate) (75/20/5)

L-77—Poly(n-Butyl methacrylate-co-p-Styrene sulfonic acid, potassium salt) (95/5)

L-78—Poly(Styrene) (100)

L-79—Poly(Vinyl acetate) (100)

L-80—Poly(n-Butyl acrylate) (100)

L-81—Poly(n-Butyl methacrylate) (100)

L-82—Poly(Methyl methacrylate) (100)

L-83—Poly(Ethyl acrylate) (100)

L-84—Poly(Methyl acrylate) (100)

L-85—Poly(Acrylonitrile) (100)

The ratios shown in parenthesis are weight ratios of the repeating units corresponding to their order of recitation.

From the foregoing description it is evident that many combinations of monomers can be used in the manufacture of aqueous latexes which are loadable in accordance with this invention. It must be pointed out, however, that many polymeric latexes are not "loadable latexes" as that term is defined above. While all of the aqueous latexes formed using the preferred class of polymers to form the polymer particles as described above are loadable in accordance with my process it is recommended that as a precaution before a given latex of any composition is assumed to be loadable according to this process it be tested via the procedure set forth above under the heading "Loadable Polymer Particle Test". In addition to identifying aqueous latexes containing loadable polymer particles which fall outside of the preferred class of loadable polymers described above, the use of this test is also advantageous as a control technique, since batch-to-batch variances in the commerical manufacture of polymeric latexes sometimes occur. The use of commercially available polymeric latex compositions as starting materials in the practice of my process is specifically contemplated.

Hydrophobic Compounds

To be considered a hydrophobic compound (or, more succinctly, a hydrophobe) as that term is employed herein the compound must be essentially insoluble in distilled water at 25° C. Preferably the dissolved concentration of hydrophobe in water under these conditions should be less than 0.5 percent by weight, based on the weight of the water. Any such hydrophobe can be employed in the practice of my process which is or can be dissolved in a liquid consisting of one or a mixture of water-miscible organic solvent. Preferably the hydrophobe must be soluble in a concentration of at least 5 percent by weight, based on the total weight of the water-miscible organic solvent and dissolved hydrophobe. In practice minor amounts of essentially diluent materials, such as minor amounts of water commonly entrained in water-miscible solvents, can be associated with the blended hydrophobe and water-miscible organic solvent; however, the hydrophobe and water-miscible organic solvent or solvents are preferably chosen so that additional materials, such as pH or other modifiers—e.g., acid or alkali—are not required to dissolve the hydrophobe. Where commercially available as such, solutions of hydrophobes dissolved in water-miscible organic solvents can be employed as starting materials in the practice of my process.

Although the identity of any particular hydrophobe meeting the requirements indicated above is not important with respect to the successful practice of the generic aspects of the present invention, I have discovered that the use of certain classes or types of hydrophobes result in products having unexpectedly valuable utility. Certain preferred embodiments of my invention then can result from specific choices of hydrophobes. One general class of hydrophobes particularly useful in the practice of my process are hydrophobic photographic addenda. Such hydrophobic photographic addenda encompass conventional substantially water insoluble, oleophilic photographic addenda of the type incorporated in imaging and associated hydrophilic colloid coating layers of silver halide photographic elements. Specifically preferred hydrophobic photographic addenda of this type include those used to perform coupling, silver halide development, oxidized developer scavenging, spectral sensitizing or desensitizing, diffusion transfer dye image-forming and visible or ultraviolet light absorbing functions when incorporated in a silver halide photographic element. Other hydrophobic photographic addenda encompass those used in silver halide photographic elements as brighteners, antioxidants, silver halide solvents, bleachable dyes in silver-dye-bleach imaging processes and the like. All those hydrophobic photographic addenda which have been conventionally introduced into hydrophilic colloid layers of photographic elements in coupler-solvent and similar high boiling organic solvent droplets are ideally suited for use in the practice of this invention. In terms of end photographic uses all of the hydrophobic photographic addenda useful as hydrophobes in the practice of my process can be introduced in their conventional concentrations and locations within photographic materials and elements. Such photographic materials and elements are well known to chemists skilled in the photographic arts and need not be discussed in detail herein. Photographic materials in the preparation of which the process of the present invention is especially useful include, for example, image transfer materials, physical development materials, radiographic materials, dry development systems, color-forming materials, and the like, such as are described in *Product Licensing Index,* Vol. 92, December 1971, pages 107–110, and in British Pat. No. 923,045. Although these preferred embodiments are useful in the photographic industry, the present invention is not limited to photographic materials and processes, but is useful wherever it is deemed desirable to obtain a distribution of a hydrophobe through a polymeric material. Although the distribution of hydrophobe through polymeric material is typically used ultimately in a layer on a support, other end uses are contemplated. For example, useful hydrophobes can include hydrophobic insecticides, herbicides, miticides, hormones, vitamins, enzymes and the like (which meet the requirements set out above). It will be appreciated that the end use of such loaded polymeric latexes may not involve a support. In other applications coating may ultimately be undertaken by the end user rather than by the manufacturer. For example, the present process is useful in the manufacture of latex-type surface coating compositions such as "latex" paints, for example, wherein a hydrophobic ultraviolet absorber or chemical antioxidant can be incorporated into the coating compositions by simply blending into an otherwise complete formulation a sufficient amount of one of the appropriate selected loaded polymer latex compositions of this invention. Other uses for some of the loaded latex compositions of this invention will be discussed hereinafter. Still other uses will become evident from this disclosure.

Examples of some of the photographically useful loaded latex compositions of the present invention include compositions which comprise a preferred loadable polymer latex, as described above, the particles of which contain (uniformly distributed therethrough) one or more hydrophobic materials, as described above. Generally the amount of hydrophobe which can be present in intimate association with the polymer particles of the latex can be anywhere within the range of from 1:40 to 3:1 in terms of a weight ratio of hydrophobe to loadable polymer. It is preferred that the weight ratio of hydrophobe to loadable polymer in the latex be from about 1:10 to 2:1, optimally from about 1:3 to 1:1.

In connection with the photographic art, particularly preferred hydrophobes include hydrophobic photographic couplers such as hydrophobic ballasted couplers which can react with oxidized organic aromatic primary amino color developing agents to form a dye. Examples of such couplers, which are classified as ketomethylene, pyrazolone, phenolic or naphtholic compounds, are well known to the ordinarily skilled photographic chemist and are described in detail in some of the publications referred to in *Product Licensing Index*, Vol. 92, page 110, December, 1971.

Although the particular identity of the ballasted hydrophobic color-forming coupler compound that is used is apparently not critical insofar as the successful practice of this invention is concerned, some typical, non-limiting examples of hydrophobic, ballasted couplers that can be used successfully in the practice of this invention include couplers which embody a photographic coupler radical. Typical useful photographic couplers include the 5-pyrazolone couplers having the structure set out in Formula VII

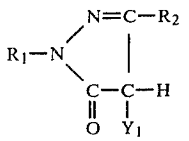

(VII)

wherein $R_1$ and $Y_1$ represent substituents of the type used in 5-pyrazolone couplers. For example, $R_1$ can represent an alkyl group (which can be substituted and preferably has from about 6 to 22 carbon atoms); an aryl group (preferably a phenyl or naphthyl group); or a heterocyclic group (preferably a carbon containing heterocyclic radical which contains from 5 to 6 atoms in the heterocyclic ring, which ring contains at least one hetero oxygen, sulfur or nitrogen atom); $Y_1$ values are illustrated below for colorless, colored or development inhibitor-releasing couplers; and $R_2$ can represent a member selected from the group consisting of an alkyl group, and carbamyl group (which can be substituted), an amino group (which can be substituted with various groups such as one or two alkyl or aryl groups), an amido group, e.g., a benzamido group (which can be substituted) or an alkylamido group (which can be substituted).

Yellow-colored magenta dye-forming masking couplers including, for instance, 3-anilino-4-arylazo-5-pyrazolone, couplers may be utilized in this invention. Such couplers are described in Beavers, U.S. Pat. No. 2,983,608. Particularly useful 3-anilino-4-arylazo-5-pyrazolones which can be used in the practice of this invention are selected from those having the following formula:

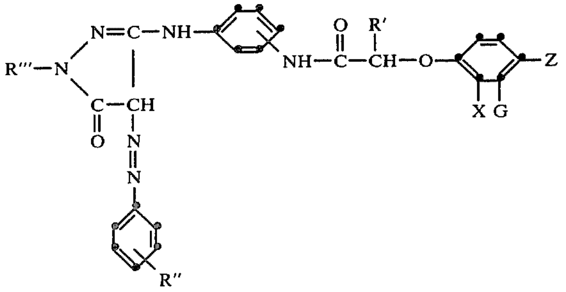

wherein R''' is an aryl group such as a phenyl radical or a phenyl radical substituted at the 2,4 and 6 carbons with halogen atoms, such as a 2,4,6-trichlorophenyl, a 2,4,6-tribromophenyl, a 2,4,6-triidophenyl or a 2,4,6-trifluorophenyl group; R' is a hydrogen atom or an alkyl group having from 1–8 carbon atoms, preferably from 1–4 carbon atoms; X, G and Z are hydrogen atoms and alkyl radicals usually having from 1–20 carbon atoms, preferably 1–15 with at least one of the substituents X, G and Z being an alkyl radical; R'' is a hydrogen atom, an alkyl or an alkoxy radical usually having from 1–10 carbon atoms, preferably from 1–6 carbon atoms.

An especially useful class of colorless hydrophobic magenta dye-forming couplers are selected from those having the following formula:

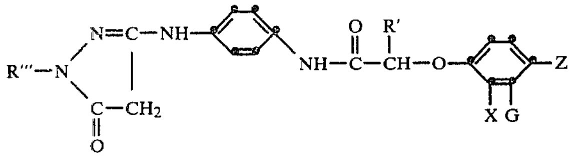

wherein R''', R', X, G and Z are defined above, and where at least one of the substituents X, G and Z is said alkyl radical.

Specific representative 4-equivalent magenta-forming colorless couplers which can be used in this invention include the following:

(1) 1-p-sec.-amylphenyl-3-n-amyl-5-pyrazolone
(2) 2-cyanoacetyl-5-(p-sec.-amylbenzoylamino)coumarone
(3) 2-cyanoacetylcoumarone-5-(N-n-amyl-p-tertamyl-sulfanilide)
(4) 1-[4-(4-tert-butylphenoxy)phenyl]-3-[α-(4-tert-butyl-phenoxy)propionamido]-5-pyrazolone
(5) 1-(2,4,6-trichlorophenyl)-3-{3-[α(3-n-pentadecyl-phenoxy)butyramido]benzamido}-5-pyrazolone
(6) 1-(2,4-dimethyl-6-chlorophenyl)-3-{3-[α-(3-n-pentadecylphenoxy)butyramido]benzamido}-5-pyrazolone
(7) 1-(2,4,6-trichlorophenyl)-3-{5-[α-(3-tert-butyl-4-hydroxyphenoxy)tetradecanamido]-2-chloroanilino}-5-pyrazolone
(8) 2-cyanoacetylcoumarone-5-(N-γ-phenylpropyl)-p-tert-amylsulfonanilide
(9) 1-p-laurylphenyl-3-methyl-5-pyrazolone
(10) 1-β-naphthyl-3-amyl-5-pyrazolone
(11) 1-p-nitrophenyl-3-n-amyl-5-pyrazolone
(12) 1-p-phenoxyphenyl-3-n-amyl-5-pyrazolone
(13) 1-[4-(4-tert-butylphenoxy)phenyl]-3-{4-[α-(4-tert-butylphenoxy)propionylamino]benzoylamino}-5-pyrazolone
(14) 1,4-phenylene bis-3(1-phenyl-5-pyrazolone)
(15) 1-phenyl-3-[4-(4-tert-amylphenoxy)phenylamino]-5-pyrazolone
(16) 3-(N-n-valerylanilino)-5-pyrazolone
(17) 1-(2,4,6-trichlorophenyl)-3-[2-chloro-4-{β-[N-(4-n-dodecylphenyl)acetylamino]propionylamino}anilino]-5-pyrazolone
(18) 1-{4-[α-(3-tert-butyl-4-hydroxyphenoxy)tetradecanamido]-2,6-dichlorophenyl}-3-(2,4-dichloroanilino)-5-pyrazolone
(19) 1-(2-chloro-4,6-dimethylphenyl)-3-[α(3-tert-butyl-4-hydroxyphenoxy)tetradecanamido]-5-pyrazolone
(20) 1-phenyl-3-(p-sec.-amylbenzoylamino)-5-pyrazolone
(21) 1-(4,6-dichloro-2-methoxyphenyl)-3-[α-(3-n-pentadecylphenoxy)butyramido]-5-pyrazolone
(22) 1-phenyl-3-α-naphthoylamino-5-pyrazolone
(23) 1-(2,4,6-trichlorophenyl)-3-[α-(3-n-pentadecyl-phenoxy)butyramido]-5-pyrazolone
(24) 1-(β-hydroxyethyl)-3-[α-(2,4-di-tert-amylphenoxy)acetamido]-5-pyrazolone
(25) 1-[β-(2,4-di-n-amylphenoxyacetoxy)ethyl]-3-(2,4-di-n-amylphenoxyacetamido)-5-pyrazolone
(26) 6-methyl-3-phenyl-1H-pyrazolo[3,2-c]-s-triazole
(27) 3-{{γ-{4-[α-(4-acetoxy-3-tert-butylphenoxy)-α-(n-dodecyl)acetamido]phenyl}propyl}}-6-methyl-1H-pyrazolo[3,2-c]-s-triazole
(28) 2-(2,4-di-tert-amylphenoxy)acetamino-6-methoxypyrazolo-[1,5-a]benzimidazole
(29) 1-phenyl-3-palmitylamino-5-pyrazolone
(30) 1-(2,4,6-trichlorophenyl)-3-n-heptadecyl-5-pyrazolone
(31) 1-(p-phenoxyphenyl)-31-(p-tert-amyloxybenzoyl)-amino-5-pyrazolone
(32) 1-hexyl-3-{{α-{4-[α-(2,4-di-tert-amylphenoxy)acetamido]-phenoxy}acetamido}}-5-pyrazolone
(33) 1-phenyl-3-{3-[2-(2,4-di-tert-amylphenoxy)-5-(3,5-di-β-hydroxyethylsulfamylbenzamido)benzamido]benzamido}-5-pyrazolone
(34) 1-(2,4-dichlorophenyl)-3-[3,(2,4-di-tert-amyl-phenoxyacetamido)benzamido]-5-pyrazolone
(35) 1,(2,4,6-trichlorophenyl)-3-{3-[α-(2,4-di-tert-amyl-phenoxy)acetamido]benzamido}-5-pyrazolone
(36) 1-(2,4,6-trichlorophenyl)-3-[β-(2,4-di-tert-amyl-phenoxy)propionamido]-5-pyrazolone
(37) 1-(2,4-dimethyl-6-chlorophenyl)-3-[α-(3-n-pentadecylphenoxy)butyramido]-5-pyrazolone
(38) 1-(2,5-dichlorophenyl)-3-[3-(4-tert-amylphenoxy)-benzamido]-5-pyrazolone
(39) 1-(2,4,6-tribromophenyl)-3-[3-(4-tert-amylphenoxy)benzamido]-5-pyrazolone
(40) 1-(2,5-dichlorophenyl)-3-[3-(2,4-di-tert-amyl-phenoxyacetamido)benzamido]-5-pyrazolone The 2-equivalent 5-pyrazolone couplers can be derived from the parent 4-equivalent 5-pyrazolone couplers by replacing one of the hydrogens on the carbon in the 4-position of the pyrazolone ring with a non-chromophoric coupling off group. Examples of coupling off groups which can be used in 2-equivalent magenta-forming 5-pyrazolone couplers are the thiocyano group illustrated by the couplers in Loria U.S. Pat. No. 3,252,924 and the acyloxy group containing 2-equivalent magenta-forming couplers of Loria U.S. Pat. No. 3,311,476. Other useful coupling off groups include acyloxy, aryloxy, alkoxy such as any of those shown in Whitmore et al U.S. Pat. No. 3,227,550, the chlorine atom, the fluorine atom, and the sulfo group.

Colorless 2-equivalent hydrophobic magenta-forming couplers which can be used in this invention include the following:

(1) 1-(2,4,6-trichlorophenyl)-3-(4-nitroanilino)-4-stearoyloxy-5-pyrazolone
(2) 1-(2,4,6-trichlorophenyl)-3-{3-[α-(2,4-di-tert-amyl-phenoxy)-acetamido]benzamido}-4-acetoxy-5-pyrazolone
(3) 1-(2,4,6-trichlorophenyl)-3-pentadecyl-4-thioacyano-5-pyrazolone
(4) 1-(2,4,6-trichlorophenyl)-3-[3-(2,4-di-tert-amyl-phenoxyacetamido)benzamido]-4-thiocyano-5-pyrazolone
(5) 1-(p-tert-butylphenoxyphenyl)-3-α-(p-tert-butyl-phenoxy)propionamido-4-thiocyano-5-pyrazolone
(6) 1-(2,4,6-trichlorophenyl)-3-n-octadecyl-4-bromo-5-pyrazolone
(7) 1-(2,4,6-trichlorophenyl)-3-pentadecyl-4-chloro-5-pyrazolone
(8) 1-[4-(3,5-dimethoxybenzamido)-phenyl]-3-ethoxy-4-(3-octadecylcarbamylphenylthio)-5-pyrazolone
(9) 1-(2,4,6-trichlorophenyl)-3-{3-[α-(2,4-di-tert-amyl-phenoxy)butyramido]benzamido}-4-phenylsulfonamido-5-pyrazolone
(10) 1-(2,4,6-trichlorophenyl)-3-{3-[α-(2,4-di-tert-amyl-phenoxy)acetamido]benzamido}-4-(4-nitrophenoxy)-5-pyrazolone
(11) 1-Chloro-2-[α-(2,4-di-tert-amylphenoxy)-butyrylamino]-pyrazolo[1,5-a]benzimidazole
(12) 7-Ethoxycarbonyl-6-methyl-3-n-pentadecyl-1H-pyrazolo[3,2-c]-s-triazine

Typical useful photographic couplers also include the well known class of yellow dye-forming couplers that contain the open chain ketomethylene coupler radical, wherein such couplers couple at the carbon atom adjacent the ketone group:

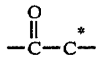

(wherein * denotes the coupling position)

An especially useful class of open-chain ketomethylene coupler compounds have the structure of Formula VIII:

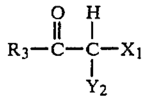
(VIII)

wherein $R_3$, $X_1$ and $Y_2$ represent substituents of the type used in open-chain ketomethylene couplers. For example, $R_3$ can represent the value given above (Formula VII) for $R_1$; $X_1$ can represent a cyano or a carbamyl group (which can be substituted); and $Y_2$ can have a meaning given below for colorless, colored or development inhibitor-releasing couplers.

Typical useful four-equivalent hydrophobic yellow-forming couplers which can be utilized in the invention include the following:

(1) N-(4-benzoylacetamidobenzenesulfonyl)-N-(γ-phenylpropyl)-p-toluidine
(2) α-benzoyl-3-[3-(4-tert-amylphenoxy)benzamido]-acetanilide
(3) α-benzoyl-5-[α-(2,4-di-tert-amylphenoxy)acetamido]-2-methoxyacetanilide
(4) α-(2-methoxybenzoyl)-4-{{5-{3-[bis(β-hydroxyethyl)-sulfamyl]benzamido}-2-{2,4-di-tert-amylphenoxy}-benzamido}}acetanilide
(5) α-benzoyl-p-sec.-amylacetanilide
(6) α-(2-methoxybenzoyl)-4-[N-(4-methylphenyl)-N-(γ-phenyl-n-propyl)sulfamyl]-2-chloroacetanilide
(7) α-{3-[α-(2,4-di-tert-amylphenoxy)butyramido]benzoyl}-2-methoxyacetanilide
(8) α-pivalyl-2-chloro-5-[γ-(2,4-di-tert-amylphenoxy)-butyramido]-acetanilide
(9) α-pivalyl-4-[N-(γ-phenylpropyl)-N-(p-tolyl)sulfamyl]acetanilide
(10) N-(p-anisoylacetaminobenzenesulfonyl)-N-(γ-phenylpropyl)-p-tert-amylaniline
(11) α-pivalyl-5-[γ-(2,4-di-tert-amylphenoxy)-butyramido]-2-chloroacetanilide
(12) α-(1-methylcyclohexane-1-carbonyl)-5-[γ-(2,4-ditert-amylphenoxy)butyramido]-2-chloroacetanilide
(13) α-(α-methoxyiobutyryl)-5-[α-(2,4-di-tert-amylphenoxy)acetamido]-2-chloroacetanilide
(14) α-(α,α-di-n-amyl)heptanoyl-5-heptanamido-2-fluoroacetanilide
(15) α-(7,7-dimethylnorbornane-1-carbonyl)-5-[γ-(2,4-di-tert-amylphenoxy]butyramido-2-chloroacetanilide The two-equivalent yellow-forming couplers can be derived from corresponding parent four-equivalent couplers by replacing one of the two hydrogens on the alpha-carbon (i.e., methylene) with any non-chromophoric coupling off group, including coupling off groups such as the fluorine atom, the chlorine atom, an acyloxy group, a cyclooxy group and a thiocyano group. Typical useful 2-equivalent couplers include the alpha-fluoro couplers of U.S. Pat. No. 3,277,155, the alpha-chloro couplers of U.S. Pat. No. 2,778,658, the alpha-thiocyanocouplers of U.S. Pat. No. 3,253,924, the alpha-acyloxy couplers of Loria U.S. Pat. No. 3,447,928, the alpha-cycloxy couplers of Loria U.S. Pat. No. 3,408,194 and the alpha-alkoxy couplers of the type shown in Whitmore et al U.S. Pat. No. 3,227,550.

Typical useful colorless 2-equivalent yellow-forming, hydrophobic open-chain ketomethylene couplers including the following:

(1) 4-(α-2-methoxybenzoyl-α-chloroacetamido)-3-(4-tertamylphenoxy)benzanilide
(2) α-(o-methoxybenzoyl)-α-chloro-4-[α-(2,4-di-tert-amylphenoxy)-n-butyramido]acetanilide
(3) α-{3-[α-(2,4-di-tert-amylphenoxy)butyramido]benzoyl)}-α-fluoro-2-methoxyacetanilide
(4) α-fluoro-α-pivalyl-5-[γ-(2,4-di-tert-amylphenoxy)-butyramido]-2-chloroacetanilide
(5) α-acetoxy-α-{3-[2,4-di-tert-amylphenoxy)-butyramido]-benzoyl}-2-methoxyacetanilide
(6) α-benzoyl-α-[α-(2,4-di-n-amylphenoxy)acetoxy]-2-methoxyacetanilide
(7) α-pivalyl-α-(4-carboxyphenoxy)-2-chloro-5-[γ-2,4-di-tert-amylphenoxy)butyramido]acetanilide
(8) α-pivalyl-α-stearoyloxy-4-sulfamylacetanilide
(9) α-pivalyl-α-[α-(3-pentadecylphenoxy)acetoxy]-3,5-dicarboxyacetanilide
(10) α-acetoxy-α-{3-[α-{2,4-di-tert-amylphenoxy)-butyramido]-benzoyl}-2-methoxyacetanilide
(11) α-(3-dodecanamidobenzoyl)-α-octanoyloxy-2-methoxyacetanilide
(12) α{3-[γ-(2,4-di-tert-amylphenoxy)butyramido]benzoyl}-α-(4-nitrophenoxy)-2-methoxyacetanilide
(13) α-[4-(N-methyl-N-octadecylsulfamyl)phenoxy]-α-pivalyl-4-sulfoacetanilide
(14) α-pivalyl-α-(4-sulfophenoxy-4-(N-methyl-N-octadecyl sulfamyl)acetanilide potassium salt
(15) α-4-(4-benzyloxyphenylsulfonyl)phenoxy)-α-pivalyl-2-chloro-5-[γ-(2,4-di-tert-amylphenoxy)-butyramido]acetanilide
(16) α-[4-(4-hydroxyphenylsulfonyl)phenoxy]-α-pivalyl-2-chloro-5-[E-(2,4-di-tert-amylphenoxy)-butyramido]acetanilide
(17) 4,4'-bis[α-pivalyl-α-{2-chloro-5-[γ-(2,4-di-tert-amylphenoxy)butyramido)phenylcarbamyl}methoxy]-diphenylsulfone The hydrophobic photographic colorless, colored and development inhibitor-releasing couplers employed in the practice of this invention can utilize any suitable phenolic (including alpha-naphtholic), couplers, including those encompassed by the structural Formula IX below:

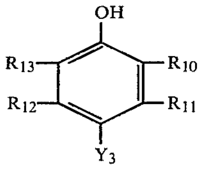
(IX)

wherein $R_{10}$, $R_{11}$, $R_{12}$, $R_{13}$ and $Y_3$ can represent a substituent of the type used in phenolic couplers. For example, $R_{10}$ and $R_{11}$ each can represent a value given for $R_1$, and in addition can represent a member selected from the group consisting of hydrogen, amino, carbonamido, sulfonamido, sulfamyl, carbamyl, halogen and alkoxy; $R_{12}$ and $R_{13}$, when taken together, can represent the carbon atoms necessary to complete a benzo group, which benzo group can be substituted with any of the groups given for $R_{10}$ and $R_{11}$ and, when taken separately, $R_{12}$ and $R_{13}$ can each, independently, represent a value below for colorless, colored, or development inhibitor-releasing hydrophobic couplers utilized herein.

The colorless hydrophobic couplers which can be utilized in the practice of this invention include the non-diffusible, colorless open-chain, 5-pyrazolone and phenolic couplers referred to above, such as those couplers represented by Formulas VI, VIII and IX above wherein $Y_1$ and $Y_2$ each represents a non-chromophoric group of the type used in colorless image forming couplers, such as hydrogen or a coupling off group, e.g., halogen, such as a chlorine or a fluorine atom; a thiocyano group; an acyloxy group, for example an alkanoyloxy group which can be substituted, or an aroyloxy group which can be substituted, or a heterocycloyloxy group which can be substituted; a cyclooxy group including an aryloxy group, e.g., phenoxy, naphthoxy, or a heterocyclooxy group, such as pyridinyloxy group, a tetrahydropyranyloxy group, a tetrahydroquinolyloxy group, etc. and, a cycloalkoxy group; and $Y_3$ can represent any value given for $Y_1$ and $Y_2$, except an aryloxy group, and in addition $Y_3$ can also represent a cycloimido group (e.g., a maleimido group, a succinimido group, a 1,2-dicarboximido group, a phthalimido group, etc.) when $R_{12}$ and $R_{13}$ are taken together to form a benzo group.

Typical colorless four-equivalent cyan-forming phenolic couplers which can be used in this invention include:

(1) 7-n-octadecylthio-1-naphthol
(2) 5-(N-benzyl-N-n-valerylamino)-1-naphthol
(3) 5-caproylamino-1-naphthol
(4) 5-[α-(2,4-di-tert-amylphenoxy)hexanamido]-2-heptafluorobutyramidophenol
(5) 2-chloro-5-(N-n-valeryl-N-p-isopropylbenzylamino)-1-naphthol
(6) 2-chloro-5-palmitylamino-1-naphthol
(7) 1-hydroxy-2-[δ-(2,4-di-tert-amylphenoxy)-n-butyl]-naphthamide
(8) 1-hydroxy-7-n-octadecyl-2-[δ-(2,4-di-tert-amylphenoxy)n-butyl]naphthamide
(9) 1-hydroxy-2-(N-isoamyl-N-phenyl)naphthamide
(10) 8-hydroxy-1-α-naphthoyl-1,2,3,4-tetrahydroquinoline
(11) 5-acetamido-2-n-octadecylcarbamylphenol
(12) 1-hydroxy-N-{{{p-{{2-(2,4-di-tert-amylphenoxy)-5-{m-[tris(hydroxymethyl)methyl]sulfamylbenzamido}-benzamido}}phenethyl}}}-2-naphthamide
(13) 1-hydroxy-2-[α-(4-n-hexadecyloxyphenyl)ethyl]-naphthamide
(14) 2-n-heptadecylureidophenol
(15) 2-α-(p-tert-amylphenoxy)-n-butyrylamino-5-methylphenol
(16) 1-hydroxy-N-[α-(2,4-di-tert-amylphenoxy)butyl]-2-naphthamide
(17) 2-(4-tert-amyl-3-phenoxybenzoylamino)-3,5-dimethylphenol
(18) 2-(4-tert-amyl-3-phenoxybenzoylamino)phenol
(19) 2-[α-(4-tert-butylphenoxy)propionylamino]phenol
(20) 2-[N-methyl-N-(4-tert-amyl-3-phenoxybenzoylamino)phenol
(21) 2-α-(4-tert-amylphenoxy)butyrylamino-1-phenol
(22) 5-(N-p-sec.-amylbenzoyl-N-p-isopropylbenzyl-)amino-2-chloro-1-naphthol
(23) 2-[α-(4-tert-amylphenoxy)-n-butyrylamino]-5-methylphenol
(24) 3-(4-tert-amyl-3'-phenoxybenzoylamino)phenol
(25) 2-[α(4-tert-amylphenoxy)-n-butyrylamino]-6-chlorophenol
(26) 3-[α-(4-tert-amylphenoxy)-n-butyrylamino]-5-chlorophenol
(27) 1-hydroxy-N-(2-n-tetradecyloxyphenyl)-2-naphthamide
(28) 1-hydroxy-N-[4-(4-tert-butylphenoxy)phenyl]-2-naphthamide
(29) 2-[α-(2,4-di-tert-amylphenoxy)hexanamido]-5-(p-chlorophenylthiomethyl)phenol
(30) 1-hydroxy-N-(α,α-dimethylhexadecyl)-2-naphthamide Any of the colorless hydrophobic 2-equivalent cyan-forming phenolic couplers can be used in the practice of this invention. The two-equivalent couplers can be derived from the corresponding four-equivalent phenolic couplers by substituting a non-chromophoric coupling off group on the carbon in the 4-position of the phenolic or naphthoic ring. Included among the coupling off groups are the acyloxy group illustrated by the 4-acryloxyphenols and 4-acyloxynaphthols of Loria U.S. Pat. No. 3,311,476, the cyclooxy group illustrated by the 4-cyclooxy naphthols of Loria U.S. Pat. No. 3,476,563, the thiocyano group illustrated by the 4-thiophenols of Loria U.S. Pat. No. 3,253,294, the cyclic imido groups as illustrated by the 4-cyclic imido derivatives of 1-hydrogen-2-naphththamides of Loria U.S. Pat. No. 3,458,315, the chlorine atom as illustrated in the 4-chlorophenols of Weissberger U.S. Pat. No. 2,423,730, the alkoxy group as illustrated by the 4-alkoxynaphthols (and naphthols) of Whitmore et al U.S. Pat. No. 3,227,550, the sulfo group as in 4-sulfophenols and 4-sulfonaphthols, etc.

Typical colorless 2-equivalent cyan-forming couplers which can be used in this invention include the following:

(1) 1-hydroxy-4-decyloxy-2-naphthamide
(2) 1-hydroxy-4-acetoxy-N-[α-(2,4-di-tert-amylphenoxy)butyl]-2-naphthamide
(3) 1-hydroxy-4-methoxy-N-octadecyl-3',3'-dicarboxy-2-naphthanilide
(4) 2-[α-(2,4-di-tert-amylphenoxy)butyramido]-4,6-dichloro-5-methylphenol
(5) 1-hydroxy-4-thiocyano-N-[δ-(2,4-di-tert-amylphenoxy)butyl]-2-naphthamide
(6) 1-hydroxy-4-[N-(4-methoxyphenyl)aminomethyl]-N-n-octadecyl-N-(3,5-dicarbomethoxy)phenyl-2-naphthamide
(7) 1-hydroxy-4-p-chlorophenoxy-N-(2-n-tetradecyloxy)phenyl-2-naphthamide
(8) 1-hydroxy-N-[4-(2,4-di-tert-amylphenoxy)butyl]-4-(p-methylphenylsulfonamido)-2-naphthamide
(9) 2-[α-(2,4-di-tert-amylphenoxy)acetamido]-4,6-dichloro-5-methylphenol
(10) 2-{α-{4-[α-(2,4-di-tert-amylphenoxy)butyramido]-phenoxy}-acetamido}-4,6-dichloro-5-methylphenol
(11) 2-(m-chlorophenylureido)-5-[α-(3-n-pentadecylphenoxy)butyramido]-4-fluorophenol
(12) 6-[α-(3-n-pentadecylcyclohexyloxy)acetamido]-2,4-dichloro-3-methylphenol The development inhibitor-releasing (DIR) couplers which can be utilized in the practice of this invention are those which are hydrophobic, as described hereinbefore, and which can be represented by the following general Formula X:

COUP-S-R (X)

wherein COUP represents a photographic coupler radical, S is a monothio radical attached to the coupling position of the photographic coupler, and R is a colorless (chromophore free) organic radical that does not inhibit photographic development as long as it is attached to COUP which photographic coupler forms, on reaction with oxidized primary aromatic amine color developing agent, a colorless, diffusible mercaptan which inhibits photographic development. Some typical DIR couplers, useful in this invention can be represented by Formulas VI, VIII and IX above wherein $Y_1$, $Y_2$ and $Y_3$ each represents a monothio group, such as an ortho nitro or ortho amino substituted-arylmonothio group, such as 2-nitrophenyl and 2-aminophenyl; a carbon-containing heterocyclic monothio group (generally having a 5 to 6 membered ring containing at least one hetero nitrogen, oxygen or sulfur atom and preferably 1 to 4 hetero nitrogen atoms) including heterocyclic radicals, such as tetrazolyls, triazinyls, triazolyls, oxazolyls, oxadiazolyls, diazolyls, thiazyls, thiadiazolyls, benzoxazolyls, benzothiazolyls, pyrimidyls, pyridinyls, quinolinyls, etc., and in which the heterocyclic moieties of the monothio group are either unsubstituted or substituted with various groups, such as nitro, halogen (chlorine, bromine, iodine, fluorine), lower alkyl, lower alkylamido, lower alkoxy, lower alkylsulfonamido, α-chloroacetylthio, lower alkylcarbamyl, amino, etc., typical monothio groups representing the above include an arylthio group (e.g., 2-aminophenylthio and 2-nitrophenylthio); and a heterocyclicthio group (e.g., 2-benzothiazolylthio, 1-phenyl-5-tetrazolylthio, 1-(4-carbomethoxyphenyl)-5-tetrazolylthio, 5-phenyl-1,3,4-oxadiazolyl-2-thio, 2-phenyl-5-(1,3,4-oxadiazolylthio, 2-benzoxazolylthio, etc.).

Representative DIR couplers that can be used herein include the following:

(1) α-benzoyl-α-(2-nitrophenylthio)-4-[N-(γ-phenylpropyl)-N-(p-tolyl)-sulfamyl]acetanilide (2) α-benzoyl-α-(2-benzothiazolylthio)-4-[N-(γ-phenylpropyl)-N-(p-tolyl)sulfamyl]acetanilide (3) α-{3-[α-(2,4-di-tert-amylphenoxy)butyramido]benzoyl}-α-(2-nitrophenylthio)-2-methoxyacetanilide (4) α-{3-[α-(2,4-di-tert-amylphenoxy)butyramido]benzolyl}-α-(2-benzoxazolylthio)-2-methoxyacetanilide (5)α-benzoyl-α-[1-(3-phenyl)-5-tetrazolylthio]-stearamidoacetanilide (6) α-(1-phenyl-5-tetrazolylthio)-α-pivalyl-2-chloro-5-[γ-(2,4-di-tert-amylphenoxy)butyramido]acetanilide (7) 1-phenyl-3-octadecylamino-4-[2-phenyl-5-(1,3,4)-oxadiazolylthio]-5-pyrazolone (8) 1-{4-[γ-(2,4-di-tert-amylphenoxy)butyramido]-phenyl}-3-ethoxy-4-(1-phenyl-5-tetrazolylthio)-5-pyrazolone (9) 1-{4-[α-(2,4-[di-tert-amylphenoxy)butyramido]-phenyl}-3-(1-pyrrolidino)-4-(1-phenyl-5-tetrazolylthio-5-pyrazolone

(10) 1-{4-[α-(3-pentadecylphenoxy)butyramido]-phenyl}-3-ethoxy-4-(1-phenyl-5-tetrazolylthio)-5-pyrazolone

(11) 1-(2,4,6-trichlorophenyl)-3-{4-[α-(2,4-di-tert-amylphenoxy)butyramido]anilino}-4-(1-phenyl-5-tetrazolylthio)-5-pyrazolone

(12) 1-phenyl-3-octadecylamino-4-(1-phenyl-5-tetrazolylthio)-5-pyrazolone

(13) 1-[4-(4-tert-butylphenoxy)phenyl]-3-phenyl-4-(1-phenyl-5-tetrazolylthio)-5-pyrazolone

(14) 1-[4-(4-tert-butylphenoxy)phenyl]-3-[α-(4-tert-butylphenoxypropionamido]-4-(4-phenyl-1,3,4-oxadiazolyl-2-thio)-5-pyrazolone

(15) 1-[4-(4-tert-butylphenoxy)phenyl]-3-[α-(4-tert-butylphenoxypropionamido]-4-(2-nitrophenylthio)-5-pyrazolone

(16) 1-[4-(4-tert-butylphenoxy)phenyl]-3-[α-(4-tert-butylphenoxy)propionamido]-4-[1-(4-methoxyphenyl)-5-tetrazolylthio]-5-pyrazolone

(17) 1-[4-(4-tert-butylphenoxy)phenyl]-3-[α-(4-tert-butylphenoxy)propionamido]-4-(2-benzothiazolylthio)-5-pyrazolone

(18) 1-[4-(4-tert-butylphenoxy)phenyl]-3-[α-(4-tert-butylphenoxy)pripionamido]-4-(2-nitrophenylthio)-5-pyrazolone

(19) 1-[4-(4-tert-butylphenoxy)phenyl]-3-[α-(tert-butylphenoxy)propionamido]-4-(2-benzoxazolylthio)-5-pyrazolone

(20) 1-(2,4-dichloro-6-methoxyphenyl)-3-[α-(3-pentadecylphenoxy)acetamido]-4-(1-phenyl-5-tetrazolylthio)-5-pyrazolone

(21) 1-phenyl-3-benzamido-4-(1-phenyl-5-tetrazolylthio)-5-pyrazolone

(22) 1-phenyl-3-[α-(2,4-di-tert-amylphenoxy)acetamido]-4-(1-phenyl-5-tetrazolylthio)-5-pyrazolone

(23) 1-phenyl-3-[γ-(2,4-di-tert-amylphenoxy)-butyramido]-4-(1-phenyl-5-tetrazolylthio)-5-pyrazolone

(24) 1-phenyl-3-(3,5-dicarbethoxybenzamido)-4-(2-nitrophenylthio)-5-pyrazolone

(25) 1-phenyl-3-octadecyl-4-(1-phenyl-5-tetrazolylthio)-5-pyrazolone

(26) 1-phenyl-3-[α-(2,4-di-tert-amylphenoxy)acetamido]-4-(1-phenyl-5-tetrazolylthio)-5-pyrazolone

(27) 1-phenyl-3-[γ-(2,4-di-tert-amylphenoxy)-butyramido]-4-(1-phenyl-5-tetrazolylthio)-5-pyrazolone

(28) 1-phenyl-3-(3,5-didodecyloxybenzamido)-4-(2-nitrophenylthio)-5-pyrazolone

(29) 1-hydroxy-4-(2-nitrophenylthio)-N-[α-(2,4-di-tert-amylphenoxy)butyl]-2-naphthamide

(30) 1-hydroxy-4-(2-benzothiazolylthio)-N-[α-(2,4-di-tert-amylphenoxy)butyl]-2-naphthamide

(31) 1-hydroxy-4-(1-phenyl-5-tetrazolylthio)-N-[α-(2,4-di-tert-amylphenoxy)butyl]-2-naphthamide

(32) 1-hydroxy-4-(2-benzothiazolylthio)-N-octadecyl-3',5'-dicarboxyl-2-naphthanilide

(33) 4-(1-phenyl-5-tetrazolylthio)-1-hydroxy-2-[δ-2,4di-tert-amylphenoxy)-n-butyl]naphthamide

(34) 1-hydroxy-4-(1-phenyl-5-tetrazolylthio)-2'-tetradecyloxy-2-naphthanilide

(35) 1-hydroxy-4-[1-(4-methoxyphenyl)-5-tetrazolylthio]-N-[δ-(2,4-di-tert-amylphenoxy)butyl]-2-naphthamide

(36) 1-hydroxy-4-(5-phenyl-1,3,4-oxadiazolyl-2-thio)-N-[δ-(2,4-di-tert-amylphenoxy)butyl]-2-naphthamide

(37) 5-methoxy-2-[α-(3-n-pentadecylphenoxy)-butyramido]-4-(1-phenyl-5-tetrazolylthio)phenol The above DIR coupler compounds can be prepared by the method described in Barr et al U.S. Pat. No. 3,227,554. The development inhibitor-releasing coupler is utilized at a concentration sufficient to provide the desired, effective improvement in sharpness, the desired, effective interimage effects and the desired, effective reduction in fog introduced by the azo group released from the reaction of colored coupler with oxidized color developer.

The colorless coupler, colored coupler and development inhibitor-releasing coupler utilized in the photographic emulsions and elements of this invention are nondiffusible. The term "nondiffusible" as used herein has the meaning commonly applied to that term in color photography and denotes materials which for all practical purposes do not migrate or wander through photographic hydrophilic colloid layers, such as gelatin, particularly during processing in aqueous alkaline solutions. The term "diffusible" has the converse meaning.

Preferably the colorless, the colored and the development inhibitor-releasing couplers utilized herein are ballasted. That is, the coupler contains an organic radical of such molecular size and configuration as to render the coupler nondiffusible in the element and when the element is processed in alkaline developing solutions. The organic ballasting radical is chosen so that it does not exercise any detrimental effects on the photographic material. The use of colorless, colored and DIR couplers in photographic elements is described in detail in Barr et al U.S. Pat. No. 3,227,554 and Groet and Salminen U.S. Pat. No. 3,703,375.

Another class of preferred hydrophobic materials useful in the practice of this invention includes hydrophobic ultraviolet absorbing compounds. Ultraviolet absorbing compounds are well known to ordinarily skilled photographic surface coating and polymer chemists and are described in detail in some of the publications referred to in Product Licensing Index, Vol. 92, 109(1971) and also in U.S. Pat. Nos. 3,687,671; 3,706,700; 2,739,888; 3,652,284; 3,468,897; and U.S. Ser. No. 506,913 of Weber and Heseltine filed Sept. 17, 1974. Some typical, non-limiting examples of hydrophobic ultraviolet absorbing compounds are as follows:

A. Substituted 4-thiazolidones which can be represented by the following general formula:

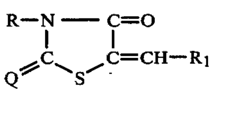

(XI)

wherein R represents a hydrogen atom, an alkyl group (e.g. methyl, ethyl, β-hydroxyethyl, β-diethoxyethyl, propyl, isopropyl, butyl, isobutyl, amyl, hexyl, heptyl, octyl, nonyl, decyl, lauryl, cetyl, etc.), a cycloalkyl group (e.g. cyclopentyl, cyclohexyl, etc.), an aryl group (e.g. phenyl, o-, m-, and p-tolyl, o-, m-, and p-ethylphenyl, p-isopropylphenyl, p-amylphenyl, o-, m- and p-methoxyphenyl, o-, m- and p-ethoxyphenyl, β-hydroxyethylphenyl, o-, m- and p-chlorophenyl, o-, m-, and p-hydroxyphenyl, o-carbobutoxyphenyl, diamylphenoxyacetoacetoxyphenyl, etc.), group (e.g., benzyl, β-phenylethyl, α-phenylethyl, etc.), $R_1$ represents an aryl group (e.g. those aryl groups defined above wherein R is an aryl group), and Q represents a divalent, non-metallic atom (e.g. oxygen, sulfur, etc.) or imino radical (e.g., imino, phenylimino, o-, m- and p-chlorophenylimino, o-, m- and p-tolylimino, o-, m- and p-ethylphenyl imino, p-amylphenylimino, o-, m- and p-ethoxy-phenylimino, etc.).

Specific representative, but not limiting examples of hydrophobic 4-thiazolidone ultraviolet absorbers which can be used in this invention include the following:

1. 5-benzylidene-3-ethyl-2-phenylimino-4-thiazolidone
2. 5-p-anisal-3-phenyl-2-phenylimino-4-thiazolidone
3. 5-benzylidene-3-phenyl-2-phenylimino-4-thiazolidone
4. 5-o-chlorobenzylidene-3-phenyl-2-phenylimino-4-thiazolidone
5. 5-p-methylbenzylidene-3-phenyl-2-phenylimino-4-thiazolidone
6. 5-benzylidene-2-phenylimino-4-thiazolidone
7. 3-phenyl-2-phenylimino-5-salicylal-4-thiazolidone
8. 3-phenyl-2-phenylimino-5-vanillal-4-thiazolidone
9. 5-benzylidene-3-ethyl-2-p-tolylimino-4-thiazolidone
10. 5-m-nitrobenzylidene-3-phenyl-2-phenylimino-4-thiazolidone
11. 3-phenyl-2-phenylimino-5-piperonal-4-thiazolidone
12. 5-benzylidene-3-ethylrhodanine
13. 3-n-amyl-5-benzylidene-2-m-tolyimino-4-thiazolidone
14. 5-benzylidene-2-imino-3-p-phenoxyphenyl-4-thiazolidone
15. 5-benzylidene-3-methyl-2,4-thiazolidinedione
16. 5-benzylidene-3-hexadecyl-2-phenylimino-4-thiazolidone
17. 2-(2,6-diethylphenylimino)-2-hexadecyl-5-(2-methoxybenzylidene)-4-thiazolidone
18. 2-(2,6-diethylphenylimino)-3-hexadecyl-5-(2-methylbenzylidene)-4-thiazolidone
19. 3-(2,6-diethylphenyl)-2-(2,6-diethylphenylimino)-5-(4-dodecylbenzylidene)4-thiazolidone
20. 2-(2,6-diethylphenylimino)-5-(2,5-dimethylbenzylidene)-3-(3,5-dimethylphenyl)-4-thiazolidone
21. 5-[3,(2,4-ditertiaryamylphenoxyacetoxy)-benzylidene]-3-phenyl-2-phenylimino-4-thiazolidone
22. o-(carbobutoxybenzylidene)-3-phenyl-2-phenylimino-4-thiazolidone
23. 3-p-tertiaryamylphenyl-2-p-tertiaryamylphenylimino-5-benzylidene-4-thiazolidone B. Hydrophobic ultraviolet absorbers of the 2-(2-hydroxyphenyl)benzotriazoles series having the following representative general formula:

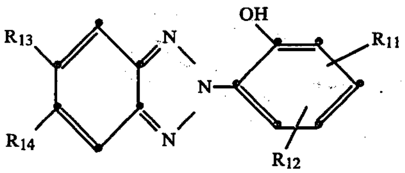

(XII)

as described in U.S. Pat. Nos. 3,004,896; 3,253,921; and 3,687,671 of Agfa Gevaert wherein $R_{11}$ or $R_{12}$ represents hydrogen, alkyl or alkoxy with preferably up to 18 carbon atoms, cycloalkyl such as cyclopentyl or cyclohexyl, or halogen such as chlorine or bromine; $R_{13}$ or $R_{14}$ stands for hydrogen or halogen such as a chlorine or bromine atom, alkyl with up to 18 carbon atoms or alkoxy with preferably up to 18 carbon atoms. Specific representative but not limiting examples of suitable hydrophobic UV absorbers which can be used in the invention include the following:

1.

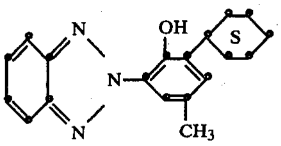

-continued

2.

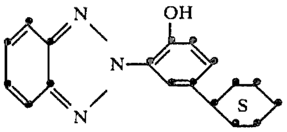

3.

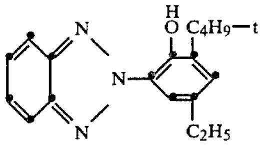

4.

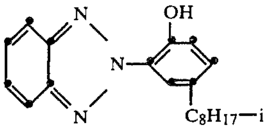

5.

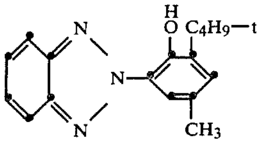

6.

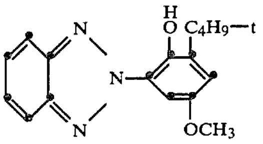

7.

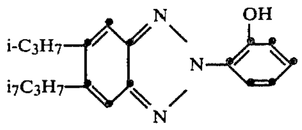

8.

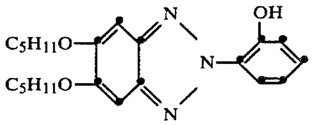

9.

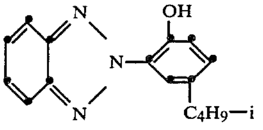

10.

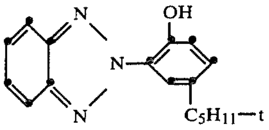

11.

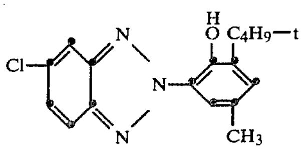

-continued

12.

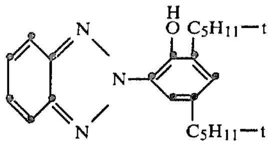

C. Hydrophobic methine dyes, such as described in U.S. Pat. No. 3,652,284 of Oliver, comprising a five-to-six-membered nitrogen containing heterocyclic nucleus of the type used in cyanine dyes substituted on a carbon atom thereof by a member selected from those consisting of a 3,3-bis(alkylsulfonyl)allylidene group, a 5,5-bis(alkylsulfonyl)-2,4-pentadienylidene group, a 3,3-diaryloxysulfonylallylidene group and a 5,5-diaryloxysulfonyl-2,4-pentadienylidene group can also be used in the practice of the invention as described.

Specific, but not limiting examples are as follows: 2-[3,3-bis(methylsulfonyl)allylidene]-3-ethylbenzoxazoline; 2-[3,3-bis(methylsulfonyl)allylidene]-3-methylthiazolidine; 2-[3,3-bis(heptylsulfonyl)allylidene]-2-ethylbenzoxazoline; 3-ethyl-2-(3,3-diphenoxysulfonylallylidene)benzoxazoline; 3-methyl-2-(3,3-diphenoxysulfonylallylidene)thiazolidine; bis[bis(methylsulfonyl)methane]trimethine oxonol, sodium salt; and bis(diphenylmethanedisulfonate)-trimethine oxonol, pyridine salt.

Hydrophobic merocyanine dyes, such as described in U.S. Pat. No. 3,486,897 of Oliver, having the following general formula:

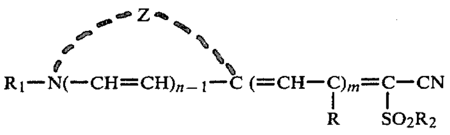

(XIII)

wherein n and m each represents a positive integer of from 1 to 2, R represents a member selected from the group consisting of a hydrogen atom, an alkyl group, a monocyclic aryl group and an aralkyl group, $R_1$ represents a member selected from the group consisting of an alcohol radical and an aryl group, $R_2$ represents a member selected from the group consisting of an alkyl group, an aryl group, an aralkyl group, an oxazolyl group, a benzoxazolyl group, a pyridyl group, a quinolyl group, an imidazolyl group and a benzimidazolyl group, and Z represents the nometallic atoms required to complete a 5- to 6-membered heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus, a benzimidazole nucleus, and a naphthimidazole nucleus.

Specific but not limiting examples are as follows:
2-(3-cyano-3-dodecylsulfonylallyilidene)-3-ethylthiazolidine and
2-(3-cyano-3-dodecylsulfonylallylidene)-3-ethylbenzoxazoline.

D. Hydrophobic 1-amino-4-cyano-1,3-butadienes such as described in U.S. Patent Applications Ser. Nos. 506,913 and 641,788 of Weber and Heseltine, filed Sept. 17, 1974 and Dec. 18, 1975, respectively, having the following general formula can also be used in the practice of the invention:

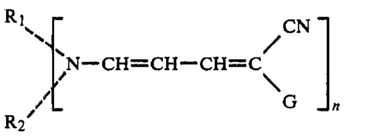

(XIV)

wherein n is 1 or 2, when n is 1, $R_1$ and $R_2$ can be independently chosen to represent hydrogen, an alkyl group of 1 to 10 carbon atoms, an aryl group of 6 to 20 carbon atoms, or a cyclic alkyl group of 5 or 6 carbon atoms, provided that $R_1$ and $R_2$ cannot both be hydrogen, or $R_1$ and $R_2$ taken together represent the atoms necessary to complete a cyclic amino group and when n is 2 at least one of $R_1$ and $R_2$ can be alkylene or arylene, and G represents an electron withdrawing group.

Representative examples of such ultraviolet absorbing compounds of the following formula:

(1) 3-dibutylaminoallylidenemalononitrile
(2) 3-dihexylaminoallylidenemalononitrile
(3) 3-tert-butylaminoallylidenemalononitrile
(4) 3-diisobutylaminoallylidenemalononitrile
(5) 3-di-sec-butylaminoallylidenemalononitrile
(6) 3-(hexahydro-1-azepinyl)allylidenemalonitrile
(7) 3-[N-(n-butyl)-N-(cyanomethyl)amino]allylidenemalononitrile
(8) 3-[N,N-bis-(2,2-diethoxyethyl)amino]allylidenemalononitrile
(9) 3-(N-methyl-N-cyanomethylamino)allylidenemalononitrile
(10) 3,3'-(1,4-piperazinediyl)bis(allylidenemalononitrile)
(11) 3,3'-(N,N'-diethylhexyldiamino)bis(allylidenemalononitrile)
(12) 3-[N,N-bis(2-cyanoethyl)amino]allylidenemalononitrile
(13) 3-morpholinoallylidene(methylsulfonyl)acetonitrile
(14) 3-morpholinoallylidene-(4-tert-butylphenylsulfonyl)acetonitrile
(15) 3-piperazinoallylidene-(4-tert-butylphenylsulfonyl-)acetonitrile
(16) 3-methylpiperazinoallylidene-(4-tert-butylphenylsulfonyl)acetonitrile Non-limiting examples of other hydrophobic materials that can be present in the photographically useful loaded latex compositions of this invention include hydrophobic photographic dyes, such as hydrophobic sensitizing and desensitizing dyes and hydrophobic antihalation and filter dyes. Examples of such photographic dyes, e.g. cyanine dyes, merocyanine dyes, hemicyanine dyes and oxonol dyes, are well known in the photographic art and are described in detail in some of the publications referred to in *Product Licensing Index*, Vol. 92, pages 108–109, December, 1971 and in U.S. Pat. Nos. 2,751,298 and 3,506,443. Some typical, non-limiting examples of hydrophobic photographic dyes of these types that can be used successfully in the practice of this invention are as follows:

1. 3,3'-diethyl-9-methylthiacarbocyanine bromide
2. anyhdro-3,9-diethyl-5,5'-dimethoxy-3'-(3-sulfopropyl)thiocarbocyanine hydroxide
3. 6,6-dichloro-1,1',3,3'-tetraphenylimidazo-[4,5-b]quinoxalino carbocyanine p-toluenesulfonate
4. 5-[(5,6-dichloro-1-β-diethlaminoethyl-3-ethyl-2-benzimidazolinylidene)ethylidene]-3-ethylrhodanine
5. 5-p-diethylaminobenzylidene-2-thiobarbituric acid
6. 5-m-nitrobenzylidenerhodanine
7. 3-ethyl-5-[(3-ethyl-2-benzoxazolinylidene)ethylidene]-1-phenyl-2-thiohydantoin
8. 3-ethyl-5-[(3ethyl-2-benzothiazolinylidene)isopropylidene]-2-thio-2,4-oxozolidinedione
9. 3-ethyl-5-(3-piperidineallylidene)rhodanine
10. 3,3'-diethyloxatricarbocyanine iodide
11. 2-(p-diethylaminostyryl)benzothiazole
12. bis[3-methyl-1-(p-sulfophenyl)-2-pyrazolin-5-one-(4)]methineoxonol
13. 5-[(3-ethyl-2-benzoxazolinylidene)ethylidene]-3-heptyl-1-phenyl-2-thiohydantoin
14. bis[3-methyl-1-(p-sulfophenyl)-2-pyrazolin-5-one-(4)]trimethineoxonol
15. 1,1',2,2'-tetramethyl-3,3'-indolocarbocyanine iodide
16. bis[1,3-diethyl-2-thiobarbituric acid-(5)]pentamineoxonol
17. diethyl[(3-ethyl-2-benzothiazolinylidene)ethylidene]-malonate
18. 3-ethyl-2-[2-(p-tolylimino)propylidene]-naphtho[1,2]-thiazole
19. 4-(3-ethyl-2-benzothiazolinylidene)-3-methyl-1-(4-sulfophenyl)-2-pyrazolin-5-one
20. 3-β-carboxyethyl-5-chloro-2-p-dimethyl-amino-styrylbenzothiazolium iodide
21. 3-(2-carboxyethyl)-2-p-dimethylamino-styryl-6-nitrobenzothiazolium iodide
22. 9-ethyl-3,3'-dimethylthia-2-carbocyanine iodide
23. α-(p-diethylaminobenzylidene)-α-(3,4-dihydroxybenzoylacetonitrile
24. 2-p-dimethylaminostyryl-4,5-dihydro-3H-pyrrolinine ethiodide
25. 3-ethyl-2-[3-(3-ethyl-2-benzothiazolinylidene)-2-phenylpropenyl]-5-[(3-ethyl-2-benzoxazolinylidene)ethylidene]-4-oxo-2-thiazolinium bromide
26. anhydro-3-ethyl-9-methyl-3'-(4-sulfobutyl)-thia-carbonocyanine hydroxide
27. bis(1-butyl-3-carboxymethyl-5-barbituric acid)pentamethineoxonol Another class of preferred photographically useful loaded latex compositions of this invention contain dye image-forming materials of the type used in color diffusion transfer systems as their major non-polymeric hydrophobe component. Dye developing agents and redox dye-releasers represent preferred dye image-forming materials of this type. Such materials are useful in color diffusion transfer systems, such as those described in Canadian Pat. No. 602,607; U.S. Pat. Nos. 3,443,939; 3,443,940; 3,443,941; 3,725,062; 3,415,644; 3,415,645; 3,415,646; 3,647,437; and 3,635,707; and Belgian Pat. Nos. 757,959 and 757,960; U.S. Patent Application Ser. No. 534,966, filed Dec. 20, 1975 of Hinshaw and U.S. Patent Application B351,673 of Fleckenstein et al, published Jan. 28, 1975. Hydrophobic dye image-forming materials of the type disclosed therein are useful in the practice of my process. Representative, but non-limiting examples of dye image-forming materials useful as hydrophobes herein are as follows:

1. 2-chloro-5-n-pentadecyl-3-(p-phenylazophenoxy)hydroquinone
2. 2,6-dichloro-3-(p-phenylazophenoxy)-5-(n-pentadecyl)hydroquinone
3. 1-hydroxy-4-[4-(1-hydroxy-4-isopropoxy-3-naphthylazo)benzenesulfonamido]-2-[γ-(2,4-di-tert-amylphenoxy)n-butyl]naphthamide
4.
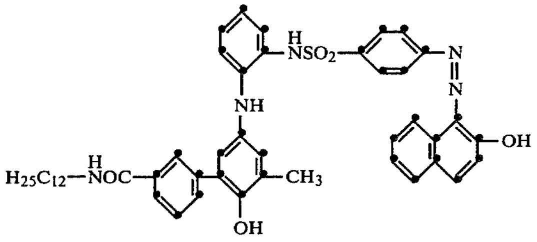
5.
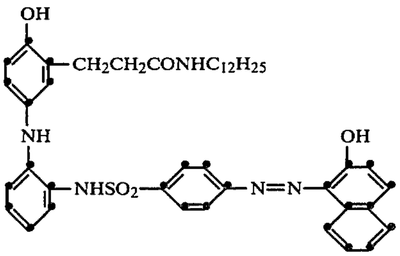
6.
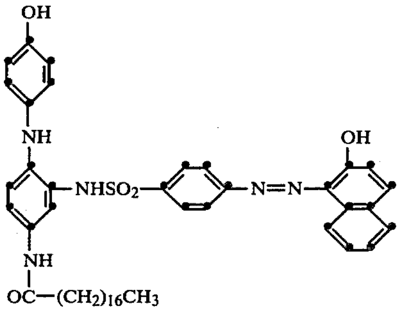
7.
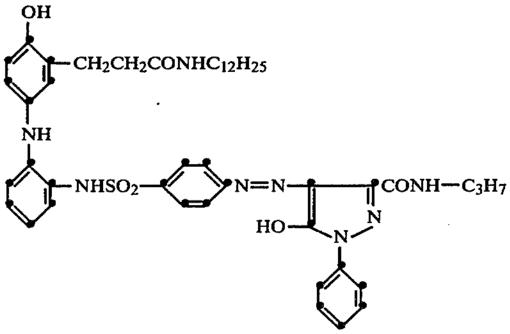
8.
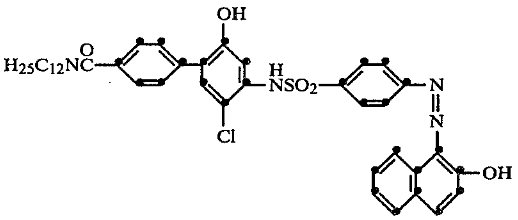
-continued
9.
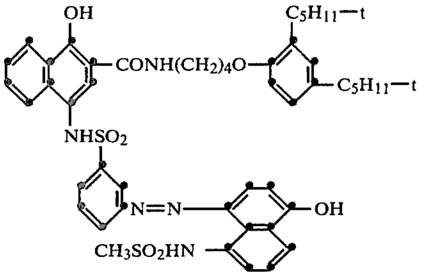
10.
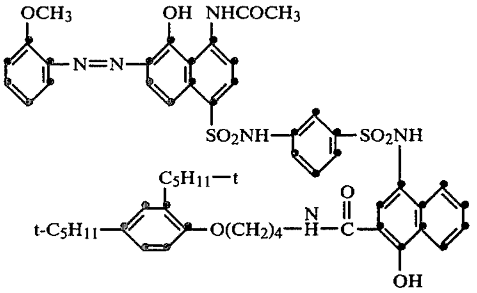
11.
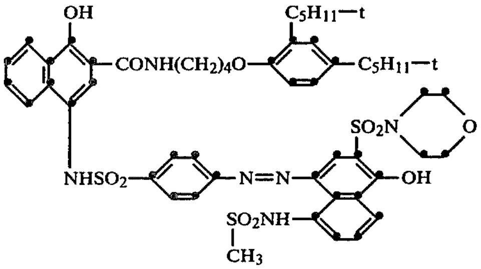
12.
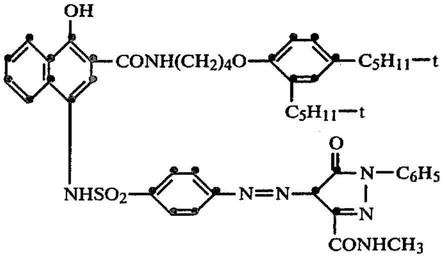
13.
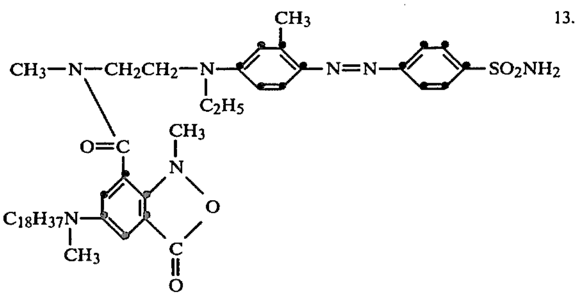

-continued
14.
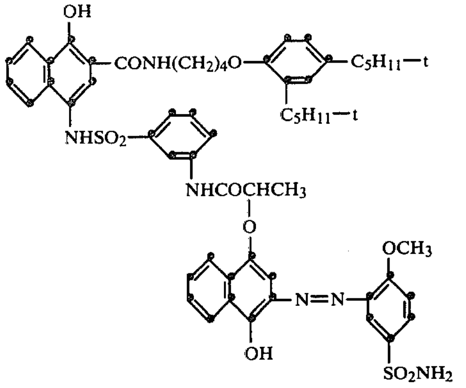
15.
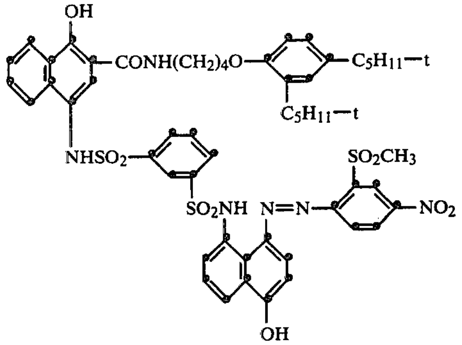
16.
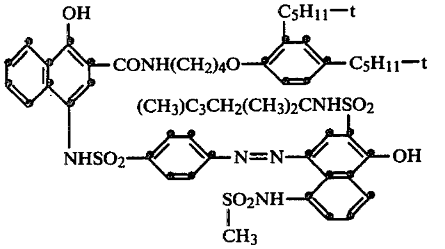
17.
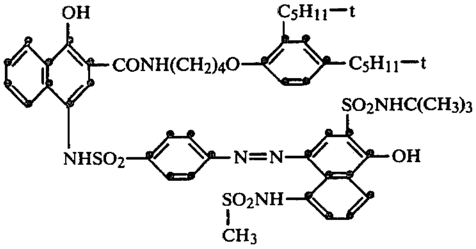
18.
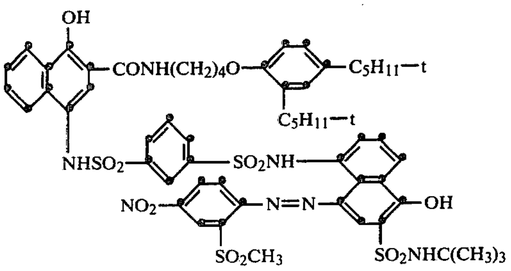
-continued
19.
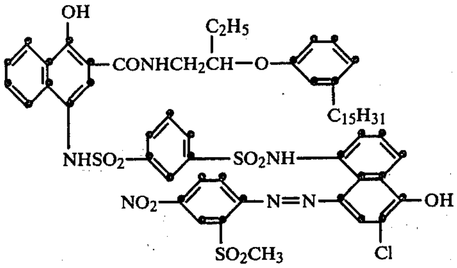
20.
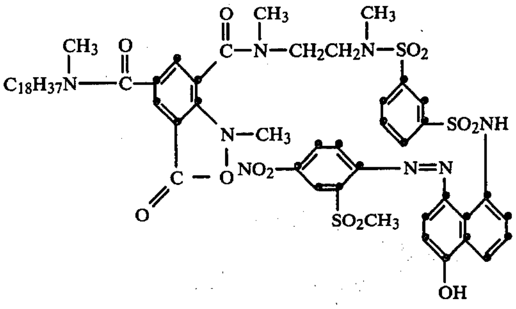
21.
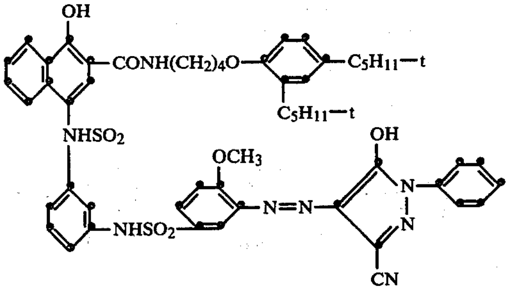
22.
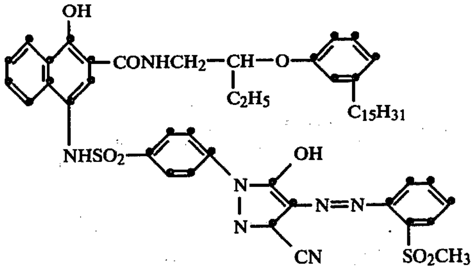
23. 3-[4-(1-phenyl-3-methylcarbamoyl-4-pyrazolin-5-onylazo)phenylsulfonyl]-5-pentadecylhydroquinone
24. 2-{{{3-{{γ-{N-[1-(γ-methylsulfonamido-propylamino)-4-anthraquinonyl]amino}propylcarbamyl}}phenylsulfonyl}}}-5-pentadecylhydroquinone
25.
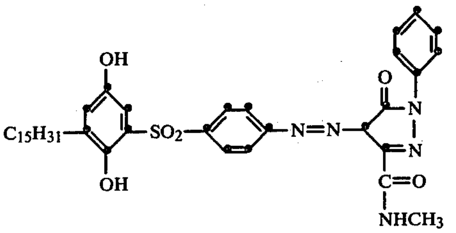

-continued

26.

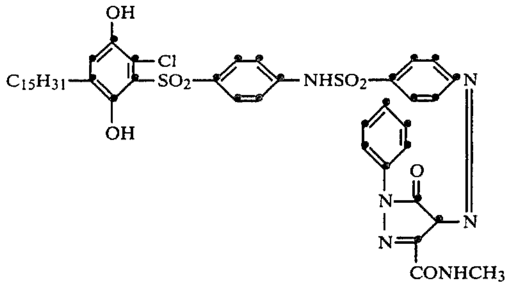

27.*

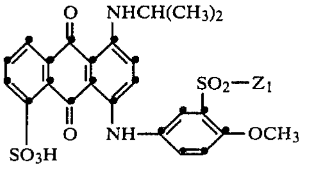

28.*

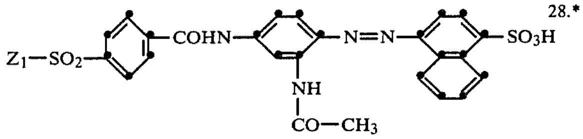

29.*

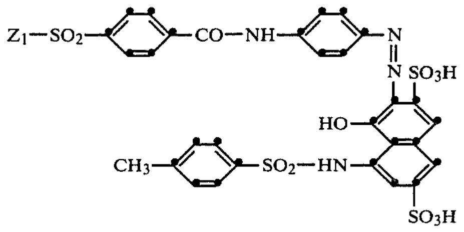

30.

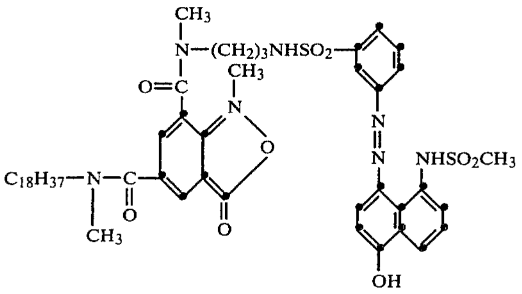

-continued

31.

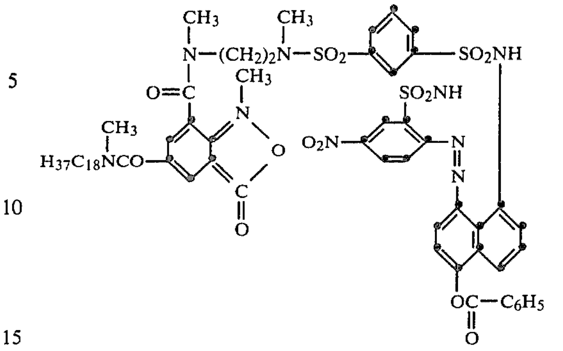

*$Z_1$ =

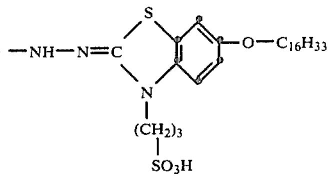

Another class of preferred hydrophobic materials useful in the practice of this invention includes hydrophobic developing agents and so-called "Schiff bases" of some of them. Developing agents are well known to chemists ordinarily skilled in photographic processing chemistry. Those which are hydrophobic and which are soluble in one or more water-miscible solvents in accordance with the requirements set out above are useful in the practice of this invention. Many useful hydrophobic developing agents are described in some of the publications referred to in *Product Licensing Index,* Vol. 92, p. 110 (1971). Some typical, non-limiting examples of such useful hydrophobic materials include substituted ascorbic acids such as isopropylidene ascorbic acid and aminophenyl ascorbic acid, and the like; hydrophobic p-aminophenols such as p-benzylaminophenol, p-alpha-aminoethylaminophenol and N-morpholino-p-aminophenol; other useful substituted phenols such as those hydrophobic materials described in U.S. Pat. No. 3,801,321 (e.g., methylene-2,2'-bis(4-methyl-6-t-butylphenol), 4-benzenesulfonamidophenol, as well as the phosphoramidophenol, phosphoramidoaniline; pyrazolidone developing agents, such as 1-phenyl-3-pyrazolidone, 4,4-dimethyl-1-phenyl-3-pyrazolidone and 4-methyl-1-phenyl-3-pyrazolidone and other N-heterocyclic developing agents such as 1-(p-aminophenyl)-3-aminopyrazoline, 4-amino-2-pyrazolin-5-one-3-carboxylic acid, the 2H-azepin-2-ones, and reductone type agents such as those described in U.S. Pat. Nos. 3,672,896 and 3,679,426, including dihydroanhydropiperidine hexose reductone and 2,3-dihydroxy-4,4,5,5-tetramethyl-2-cyclopentene-1-one, and developing materials like 3-benzoyl-6-hydroxycoumarin and 4-hydroxy undecanohydrazide. Useful hydrophobic developing agents also include those hydrophobic bis-beta-naphthols described in U.S. Pat. No. 3,672,904 and U.S. Pat. No. 3,751,249. Also exemplary as useful materials are all of the hydrophobic p-phenylenediamines. Schiff bases of developing agents which are useful in the practice of this invention are those products from the reaction of an aldehyde with an amino developing agent such as a p-aminophenol or a p-phenylenediamine which meet the requirements for hydrophobicity and solubility in water-miscible solvent(s) set out above. Some additional specific examples of useful hydrophobic developing agents are set out below:

| Name | Structure |
|---|---|
| A. Dihydroanhydropiperidine hexose reductone | 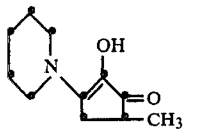 |
| B. Isopropylidene ascorbic acid | 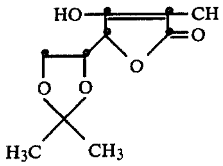 |
| C. 1-Phenyl-3-pyrazolidinone | 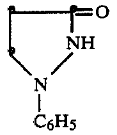 |
| D. 4-Methyl-1-phenyl-3-pyrazolidinone | 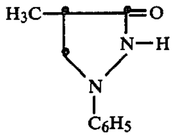 |
| E. 4-Hydroxy-2-oxo-1-phenyl-3-(4-methyl-piperidino)-3-pyrroline | 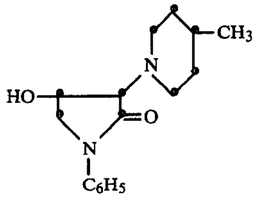 |
| F. 4-Hydroxy-2-oxo-1-phenyl-3-(N,N-diethylamino)-3-pyrroline | 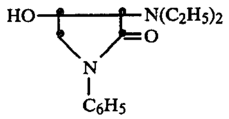 |
| G. 1-Benzyl-4-hydroxy-3-piperidino-1,5,6,7-tetrahydro-2H-azepin-2-one | 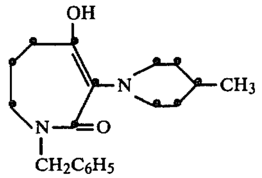 |
| H. 1-Benzyl-4-hydroxy-3-(4'-methylpiperidino)-1,5,6,7-tetrahydro-2H-azepin-2-one | 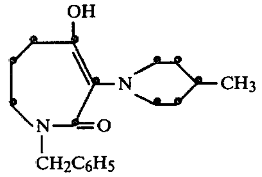 |
| I. 4,4-Dihydroxy-1-methyl-2-propyl-6-pyrimidone | 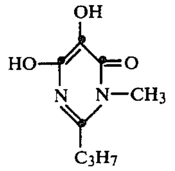 |
| J. 2-Isopropyl-4,4,6-trihydroxypyrimidine | 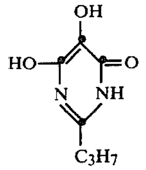 |

-continued

| Name | Structure |
|---|---|
| K. p-Benzylaminophenol | 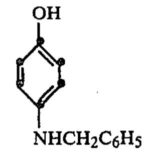 |

It is recognized that silver halide developing agents of the general types described above when ballasted and incorporated in interlayers between silver halide emulsion layers function as reducing agents which scavenge any oxidized silver halide developing agents which may migrate from the emulsion layers into the interlayer. Since the ballasting increases the hydrophobicity of the developing agents, such oxidized developer scavenging agents represent a useful class of hydrophobes which can be employed in the practice of my invention. Exemplary oxidized developer scavenging agents useful herein include those of the type disclosed in Yutzy et al U.S. Pat. No. 2,937,086, issued May 17, 1960, and Weissberger et al U.S. Pat. No. 2,336,327, issued Dec. 7, 1943, which discloses these types of hydrophobes and their use. Preferred hydrophobes of this type are aminophenols and dihydroxybenzenes, especially dihydroxybenzenes in which there is at least one (preferably two) alkyl substituents having a carbon chain of at least five carbon atoms, typically from 5 to 15 carbon atoms.

Exemplary useful aminophenols and dihydroxbenzenes of this type are the following:

(1) 2,5-dimethyl-4-γ-phenylpropylaminophenol,
(2) amyl hydroquinone,
(3) lauryl hydroquinone,
(4) heptyl hydroquinone,
(5) diamylhydroquinone,
(6) dioctylhydroquinone,
(7) 2,5-dihydroxydiphenyl and
(8) 2,5-dihydroxy-4'-amyldiphenyl.

Another class of hydrophobic materials that is useful in the practice of this invention and which is well known in the photographic art encompasses compounds known as "bleachable" dyes which are useful in the so-called "silver-dye-bleach" process. See J. S. Friedman, "History of Color Photography" pp. 405–429 (1944) and A. Meyer, "Journal of Photographic Science", Vol. 13, pp. 90–97 (1965)1. Such "bleachable dyes" include some of the azo dyes, azoxy dyes, xanthene dyes, azine dyes, phenylmethane dyes, nitroso complexes, indigo dyes, quinones, nitro-substituted dyes, phthalocyanines, formazan dyes, and the like. Those which meet the hydrophobicity and solubility (in water-miscible solvent) requirements set out hereinbefore are useful in the practice of this invention. Thus, loaded latex compositions of this invention, wherein the latex has been loaded with one or more bleachable dyes, can readily be used in the manufacture of photographic elements containing layers which can be silver-dye-bleached in the usual manner.

The valuable film products containing the loaded polymeric latex particles of the present invention can readily be identified and distinguished from conventional film products containing physical mixtures of polymer and the hydrophobe by the fact that the loaded polymer particles in the film products appear to retain their identity as being derived from a loaded polymeric latex even after layers containing them have been dried. The hydrophobe is dissolved or distributed in the practice of this process fairly uniformly throughout the particles of polymer and appear to remain distributed through such particles, even though the loaded polymer particles may be dispersed through one or more layers of hydrophilic colloid containing other materials, such as silver halide and the like, coated on a substrate or support and dried conventionally. This contributes to the ease and certainty with which the product of the present process can be distinguished and identified. The identification of products prepared in accordance with the present invention involves the determination (a) that the particles were evidently derived from a latex, and (b) that the hydrophobic material remains physically associated with (distributed through) the loaded polymer particles in the coated articles being analyzed (typically as a solid solution of hydrophobe in polymer). Isolation of the particles, determination of the identity of the polymer, identification of the polymer as being latex derived, and determination of the identity, presence and amount of hydrophobe in the particles is generally within the capability of the skilled analytical chemist.

It is of special interest, in this respect, that certain hydrophobes can effect changes in the glass transition temperature (Tg) of the polymer particles when the hydrophobe is present in the loaded latex compositions of this invention at a sufficient level (depending upon the relative concentrations of loadable polymer and hydrophobe and their respective Tg's). That certain hydrophobes can influence or change the "natural" or expected Tg of the discontinuous phase of some of the loadable polymeric latexes which are useful in the practice of this invention is evidence that in the photographically useful loaded latex compositions of this invention the hydrophobe is distributed through the polymer particles which make up the dispersed phase of such compositions.

Actually the measurement of the Tg of loaded polymer particles obtained by drying loaded latex compositions represents one method for identifying some of the preferred loaded polymeric latex compositions prepared by this invention. Thus, a large number of such preferred compositions have Tg's which differ from the initial or "natural" Tg of the loadable latex polymer by at least about 5° C. The reason that some of such preferred loaded latex compositions do not have Tg's that differ by as much as 5° C. from the natural Tg of the latex polymer is because certain of the hydrophobes may have a glass transition temperature (Tg) very similar to that of the particular latex polymer or because the relative quantity of hydrophobe in the loaded polymer particles of the latex is fairly low. Since the Tg of a homogeneous combination of materials must be between the Tg's of the pure materials, it follows that not all of the loaded latex compositions made in accordance with the process of this invention can exhibit Tg's which differ from the "natural" Tg of the loadable latex polymer by at least about 5° C. However, for a large proportion of the preferred loaded polymeric latex compositions of the present invention, the deviation from the natural Tg by at least several centigrade degrees can be used as one means for identifying compositions as having been manufactured in accordance with the present process.

Methods for measuring Tg of various materials are well known. A preferred method involves the continuous monitoring of the temperature of a test sample in a conventional differential thermal analysis apparatus while heat is gradually added to the sample holder. This temperature is compared with that of an empty sample holder which is being identically heated. Since the sample holder containing the test sample has a higher specific heat than the empty sample holder, the temperature rise of the test sample for a given level of heating will lag that of the empty sample holder. By plotting the temperature of the empty sample holder versus the difference in temperature of the two sample holders a baseline curve is generated. The absolute difference in temperature between the two sample holders is unimportant. What is important is the configuration of the baseline generated with continued heating to higher temperatures. A peak in the baseline (a transient increase in the temperature differential of the test holders) indicates that the test sample is crystallizing; a dip in the baseline indicates melting of the test sample and a baseline shift (a stepped downward displacement of the baseline) is indicative of a glass transition taking place in the test sample. The temperature which corresponds to the mid-portion of the baseline shift is taken as the glass transition temperature, Tg.

In the drawings curve A represents a baseline generated as described above for a test sample consisting essentially of polymeric latex particles loaded according to my process with a cyan color-forming coupler and dispersed in gelatin. Curve B is a baseline generated using as a test sample the same materials in the same proportions, but with the polymer, coupler and gelatin being merely mixed together, rather than being loaded. Since the absolute values of the temperature differentials are of no significance, curves A and B are displaced so that their relative configurations, which is of significance, can be more clearly illustrated. The polymer chosen was one which exhibits a Tg of −42° C. measured in the absence of other materials—i.e. its natural Tg. The cyan color-forming coupler exhibited a natural Tg of +39° C.

Looking first at Curve B, it can be seen that the unloaded polymer particles exhibit a glass transition temperature which corresponds to the natural Tg of the polymer. No coupler Tg is observed, only the melting of the coupler. This indicates that the coupler was present in a crystallized form entirely, since glass transition is a characteristic of amorphous rather than crystalline materials. Using other types of hydrophobes it is possible that all of the hydrophobe may be crystallized, all amorphous or that it may be distributed between these two states.

Comparing Curve A with Curve B, the natural Tg of neither the polymer nor the coupler is in evidence. This has been replaced in Curve A by a Tg of about −15° C. for the mixed coupler-polymer phase formed by the loaded polymer particles. It is to be further noted that the coupler exhibits no melting endotherm in Curve A, since the coupler is entirely in an amorphous form in the coupler-polymer phase.

The two curves appear quite similar in the behavior of the gelatin, exhibiting very similar gelatin Tg's and gelatin-water endotherms. The curves illustrate that the desired comparisons of coupler and polymer properties can be undertaken even in the presence of gelatin. The curve features attributable to gelatin are in fact a function of both the gelatin and water present in the test sample. By varying the water content of the test sample, as by controlling the relative humidity during analysis, the location of the gelatin curve features can be caused to shift to other temperature levels. For example, by reducing the relative humidity during analysis the curve features attributable to gelatin could have been shifted to well above 135° C. and therefore beyond the temperature range of interest.

Some of the valuable results from practicing the present invention are believed attributable to the extremely small particle size of the resulting loaded latex dispersions of hydrophobic materials through the hydrophilic colloid layers of gelatin-containing photographic emulsions and the like. Thus, whereas the average size of coupler dispersion particles, for example, wherein color-forming coupler is dissolved in high boiling solvent and dispersed into a gelatino-silver halide emulsion via a high energy colloid mill, is typically in the range of from about 0.3 to about 0.9 micron or more in diameter, the polymer particles of the photographically useful loadable and loaded polymeric latex compositions of this invention range about an order of magnitude smaller, being within the range of from about 0.02 to about 0.2 micron, and preferably from about 0.02 to about 0.08 micron in diameter. The same numerical ranges are employed to designate typical and preferred polymer particle sizes before and after loading even though the polymer particles may have been swelled to some extent by the ingestion of water-miscible organic solvent by the incorporation of a relatively large proportion of hydrophobic material. For example, in one experiment involving a loadable latex as set out in Example 3 below, the average diameter of charged latex particles was swelled to about 0.186 micron (from an average diameter of 0.117 micron initially) by the incorporation of an equal weight of cyan color-forming coupler, based on the dry weight of polymer in the latex.

Such a very small polymer particle size may account at least partially for the observation that the use of the color-forming coupler-loaded compositions of this invention results in the formation of photographic hydrophilic colloid layers having a much more uniform distribution of coupler-formed imaging dye therethrough than has heretofore been observed. It is believed that the particular physico-chemical condition of the color-forming coupler material in such coupler-loaded polymeric latex compositions also contributes in some as yet unexplained way to such valuable results. For example, it is believed surprising that photographic elements containing layers of emulsions which in turn contain coupler-loaded polymer particles derived from loaded polymeric latex compositions of this invention (and essentially no high boiling conventional coupler solvent) can be developed using color developing compositions that do not contain organic solvents such as benzyl alcohol. This is surprising because heretofore the use of organic solvents was believed necessary to develop efficiently photographic elements that contained color-forming coupler in the absence of high boiling coupler solvent.

Another of the valuable aspects of the present process relates to the alleviation or reduction of pressure and/or stress sensitivity in certain photographic products. This kind of problem is described in J. Soc. Phot., Japan, 22(3), pp. 135–138 (1959); J. Phot. Sci., Vol. 21, pp. 32–38 (1973); J. Phot. Sci., Vol. 21, pp. 221–226 (1973); and Research Disclosure, Vol. 116, pp. 135–137 (1973). The use of hydrophobe-loaded latex compositions in place of conventional solutions of the hydrophobe(s) in the manufacture of photographic products in which such problems had existed can diminish or even eliminate such problems. For example, dyes which have been incorporated as a latex dispersion do not migrate as readily along fracture lines in a photographic element which has been subjected to pressure and/or stress.

Distributing Vehicles

In various applications of this invention vehicles are employed to distribute the loaded polymeric latexes and to provide a medium in which additional loading can be undertaken. The loaded latexes of this invention are generally useful in combination with conventional photographic vehicles, particularly hydrophilic colloid containing photographic vehicles.

As is generally recognized by those skilled in the photographic arts, silver halide emulsion layers and other layers on photographic elements can contain various colloids alone or in combination as vehicles. Suitable hydrophilic vehicle materials include both naturally-occurring substances such as proteins, for example, gelatin, gelatin derivatives, cellulose derivatives, polysaccharides such as dextran, gum arabic and the like; and synthetic polymeric substances such as water soluble polyvinyl compounds like poly(-vinylpyrrolidone), acrylamide polymers and the like. Photographic emulsion layers and other layers of photographic elements such as overcoat layers, interlayers and subbing layers, as well as receiving layers in image transfer elements can also contain alone or, more commonly, in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al U.S. Pat. No. 3,062,674 issued Nov. 6, 1962; Houck et al U.S. Pat. No. 3,220,844 issued Nov. 30, 1965; Ream et al U.S. Pat. No. 3,287,789 issued Nov. 22, 1966; and Dykstra U.S. Pat. No. 3,411,911 issued Nov. 19, 1968. Other vehicle materials include those water-insoluble polymers of alkyl acrylates and methacrylates, acrylic acid, sulfoalkyl acrylates or methacrylates, those which have cross-linking sites which facilitate hardening or curing as described in Smith U.S. Pat. No. 3,488,708 issued Jan. 6, 1970, and those having recurring sulfobetaine units as described in Dykstra Canadian Pat. No. 774,054.

Loading Procedures

The starting materials for the practice of my process are (1) an aqueous latex consisting essentially of water as a continuous phase and loadable polymer particles as a dispersed phase and (2) a water-miscible organic solvent having a hydrophobe dissolved therein. As previously indicated, the aqueous latex contains at least 2 percent by weight, based on total weight, of loadable polymer particles, preferably from about 10 to 20 percent by weight loadable polymer particles, based on total weight. The hydrophobe is dissolved in the water-miscible organic solvent in a concentration in the range of from 0.1 to 20 percent by weight, based on total weight, preferably 2 to 20 percent by weight, based on total weight.

The first step of my process is to blend the above starting materials so that a resulting composition in which the hydrophobe remains in solution and the polymer particles remain dispersed as in the starting aqueous latex. The object is to achieve blending with the hydrophobe remaining dissolved and the latex polymer particles remaining dispersed. This will allow an intimate association of the polymer particles to be loaded with the hydrophobe. Any blending technique which will achieve this desired result can be employed in the practice of my process. There are many different parameters which will contribute to successful blending without coagulation of the hydrophobe or polymer particles. For example, increasing the rate of stirring during blending generally decreases the tendency of either the hydrophobe or polymer particles to coagulate. Increasing the temperature of the starting materials also tends to reduce any tendency toward coagulation. Increasing the proportion of water tends to increase any tendency of the hydrophobe to coagulate, but reduces any tendency of the polymer particles to coagulate. On the other hand, using a higher proportion of water-miscible organic solvent can have the effect of increasing any tendency of the polymer particles to coagulate while reducing any tendency of the hydrophobe to coagulate. It is generally desirable to avoid even incipient coagulation, since once coagulation of either the hydrophobe or polymer particles begins substantially all of the coagulating material will separate out as a precipitate. Techniques for avoiding precipitation when blending materials are, of course, generally well understood by those skilled in the chemical arts.

A preferred technique for blending is to stir rapidly or otherwise produce turbulence in the water-miscible organic solvent containing dissolved hydrophobe. The aqueous latex containing the dispersed polymer particles is then added to the water-miscible organic solvent at a limited rate. The rate of addition of the aqueous latex is controlled so that the volume of aqueous latex added per second to the water-miscible organic solvent containing dissolved hydrophobe is less than 20% of the initial volume of the water-miscible organic solvent with dissolved hydrophobe, preferably less than 10%. Reversing the order of addition so that the water-miscible organic solvent containing hydrophobe is gradually added to the aqueous latex results in coagulation. If the reverse order of addition is contemplated, avoiding coagulation requires a high rate of blending so that the hydrophobe at all times is in a liquid phase which contains a solubility increasing amount of water-miscible organic solvent. Substantially instantaneous blending of the aqueous latex and water-miscible organic solvent with dissolved hydrophobe while maintaining both in a highly turbulent state would be an ideal approach to achieving reverse order blending without coagulation.

During blending the dispersed polymer particles of the aqueous latex and the dissolved hydrophobe are brought into intimate contact. The loadable polymer particles act as a competing solvent for the hydrophobe so that a portion of the hydrophobe is loaded into the polymer particles. As the proportion of water is increased in the liquid phase of the composition the equilibrium distribution of the hydrophobe between the polymer particles and the liquid phase is driven or shifted toward the polymer particles. In other words, as the hydrophilic character of the liquid phase increases, the solubility of the hydrophobe therein is reduced and the solubility of the hydrophobe in the polymer particles is, by comparison, increased.

Generally the proportion of aqueous latex added to the water-miscible organic solvent containing hydrophobe is maintained in the volume ratio of 1:4 to 4:1, preferably 1:2 to 2:1. Not all of the water added, however, need be present in the aqueous latex. It is contemplated that a portion of the water which might be blended in the aqueous latex can be added subsequent to blending the aqueous latex and water-miscible organic solvent. This reduces the amount of water being introduced initially while achieving finally the same proportion of water in the resulting composition and the same equilibrium distribution of hydrophobe between the polymer particles and liquid phase. It is also recognized that a portion of the water-miscible organic solvent can be initially present in the aqueous latex to be blended, and that this would have the effect of initially reducing any tendency of the hydrophobe to coagulate. Before blending is undertaken no more than 20% by weight, preferably less than 10% by weight of water or water-miscible organic solvent should be present in the hydrophobe containing water-miscible organic solvent or aqueous latex, respectively.

Dilution of the liquid phase with water beyond the proportions indicated to drive further the equilibrium distribution of the hydrophobe toward the polymer particles would appear attractive in terms of loading, but it is preferred to maintain the proportion of water within the indicated limits where the ultimate use for the loaded polymeric latex composition requires removal of water, as in photographic coating applications.

Upon completion of the blending step a loaded polymeric latex composition is produced in which a substantial fraction of the hydrophobe is dissolved or minutely distributed within the polymer particles. This loaded latex composition can be used for many different applications, even though a substantial proportion of the hydrophobe remains in the liquid phase of the composition rather than being loaded into the polymer particles.

I prefer to further increase the loading of the polymer particles by removing from the loaded polymeric latex composition at least a major portion—i.e. at least about 50 percent—of the water-miscible organic solvent. The removal of the water-miscible organic solvent can be undertaken by any convenient conventional technique. One convenient technique is to evaporate the water-miscible organic solvent at ambient conditions or at elevated temperatures and/or reduced pressures. The removal of the water-miscible organic solvent further increases the hydrophilic or aqueous character of the liquid medium and further drives the equilibrium distribution of the hydrophobe toward to the polymer particles and away from the liquid phase. In this way, additional loading of the polymer particles is achieved. According to a preferred technique the water-miscible organic solvent is selectively removed by distillation with only a small amount of water being removed, usually only near the end of distillation.

Alternative arrangements for removing water-miscible organic solvents can be undertaken and may be particularly attractive where the water-miscible solvent can not be readily separated by evaporation. For example, one separation approach which can be relied upon to remove water-miscible organic solvents and other liquid phase impurities which may be present is ultrafiltration. Ultrafiltration membranes and equipment which can be employed are disclosed in U.S. Pat. Nos. 3,762,135; 3,789,993; 3,824,299; 3,894,166; 3,645,938; 3,592,672; and 3,527,853, among others. Ultrafiltration procedures are discussed by M. C. Porter in *Ultrafiltration of Colloidal Suspension,* AIChE Symposium Series No. 120, Vol. 68, 21–30 (1972); G. J. Fallick in *Industrial Ultrafiltration,* pp. 29–34, Process Biochemistry, September 1969; R. L. Goldsmith in *Macromolecular Ultrafiltration with Mi*croporous Membranes, pp. 113–120, Ind. Eng. Chem. Fundam, Vol. 10, No. 1, 1971; M. C. Porter and A. S. Michaels in two articles, both titled *Membrane Ultra*filtration, pp. 56–64, January, 1971 and pp. 440–445, July, 1971, Chem. Tech. Water will be removed along with the water-miscible organic solvent and other lower molecular weight impurities present. The proportion of water to water-miscible organic solvent will vary, depending upon such parameters as the relative molecular weight and proportion of the water-miscible organic solvent. Water can, of course, be added during or after ultrafiltration to avoid excessive concentration of the latex particles.

For photographic applications I prefer to employ loaded latex compositions containing polymer particles wherein at least about 2 percent by weight, based on total weight, of the polymer is derived from monomers capable of forming water soluble homopolymers, as has been discussed above. Polymer particles of this type are chosen to render them readily dispersible in hydrophilic colloids, particularly conventional hydrophilic colloid photographic vehicles, such as gelatin. The hydrophilic colloid acts as a peptizer for the polymer particles so that any tendency of the loaded polymer particles to settle out of the composition is reduced. In preparing photographic coating compositions I contemplate blending the loaded polymer particles and hydrophilic colloid in a weight ratio of from 1:20 to 20:1, preferably from about 1:5 to 5:1.

According to a preferred technique for practicing my process the hydrophilic colloid is dispersed in the loaded polymeric latex composition formed by the initial blending step. It is recognized, however, that the hydrophilic colloid or at least a portion of it can be present in the aqueous latex or otherwise concurrently introduced during the initial blending step. The presence of the hydrophilic colloid will reduce only slightly the amount of hydrophobe loaded during initial blending, but offers a very positive peptizing action on the polymer particles which resists coagulation of these particles.

Once a peptizing amount of hydrophilic colloid has been associated with the loaded polymeric particles of the latex it is possible to remove water-miscible organic solvents and other water soluble impurities present using coagulation washing techniques, such as those conventionally employed in washing silver halide emulsions. By having a peptizer present it is possible to coagulate the solids contained within the loaded polymeric latex composition and to thereafter redisperse the loaded polymer particles in the form of a latex. Techniques for coagulation washing which can be employed in the practice of my process are disclosed in U.S. Pat. Nos. 2,618,556; 2,614,928; 2,565,418; 3,241,969 and 2,489,341.

According to one specifically preferred technique of removing water-miscible organic solvents and other water soluble impurities by coagulation washing, I employ a peptizer, such as phthalated gelatin. Precipitation of the gelatin from solution bringing with it the peptized loaded polymer particles is brought about by lowering the pH of the liquid phase of the loaded latex. The supernatant liquid is next separated from the coagulated solids, as by decanting, washed with water and the latex reconstituted by adjusting the pH upwardly using a deprotonating agent, such as a base or sodium citrate. This procedure for separating water-miscible organic solvent is preferably employed where only a peptizing amount of hydrophilic colloid, such as gelatin is present, and before the larger amounts of hydrophilic colloid are added necessary to form a coating composition. This procedure for removing water-miscible organic solvent can, of course, be employed at any stage between loading and peptizing of the polymer particles and coating of the loaded polymeric latex composition.

The loaded polymeric latex compositions with hydrophilic colloid dispersed therein can be coated onto a useful substrate, such as a conventional photographic support, using conventional techniques. It is specifically contemplated to coat compositions of this type containing photographic hydrophobes using coating hoppers and other apparatus conventionally employed in the photographic arts for forming single or multiple coatings on photographic supports. Useful coating techniques and supports are described in the Product Licensing Index, vol. 92, pp. 107–110, Dec. 1971, and the publications referred to therein.

The coating composition can include various conventional photographic materials and addenda in addition to the hydrophilic colloid, loaded polymer particles, water, etc. Where the loaded polymer particles are intended to be coated in the photographic emulsion layer of a photographic element, for example, the coating composition can take the form of a silver halide emulsion containing in addition to the materials noted above silver halide grains, as well as various conventional silver halide addenda, such as antifoggants, hardeners, sensitizers, etc. Exemplary types of such photographic addenda are disclosed in PLI, vol. 92, supra. In a preferred form the coating composition is a gelatino-silver halide emulsion containing the polymer particles dispersed therein and loaded with at least one photographic hydrophobe. After coating sufficient water is removed to form a solid coating—typically at least about half of the water present in the coating composition and preferably about 80 percent by weight of the water is removed.

The present process for manufacturing loaded latex compositions and for incorporating the resulting composition into a layer which contains at least one hydrophilic colloid, can be practiced at temperatures ranging from about 0° C. to about 40° C. or more. Where a hydrophilic colloid is being employed having a highly temperature dependent viscosity, such as gelatin, elevating and lowering temperature is recognized in the art to be a useful tool in solubilizing, coating and setting the hydrophilic colloid. It is generally preferred to carry out the hydrophobic loading steps of the present process at about 25° C. or higher. It has been observed that in certain circumstances, usually when loadable polymeric latexes which contain relatively harder polymeric particles (i.e., those loadable latexes having relatively higher Tg's), the latex particles can be made more receptive to the hydrophobic material if relatively higher temperature, such as about 30° C. or higher are used during the imbibition step of the present process.

It should be understood that the techniques and materials set out below are intended to be merely illustrative of how to make and use the compositions and processes of this invention.

Manufacture of a Loadable Polymeric Latex

The following is intended to illustrate one method for manufacturing some of the preferred loadable latexes of this invention.

Into a solution of the following:

1 g. Triton 770*

0.5 g. potassium peroxydisulfate 0.1 g. sodium pyrosulfite

*alkylaryl polyether sulfate, sodium salt, surfactant sold by Rohm & Haas Co.

in 200 ml water at a temperature of 95° C. in a polymerization flask were simultaneously blended, over a period of 20 minutes with continuous stirring, a mixture of 85 g. secbutyl acrylate plus 5 g. 2-acetoacetoxyethyl methacrylate, a mixture of 10 g. of 3-methacryloyloxypropane-1-sulfonic acid, sodium salt plus 0.15 g. of sodium pyrosulfite, and 100 ml 95° C. water. Stirring was continued for 70 minutes after completion of the addition while the reactants were maintained at a temperature of 95° C. The resulting latex product was cooled and then dialyzed for about 16 hours against flowing distilled water in a conventional dialyzer. The polymer particles formed accounted 9.5 percent by weight of the latex, based on total weight. The latex was "loadable", in accordance with the "Loadable Polymer Particle Test" set out above, By varying the relative amounts of monomeric reactants and water, loadable latexes of varying solids content can be made.

Test of Prior Art Hydrosol

In an attempt to determine whether the latex used by Tong in U.S. Pat. No. 2,772,163 was "loadable" in accordance with the above description, the following test was performed:

Into a container in which 100 ml of acetone was being stirred was gradually, over a period of about 20 seconds, blended an equal volume of an aqueous latex consisting essentially of water as a continuous phase and particles as the dispersed phase. The latex was made by the emulsion polymerization of a mixture of 58.8% n-butyl acrylate, 25.2% styrene and 16% methacrylamide, as in Example 1 of U.S. Pat. No. 2,772,163 and U.S. Pat. No. 2,739,137. The polymer particle content of the latex was 11.8 percent by weight, based on total weight. Within a minute, a large portion of the latex had become agglomerated and settled out of the suspension, thereby indicating that the latex of Tong's Example 1 was not a "loadable polymeric latex" in accordance with this invention.

EXAMPLE 1

To a solution of 10 g. of the yellow color-forming coupler, alpha-4-(4-benzyloxyphenylsulfonyl)-phenoxy-alphapivalyl 2-chloro-5-[gamma-2,4-di-tert-amylphenoxy)butyramido]-acetanilide, dissolved in 160 ml. of acetone was gradually stirred, over about a one-minute period of time, 90 g. of loadable polymer latex like that described above, under the heading Manufacture of a Loadable Polymeric Latex, except that the latex had 11.3% "solids" ("solids" is the residue after drying at 110° C.). The resulting mixture exhibited that no visible coagulation had occurred. After the loadable latex was blended with the coupler solution (thereby forming a compatible blend), most of the acetone was removed by evaporation (in a rotary evaporator at 40° C.). The resulting coupler-loaded latex composition did not coagulate upon storage, and after being coated and dried on a transparent photographic support, yielded a transparent layer. The coupler-loaded latex composition was also compatible with gelatin.

EXAMPLE 2

Example 1 was repeated, except that the magenta color-forming coupler compound in this example was alphapivalyl-alpha-(4-carboxyphenoxy)-2-chloro-5-[gamma-(2,4-di-tert-amylphenoxy)-butyramido]acetanilide. Practically identical results were obtained.

EXAMPLE 3

Example 1 was repeated, except that the coupler compound in this Example was the cyan color-forming coupler, 2-[alpha-(2,4-di-tert-amlphenoxy)-butyramido]-4,6-di-chloro-5-methylphenol. Practically indentical results were obtained.

EXAMPLE 4

Each of the aqueous latexes L-1 through L-85, described above, was tested and found to be a loadable latex according to the Loadable Polymer Particle Test. A sample of each latex having polymer particles formed by a polymer containing at least 2 percent by weight of repeating units derived from a hydrophilic monomer capable of forming a water soluble homopolymer—that is, aqueous latexes L-1 through L-76—was chosen so that 2 grams of polymer were present. The sample was diluted to 30 grams with water and then gradually added to 30 ml of acetone containing 2 grams of the coupler of Example 1. The acetone was then removed using a rotary evaporator. In no instance was coagulation observed, and in each instance a loaded polymeric latex composition was formed according to my process. The polymer particles were all within the general range of from 0.02 to 0.2 micron in average diameter.

EVALUATION IN PHOTOGRAPHIC ELEMENT

Using the coupler-loaded latex compositions from Examples 1, 2 and 3 above, photographic emulsions were prepared by simply manually stirring each of the coupler-loaded latex compositions into appropriately sensitized silver halide emulsions as follows:

A. The loaded latex composition produced in Example 3 was blended into an otherwise conventional red-sensitized gelatino-silver halide emulsion. The resulting emulsion was coated on a conventional photographic polymeric film support to yield a clear, dried layer containing the following ingredients:

coupler = 8.5 mg/dm$^2$
silver = 3.7 mg/dm$^2$
gelatin = 32.1 mg/dm$^2$

B. The coupler-loaded latex composition produced in Example 1, above, was blended into an otherwise conventional blue-sensitive gelatino-silver halide emulsion. The resulting emulsion was coated as in part A, above, to yield a clear, dried layer containing the following ingredients:

coupler = 7.1 mg/dm$^2$
silver = 3.8 mg/dm$^2$
gelatin = 11.7 mg/dm$^2$

C. An emulsion was prepared as in part B above, using the coupler-loaded latex composition of Example 2 with an otherwise conventional green sensitized gelatino-silver halide emulsion.

D. Each of the photographic elements described above was exposed and developed in a conventional manner to determine the relative speed, Dmax, gamma and Dmin of the element. A "control element" prepared by coating and drying the emulsion absent coupler-loaded latex composition but containing the same amounts of the same couplers dissolved in an equal amount of a conventional coupler solvent was evaluated in each instance. To disperse the coupler and coupler solvent in the emulsion the mixture was fed through a Mauton-Gaulin homogenizer at a rate of 50 ml/second. Five separate passes through the homogenizer were made. This produced coupler containing coupler solvent droplets in the general range of from about 0.2 to 2.0 microns in average diameter. Results from developing the exposed elements in the following sequence of steps at 24° C. are set out in Table 1 below:

TABLE 1

| Sample* | Relative Speed | Dmax | Gamma | Dmin |
|---|---|---|---|---|
| A-coupler-loaded latex product | 257 | 2.84 | 3.16 | 0.05 |
| A-control | 282 | 2.97 | 3.13 | 0.05 |
| B-coupler-loaded latex product | 69 | 1.42 | 2.33 | 0.05 |
| B-control | 46 | 1.15 | 1.13 | 0.05 |
| C-coupler-loaded latex product | 80 | 1.77 | 3.13 | 0.05 |
| C-control | 76 | 1.67 | 2.93 | 0.05 |

*Color development sequence and solutions used are given below.

| | |
|---|---|
| Color Development Sequence | |
| Prebath | 10 seconds |
| Rinse | 10 seconds |
| Developer | 8 minutes |
| Rinse | 10 seconds |
| Fix | 2 minutes |
| Wash | 1 minute |
| Bleach | 6 minutes |
| Wash | 2 minutes |
| Solution Make-Up For Color Development | |
| Prebath | |
| Water | 800.0 ml |
| Borax ($Na_2B_4O_7 \cdot 10H_2O$*) | 20.0 grams |
| Sodium sulfate, desiccated | 100.0 grams |
| Sodium hydroxide, cold 10% solution | 10.0 ml |
| Water to make | 1.0 liter |
| pH (21° C.), 9.30 ± 0.1 | |
| Specific gravity (21° C.), 1.096 ± 0.004 | |
| Color Developer | |

TABLE 1-continued

| | |
|---|---|
| Water, about 70-75° F. (21-24° C.) | 800.0 ml |
| Sodium hexametaphosphate | 2.0 grams |
| Sodium sulfite, desiccated | 4.0 grams |
| 2-amino-5-diethylamino-toluene monohydrochloride | 3.0 grams |
| Sodium carbonate, monohydrated | 20.0 grams |
| Potassium bromide | 2.0 grams |
| or Sodium bromide | 1.7 grams |
| Water to make | 1.0 liter |
| pH (21° C.) 10.63 ± 0.05 | |
| Specific gravity (21° C.), 1.023 ± 0.003 | |
| Fixing Bath | |
| Water, about 125° F. (50° C.) | 600.0 ml |
| Sodium thiosulfate (hypo) | 240.0 grams |
| Sodium sulfite, desiccated | 15.0 grams |
| Acetic acid, glacial | 13.4 ml |
| Boric acid, crystals | 7.5 grams |
| Potassium alum | 15.0 grams |
| Water to make | 1.0 liter |
| pH (21° C.), 4.25 ± 0.25 | |
| Specific gravity (21° C.), 1.150 ± 0.005 | |
| Bleach Bath | |
| Water, about 70° F. (21° C.) | 800.0 ml |
| Potassium bromide | 20.0 grams |
| or Sodium bromide | 17.0 grams |
| Potassium Dichromate | 5.0 grams |
| Potassium alum | 40.0 grams |
| Water to make | 1.0 liter |
| (Adjust pH to 3.1 ± 0.20 (21° C.) with 10% sodium hydroxide solution or 7N sulfuric acid) | |
| Specific gravity (21° C.), 1.036 ± 0.003 | |

E. Results from developing another sample of the same elements tested under part "D" above, which were exposed via the use of a cobalt hexammine amplifier-developer in accordance with the disclosure of Travis in U.S. Pat. No. 3,765,891, are set out in Table 2 below.

TABLE 2

| Sample Tested | Relative Speed | Dmax | Gamma | Dmin |
|---|---|---|---|---|
| A-coupler-loaded latex product | 525 | 3.46 | 4.56 | 0.08 |
| A-control | 562 | 3.56 | 4.42 | 0.11 |
| B-coupler-loaded latex product | 795 | 1.47 | 1.63 | 0.08 |
| B-control | 832 | 1.33 | 1.30 | 0.08 |
| C-coupler-loaded latex product | 1107 | 1.80 | 1.50 | 0.08 |
| C-control | 1123 | 1.74 | 1.90 | 0.08 |

Note that in these Examples, the coupler-loaded latex compositions of this invention were dispersed in the photographic emulsions described above without the aid of high energy milling and without the necessity for a long, time consuming incorporation and dispersion procedure of any kind, but that results shown in Tables 1 and 2 indicate that products made by the present invention are acceptable and comparable to conventional color photographic products.

One apparently unique property which has been observed with respect to the coupler-loaded latex composition aspect of this invention relates to the surprising availability of the coupler for reaction with oxidized color developer during color development. For some reason which has not yet been ascertained, color-forming couplers are reactive with color developers to a surprising extent without the need for a special solvent (such as coupler solvent or benzyl alcohol) when the couplers are incorporated into photographic elements in the form of loaded latex compositions, in accordance with the present invention. Also, when the present invention is practiced with couplers as described above, considerably more uniform distribution of the couplers through the gelatin layers is obtained than can ordinarily be obtained using conventional coupler dispersion techniques. Consequently, after color development, the resulting dyes are more uniformly distributed through their respective layers in the finished colored photographic elements.

F. A representative sampling of the loaded polymeric latex compositions of Example 4 were photographically examined and found to produce results consistent with those described above.

In the following several examples, the present invention is illustrated with respect to an embodiment of this invention that shall be referred to as RDR-loaded latexes, wherein RDR symbolizes one or more redox dye-releaser hydrophobes loaded into the polymer particles of a loaded polymeric latex composition formed by my process. It is known that redox dye-releasers are compounds which can be oxidized by oxidized developing agents. For example, they can be cross-oxidized to provide a species which, as a function of oxidation, will release a diffusible dye such as by alkaline hydrolysis. Such redox dye-releasers are described in U.S. Pat. No. 3,725,062 of Anderson and Lum, issued Apr. 3, 1973; U.S. Pat. No. 3,698,897 of Gompf and Lum, issued Oct. 17, 1972; U.S. Pat. No. 3,628,952 of Puschel et al, issued Dec. 21, 1971; and Landholm et al U.S. Pat. Nos. 3,929,760 and 3,942,987, issued Dec. 30, 1975 and Mar. 9, 1976, respectively; and the following copending applications: Ser. Nos. 331,727 and 331,729 of Landholm et al filed Feb. 12, 1973, now abandoned; Ser. No. 331,728 of Haase et al filed Feb. 12, 1973, now abandoned; and Ser. Nos. 439,815 and 439,816 of Haase et al filed Feb. 4, 1974, abandoned and issued as U.S. Pat. No. 3,931,144 on Jan. 6, 1976, respectively. They are also disclosed in the Hinshaw et al patent application and the Fleckenstein et al published patent application cited above in the discussion of dye image-forming materials, of which redox dye-releasers are one species.

RDR-loaded latex compositions can be manufactured using a manipulative procedure like that set out in Example 1, wherein an appropriate water-miscible organic solvent medium is used, the particular solvent(s) depending upon the solubility characteristics of the particular hydrophobic RDR compound(s) selected (usually for incorporation into a hydrophilic colloid layer in the manufacture of a photographic element).

EXAMPLE 5

In this Example, the preparation of a hydrophobic RDR-loaded latex composition is illustrated, along with its use in the manufacture of a photographic element. The element prepared using the RDR-loaded latex composition is compared with an otherwise identical element made using the RDR compound conventionally incorporated into the element by conventional coupler solvent techniques.

A. Manufacture of RDR-loaded Latex Composition

Twelve grams of RDR compound were dissolved in 240 ml tetrahydrofuran by stirring them together at room temperature. Then, with continued moderate stirring, 150 grams of a loadable polymeric latex were gradually blended into the resulting solution. The resulting loaded polymeric latex composition of solvent and RDR-loaded latex were then placed into a rotary evaporator. Under vacuum at 50° C., all but about 1 weight percent of the tetrahydrofuran was then removed. The resulting composition was filtered through Reeve Angel Grade 230 filter paper. The filtrate (dispersion of RDR-loaded latex particles) was made up to 200 grams total weight and 34 grams of a solution of gelatin in water (35 percent by weight gelatin, based on total weight) (50° C.) were blended into it. The resulting stabilized loaded latex composition was then chill set and refrigerated until it was used as a component in a coating composition.

B. Photographic Element

Details relating to quantities of materials and the like in the various layers of a dye image transfer photographic element having the following layer arrangement can be found in Fleckenstein et al published U.S. patent application Ser. No. B351,673, cited above:

| | |
|---|---|
| (a) | TRANSPARENT EMULSION COVER SHEET |
| (b) | GELATIN OVERCOAT LAYER |
| (c) | RED SENSITIVE EMULSION |
| (d) | RDR-LOADED LATEX COMPOSITION |
| (e) | CARBON + GELATIN |
| (f) | $TiO_2$ + GELATIN |
| (g) | MORDANT + GELATIN |
| (h) | TRANSPARENT POLY(ETHYLENE TEREPHTHALATE) SUPPORT |

In layer (d) was coated the stabilizer RDR-loaded composition made in accordance with part A of this Example, wherein the RDR compound was the cyan dye-releasing redox compound, N-[4-(2,4-di-tert-pentylphenoxy)butyl]-1-hydroxy-4[3-[5-hydroxy-6-(2-methylsulfonyl-4-nitrophenylazo)-1-naphthylsulfamoyl]benzenesulfonamido]-2-naphthamide, and the loadable latex was a copolymer latex made by free radical emulsion polymerizing 85 parts of n-butyl acrylate, 10 parts of sodium 3-methacryloyloxpropane-1-sulfonate and 5 parts of 2-acetoacetoxyethyl methacrylate. In the stabilized RDR-loaded latex composition which was coated to form layer (d) of the element, the weight ratio of RDR compound to latex polymer to gelatin was such that the resulting layer contained 0.54 g RDR compound, 0.54 g latex copolymer and 1.08 g gelatin per square meter.

C. Control Manufacture

An element like that described under B of this Example was prepared so that it was substantially identical to that prepared above with the exception that, rather than an RDR-loaded latex composition, a conventional organic coupler solvent/gelatin dispersion was used to make layer (d) following a dispersion procedure similar to that of Example 3, paragraph D, with gel and RDR levels being the same as that described under B of this Example. The solvent was 1,4-cyclohexylenedimethylene bis(2-ethylhexanoate) at a level of 0.27 $g/m^2$ in the layer.

D. Comparative Test

Each of the elements from B and C of this Example was exposed (1/100 sec.) to a tungsten light source through the transparent cover sheet and a graduated density test object filtered for red light. A conventional viscous alkaline processing composition containing carbon as an opacifier and 4-hydroxymethyl-4-methyl-1-phenyl-3-pyrazolidone as a developing agent was spread from a pod between the gelatin overcoat layer (b) and the transparent cover sheet (a) at about 22° C. by passing the pod followed by the photographic element between a pair of juxtaposed rollers so that the layer of liquid processing solution was 127 microns thick. Upon development, the resulting cyan test image in the mordant (layer g) yielded the following sensitometric data:

| | Relative* Speed | Contrast | Dmin | Dmax |
|---|---|---|---|---|
| Example 5 | 110 | 1.39 | 0.20 | 1.91 |
| Control | 100 | 1.42 | 0.22 | 1.96 |

*Measured at 1.0 above Dmin.

Note that almost identical sensitometric results were obtained.

EXAMPLE 6

Example 5 were repeated, except that the RDR, latex copolymer and gelatin proportions were varied as follows: 0.54 $g/m^2$ RDR: 1.34 $g/m^2$ copolymer: 0.74 $g/m^2$ gelatin. A control element was prepared using the same ratios of RDR, copolymer and gelatin as in the photographic element of this Example. The control was prepared otherwise identically as in Example 5, except that in this instance no coupler solvent was employed.

Upon exposure and processing of the photographic element of Example 6 and its control the following sensitometric results were obtained:

| | Relative* Speed | Contrast | Dmin | Dmax |
|---|---|---|---|---|
| Example 6 | 182 | 1.55 | 0.21 | 1.18 |
| Control | 100 | 2.02 | 0.21 | 2.00 |

*Measured at 1.0 above Dmin.

Note that the RDR containing photographic element formed according to my process in this Example exhibited a significantly lower Dmax and contrast than the control while exhibiting a higher relative speed. Dmin was unaffected.

EXAMPLE 7

During the assembly of integral-negative-receiver elements of the dye image transfer type such as described in Landholm U.S. Ser. No. 331,727 and U.S. Pat. Nos. 3,929,760 and 3,942,987, cited above, considerable pressure is exerted upon the individual layers, which can cause the bleeding of RDR compounds and/or other addenda out of the element at the borders; this phenomenon is referred to as "stress bleed." Example 7 compares the relative amount of "stress bleed" observed while using organic solvent-/gelatin dispersion of RDR compounds, no solvent-gelatin dispersions of RDR compounds, and latex dispersions of RDR compounds in a dye image transfer element capable of forming a multicolor image. The following coating format was employed for Example 7:

| Layer | |
|---|---|
| (a) | Transparent Emulsion Cover Sheet |
| (b) | Gelatin Overcoat Layer |
| (c) | Blue Sensitized Emulsion |
| (d) | Yellow RDR Cpd. 1(1.08 $g/m^2$) + Gelatin (2.29 $g/m^2$) |
| (e) | Gelatin + Scavenger Interlayer |
| (f) | Green Sensitized Emulsion |
| (g) | Magenta RDR Cpd. 1(0.97 $g/m^2$) + gelatin (1.06 $g/m^2$) |
| (h) | Gelatin + Scavenger Interlayer |
| (i) | Red Sensitized Emulsion |
| (j) | Cyan RDR Cpd. 1(0.54 $g/m^2$) + Gelatin (0.74 $g/m^2$) |
| (k) | Carbon + Gelatin Layer |
| (l) | $TiO_2$ + Gelatin Layer |
| (m) | Mordant + Gelatin Layer |
| (n) | Transparent Poly(Ethylene Terephthalate Support) |

Yellow RDR Compound 1

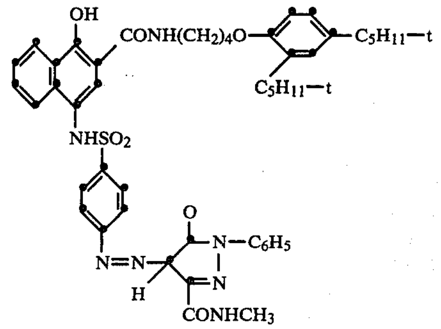

Magenta RDR Compound 1

4-[3-(4-acetamido-5-hydroxy-6-o-methoxyphenylazo-1-naphthalenesulfonamido)benzene sulfonamido]-N-[4-(2,4-di-t-pentylphenoxy)butyl]-1-hydroxy-2-naphthamide

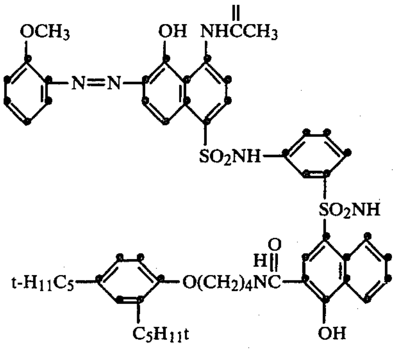

Cyan RDR Compound 1

N-[4-(2,4-Di-t-pentylphenoxy)butyl]-1-hydroxy-4-[3-5-hydroxy-6-[(2-methylsulfonyl-4-nitrophenylazo)-1-naphthylsulfamoyl]benzenesulfonamido]-2-naphthamide

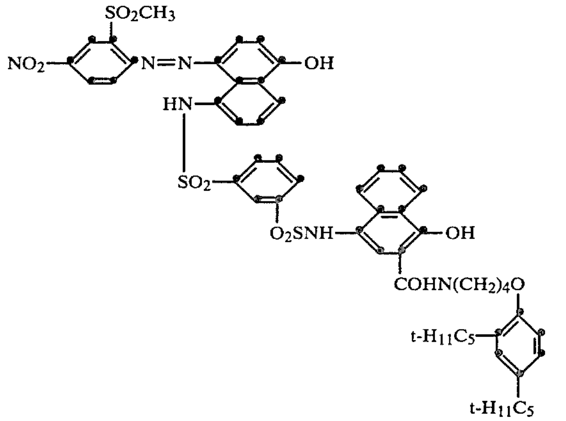

A First Control was prepared having the format indicated above with the RDR compound containing layers being formed by blending the RDR compound with the organic coupler solvent N,N-diethyllauramide following a dispersion procedure similar to that of Example 3, paragraph D. The Yellow RDR Compound 1-containing layer contained 2.15 g/$m^2$ of coupler solvent; the Cyan and Magenta RDR Compound 1-containing layer each contained 0.48 g/$m^2$ of coupler solvent.

A Second Control was prepared identically as the First Control, but with the coupler solvent being omitted.

The element of Example 7 was prepared identical to the above First and Second Controls, except that the RDR compounds were loaded into a latex according to the procedure of Example 5. The latex copolymer was present in the layer (d) in a concentration of 1.94 g/$m^2$; in the layer (g) in a concentration of 1.75 g/$m^2$ and in the layer (j) in a concentration of 0.97 g/$m^2$. The individual elements were identically edge sealed by compressive stress and held for 3 days at 60° C. and 70% relative humidity. Example 7 was the only element which did not exhibit stress bleed—i.e. diffusion of dyes and/or other addenda out of the package at the borders of the element. In the First and Second Controls severe bleeding of dye was observed.

EXAMPLE 8

The foregoing Example 7 illustrates the advantageous effect which elements formed by my process have on stress bleed of unexposed and unprocessed photographic elements. In this Example the effect of my process on stress bleed after exposure and processing is illustrated.

The general configuration and content of the photographic element of this Example was identical to that of Example 7, except that Yellow RDR Compound 2 in a concentration of 0.86 g/$m^2$ was substituted for Yellow RDR Compound 1; Magenta RDR Compound 2 in a concentration of 0.54 g/$m^2$ was substituted for Magenta RDR Compound 1 and Cyan RDR Compound 2, which corresponds to the cyan RDR compound of Example 5, in a concentration of 0.54 g/$m^2$ was substituted for Cyan RDR Compound 1.

Yellow RDR Compound 2

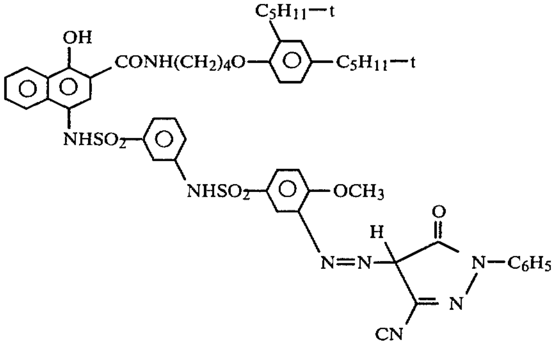

Magenta RDR Compound 2

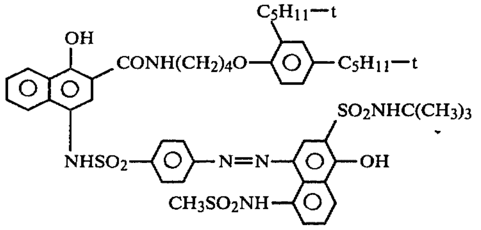

A First Control element was prepared in which the RDR containing layers were prepared using a organic coupler solvent according to the procedure for preparing the Control of Example 5.

The element of Example 8 was prepared by the procedure for preparing the RDR containing layer of Example 5 wherein the RDR was loaded into the polymeric latex composition. In this instance the loadable polymer particles were formed by poly(n-butyl acrylate-co-2-acrylamido-2-methylpropanesulfonic acid-co-2-acetoacetoxyethyl methacrylate), wherein the monomers were present in a weight ratio of 85:10:5, based on starting materials.

The First Control and Example 8 elements were identically exposed and processed as in Example 5, but with the use of multicolor test object. The following differences in the minimum densities (ΔDmin) values were observed in the border areas of the elements

| | $\Delta D_R$ | $\Delta D_G$ | $\Delta D_B$ |
|---|---|---|---|
| First Control | +0.06 | +0.13 | +0.13 |
| Example 8 | +0.03 | +0.01 | +0.02 |

Note the significant reduction in stress bleeding after exposure and processing in the photographic element formed according to my process.

EXAMPLE 9

Compounds such as the potassium salt of 2-(sec-octadecyl-5-sulfohydroquinone), hereinafter designated Scavenger 1, are useful as antistain agents for color materials, as discussed, for example, in U.S. Pat. Nos. 2,701,197; 2,728,659 and 3,700,453. Unwanted dye stain is prevented by employing the hydroquinone to intercept and scavenge oxidized developing agent migrating from one color-forming unit to the next. In Examples 8 and 9, for example, each color-forming unit is made up of an emulsion layer and the RDR compound containing layer associated therewith. The hydroquinone is located in an interlayer, such as the interlayers (e) and (h) in Examples 7 and 8.

A First Control element was prepared identically as the First Control element in Example 8, except that N,N-diethyl lauamide was employed as the organic coupler solvent. In layers (e) and (h) 0.85 $g/m^2$ of gelatin and 0.54 $g/m^2$ of Scavenger 1 were blended according to conventional mixing procedures—see Example 3, paragraph D. In the element of Example 9 an identical element was prepared, except that Scavenger 1 was loaded into loadable polymer particles according to the procedures described in Example 5, paragraph A. The latex polymer was that set forth in Example 5, paragraph B.

The First Control and Example 9 elements were identically exposed to red light and processed as in Example 5. The following sensitometric results were obtained:

| | First Control | | | Example 9 | | |
|---|---|---|---|---|---|---|
| | Dmin | Dmax | *ΔD | Dmin | Dmax | *ΔD |
| Red Density | 0.44 | 2.00 | 1.56 | 0.44 | 2.00 | 1.56 |
| Green Density | 1.70 | 2.11 | 0.41 | 1.69 | 2.00 | 0.31 |

Note that for an equal increase in red density (1.56) for both elements, the First Control showed an additional increase in green density (0.41−0.31=0.10). This 0.10 increase in green density was due to the oxidized form of the developing agent passing through the interlayer into the magenta redox dye-releasing layer and causing the formation of non-imagewise exposure related magenta dye. The latex dispersion of the scavenger minimizes wandering of oxidized developer. Similar results were obtained with latex dispersions of 2,5-di-sec-dodecylhydroquinone and 3,5-di-tert-octylhydroquinone.

EXAMPLE 10

Example 9 was repeated, but with the 2-(sec-octadecyl-5-sulfohydroquinone), potassium salt being introduced into the emulsion layers(c), (f) and (i). In this instance the hydroquinone acted as a supplemental developing agent and accelerated development of the exposed element during processing.

EXAMPLE 11

In addition to being more readily and uniformly dispersible through hydrophilic colloid coating layers in the form of hydrophobe-loaded latex, some of the hydrophobic materials exhibit unexpected capabilities when they are incorporated into layers in this form. An example of such unexpected capabilities is illustrated in the following Example, with respect to the ultraviolet absorbing compounds described and claimed in U.S. Patent Application Ser. No. 506,913, filed Sept. 17, 1974 by Heseltine and Weber and entitled "Novel UV Absorbing Compounds and Photographic Elements Containing UV Absorbing Compounds". Note that in this instance, the use of a UV absorber-loaded latex composition in accordance with this invention resulted in surprisingly high optical densities and an unexpected, valuable sharp "cut-off" at about 415 nm.

A. A UV absorber-loaded latex composition was prepared by first dissolving 40 g. of 3-dihexylaminoallylidene malononitrile in 400 cc of acetone, and then gradually stirring into the resulting solution 1320 g of aqueous latex, poly(n-butyl methacrylate-co-2-acrylamido-2-methylpropane sulfonic acid-co-2-acetoacetoxyethyl methacrylate) (85:10:5) at 9.5% total solids. The acetone was then stripped from the resulting blend by treating it at 50° C. in vacuum for about 24 minutes. The resulting latex composition was then blended into an aqueous gelatin solution, coated onto a transparent photographic support and dried. Coverages of gelatin and UV absorber in the resulting coating are set out in Table 3, below.

B. For comparison, an equivalent amount of the same UV absorber used in part A of this Example was dispersed into a gelatin solution by means of a colloid mill. The UV absorber is liquid at room temperature. Amounts of gel and UV absorber were used to yield the same coverages in the resulting coated layer as that made according to part A of this Example. This comparison is labeled "no solvent/gelatin" in Table 3, below.

C. In another comparative experiment, the same UV absorbing compound used in parts A and B of this Example was first dissolved in an equal volume of di-n-butyl phthalate high boiling solvent. Then the resulting solution was dispersed in an aqueous gelatin solution using a colloid mill in the conventional manner. Coatings of the resulting dispersion on the transparent photographic support were made to yield dried coverages as set out in Table 3, below.

TABLE 3

| Test No. | Gelatin $g/m^2$ | UV absorber $g/m^2$ | Optical Densities 370 nm | 415 nm |
|---|---|---|---|---|
| Control | 0.54 | 0 | 0.08 | 0.05 |
| Part B* | 0.54 | 0.20 | 1.16 | 0.55 |
| Part C** | 0.54 | 0.20 | 1.60 | 0.42 |
| Part A*** | 0.54 | 0.20 | 3.00 | 0.11 |

*Coating from Part B of this Example. No high boiling solvent. No loaded latex composition.
**Coating from Part C of this Example. UV absorber dissolved in high boiling solvent.
***Coating from Part A of this Example. UV absorber-loaded latex composition.

These data demonstrate that "loaded latex compositions" which are charged with a UV absorber can yield unexpected and valuable results, including unexpectedly high levels of ultraviolet light absorbancy and surprisingly sharp "cut off" of absorption in the visible region of the spectrum.

EXAMPLE 12

In this Example the manufacture of a photographic element incorporating a filter dye by the process of this invention is demonstrated.

Using the conventional layer format described in British Pat. No. 923,045 and U.S. Pat. No. 3,046,129 (Graham and Sagal), color photographic elements were prepared in which a filter compound was present, dispersed in a gelatin layer between the blue sensitive layer and a fast green-sensitized layer. The color-forming layers of these elements contained conventional incorporated couplers. Except for the filter layer, all of the test elements of this Example were substantially the same. In one control element, Carey-Lea colloidal silver was dispersed. In a second element, a conventional mordanted filter dye was dispersed. In a third element, a filter dye-loaded latex (ca. 35% filter dye) composition was dispersed. Data relating to coverages of materials in the filter layer appear in the following Table. Identification of the various materials used in the filter layer appear immediately following the Table.

TABLE 4

Evaluation of Filter Dyes

| Element | Gelatin* | Carey-Lea* Silver | Dye I* | Mordant* | Dye II* | Latex* | Rel.** Blue Speed | D-max |
|---|---|---|---|---|---|---|---|---|
| A. | 0.98 | 0.054 | — | — | — | — | 100 | 428 |
| B. | 0.98 | — | 0.074 | 0.086 | — | — | 73 | 448 |
| C. | 0.98 | — | — | — | 0.086 | 0.26 | 82 | 450 |

*coverage in g/m$^2$.
Blue speed measured at 1.0 above Dmin.
Dye I - 4-[(3-ethyl-2-benzoxazolyidene)ethylidene]-3-methyl-1-(p-sulfophenyl)-2-pyrazolin-5-one, monosulfonated - U.S. Pat. No. 3,282,699
Dye II - p-diethylamino-2-(4-hexenesulfonylaminobenzoyl)-cinnamonitrile
Mordant - poly(alpha-methylallyl-N-guanidylketimine) - U.S. Pat. No. 3,282,699
Latex - poly(n-butylmethacrylate-co-2-acrylamido-2-methyl-propanesulfonic acid-co-2-acetoacetoxyethylmethacrylate (85:10:5)

The filter dye-loaded latex composition used in this test was prepared by (a) diluting 9.5 g of latex (15.2% solids) with 55 ml. water, (b) then gradually (over about a minute) blending the dilute latex into a solution of 0.48 g. of the filter dye dissolved in 50 ml. tetrahydrofuran, (c) using a rotary evaporator at 40° C., removing the tetrahydrofuran, and (d) then blending into the resulting loaded latex composition 267 ml. of aqueous 2.5% gelatin and 5.3 ml. of saponin (15% in water).

In order to obtain the "relative blue speed" figures for the above Table, the dried elements were exposed for 1/100 second to a 500 watt tungsten lamp which had been adjusted to a color temperature of 3200° K. The exposed elements were then subjected to a conventional reversal color process like that described in U.S. Pat. No. 3,046,149.

The results of this Example demonstrate that filter dye-loaded latex compositions, prepared in accordance with the process aspect of this invention can be used advantageously as a replacement for Carey-Lea silver as a filter for blue light in photographic elements. Note that significantly less desensitization of the blue sensitive emulsion layer occurred when the loaded latex composition of this invention was used, as compared with the use of a conventional mordanted filter dye.

EXAMPLE 13

In this Example the use of a loaded latex composition wherein the latex particles are loaded with a photographic sensitizing dye is illustrated.

A. Control-Dye Dissolved in Methanol for Dispersion

A photographic material suitable for alkaline vapor processing was prepared by coating a layer comprising (a) a conventional sulfur, gold and reduction sensitized silver bromide emulsion, (b) a spectral sensitizing dye, anhydro-3,9-diethyl-5,5'-dimethoxy-3'-(3-sulfopropyl)thiacarbocyanine hydroxide dissolved in methanol, (c) ascorbic acid, (d) an antifoggant, 4-hydroxy-6-methyl-1,3,3a,7-tetraazaindene, (e) an image stabilizer precursor, 3-s-thiuronium-1-methylpropane sulfonate, (f) an incorporated developer 1,2,3,4-tetrahydro-1,4-methanonaphthalene-5,8-diol and (g) a hardener, bis(vinylsulfonylmethyl) ether at 27.98 mg silver/dm$^2$ and 96.84 mg gelatin/dm$^2$ on a poly(ethylene terephthalate) film support. The material was exposed for 30 seconds to tungsten light (500 W, 3000° K.), subjected to methylamine vapors for 30 seconds and washed for 5 minutes with distilled water. The sensitometric results are shown below.

B. Sensitizing Dye Disposed Via a Loaded Latex Composition

1. Preparation of Dye-Loaded Latex Composition

The following ingredients were used in this part of this Example:

(a) 350 mg of the same sensitizing dye used in part A of this Example, (b) 350 ml methyl alcohol, (c) 17 ml water, (d) 175 ml of a 10.3% solids, loadable latex consisting of water and copoly(n-butyl acrylate-co-3-methacryloyloxypropane-1-sulfonic acid, Na salt-co-acetoacetoxyethyl methacrylate) (85/10/5), and (e) 17.5 ml of a 10 weight percent solution of gelatin in water.

Initially, (d) was gradually stirred into a solution of (a) dissolved in a mixture of (b) plus (c). After (e) was stirred into the resulting compatible blend, the resulting stabilized loaded latex composition was then subjected to a vacuum stripping step in a conventional laboratory scale rotary evaporator to remove substantially all the methyl alcohol. The vacuum stripped product was then incorporated into an emulsion otherwise just like that of part A of this Example. The resulting emulsion was coated as in part A on a polyester film support and dried down in a conventional manner to form a photosensitive element. This element was subjected to the same test as was that of part A of this Example.

C. Test Data and Results

The elements of parts A and B of this Example were exposed, processed and washed as in Example 4, above. Some of the sensitometric properties of the processed films were:

| Sample | Relative Speed | Gamma | Dmin |
|---|---|---|---|
| A-contol | 100 | 6.80 | 0.06 |
| B-loaded latex product | 100 | 6.47 | 0.06 |

These results demonstrate that, surprisingly, the latex compositions of this invention loaded with a sensitizing dye can function well in a photographic element and can be used in place of an alcohol solution of the sensitizing dye as an effective means for dispersing such dye through a photographic silver halide emulsion layer. The present method is advantageous in that it makes it possible to remove the alcohol prior to the time the sensitizing dye is dispersed into a photographic emulsion layer. With certain sensitizing dyes, this advantage more pronounced than others, depending upon the relative solubility of the dye in the alcohol.

EXAMPLE 14

In this Example, the use of the present process to prepare pesticide-loaded latex compositions is illustrated.

A. Methyl Parathion

Fifteen grams of commercial methyl parathion (80% methyl parathion+20% xylene) were dissolved in 150 ml. acetone. Into this solution, at room temperature, were gradually blended, with continuous stirring, 200 grams of a dilute latex which was prepared by diluting 66 grams of an 18.25% solid loadable polymeric latex with enough water to produce 200 grams of dilute latex. The loadable polymeric latex had been prepared by polymerizing a mixture of 50 parts by weight of n-butyl methacrylate, 40 parts by weight of styrene and 10 parts by weight of 2-acrylamido-2-methyl propane sulfonic acid in accordance with the above-described procedure.

The resulting loaded latex/solvent mixture was then placed in a 2000 ml. flask, in which it was subjected to evacuation for 15 minutes at about 50° C. to remove acetone. The resulting methyl parathion-loaded latex composition was then filtered (no residue was observed) to yield a homogeneous dispersion which was stable and did not visibly settle spontaneously (upon storage at room temperature) for many weeks. The product contained particles which apparently contained polymer and pesticide in a weight ratio of about 1:1.

B. Parathion

Part A, above was repeated, using the following materials:

| | |
|---|---|
| parathion | 7.1 g |
| acetone | 150 ml |
| 18% solids latex | 45 g |
| water (for latex) | 108 ml |

The resulting loaded latex had a polymer to pesticide weight ratio of about 8 to 7, respectively. By weight, the parathion content of the loaded latex product was 5.5%. This product could be readily diluted with water for conventional spray application to agricultural plants.

EXAMPLE 15

In this example, the use of the present process to prepare fluor-loaded latex compositions is illustrated. The "fluor" is a blend of two hydrophobic materials which, cooperatively, serve as aids for "scintillation counting". Scintillation counting is useful in the detection and measurement of relatively low levels of radioactivity, and finds application in the field of radioactive tracing. In this example, the "fluor composition" is a blend of 2,5-diphenyloxazole (PPO) and 2,2'-p-phenylenebis(5-phenyloxazole) (POPOP). Both of these materials are hydrophobic.

Three grams of PPO fluor and 15 mg. of POPOP fluor were dissolved in 90 ml. tetrahydrofuran. Then, at room temperature, 90 g. poly(n-butyl methacrylate-co-styrene-co-2-acrylamido-2-methyl-propane sulfonic acid) (50:40:10) aqueous latex containing 9 g. of polymer, was blended slowly into the solution of fluor dissolved in tetrahydrofuran. Then the solvent was removed by evaporation in a conventional rotary evaporator. After filtration, 25 g. of a 10% gelatin solution was blended into the fluor-loaded latex composition. The final gel stabilized composition contained 3% PPO, $1.5\times10^{-2}$% POPOP, 9% polymer and 2.5% gelatin.

This composition was coated at a coverage of 10 ml./100 $cm^2$ on a conventional transparent subbed poly(ethylene terephthalate) photographic support and then dried. Three strips (2"×½") were cut from the resulting dried scintillation counting element and treated with (a) 0.01 ml. benzoic acid-$^3H$ solution in water, (b) 0.01 ml. benzoic acid-$^3H$ solution in p-dioxane, and (c) 0.01 ml. benzoic acid-$^{14}C$ in water, respectively. (Each solution was equivalent to approximately 22,000 disintegrations per minute). The strips were dried, mounted in 20 ml. glass counting vials and counted at 12° C. in a Packard Tri-Carb Liquid Scintillation Counter, Model 3380. The strips were aligned normal to the axis of the two photomultiplier tubes. "Counting efficiency" was determined by comparing the detected emission with the theoretical disintegrations in a given period of time. Results of these tests are set out in the following Table:

TABLE

| Sample | Material Measured | Counting Efficiency |
|---|---|---|
| a | $^3H$ benzoic acid ($H_2O$) | 31.8% |
| b | $^3H$ benzoic acid (p-dioxane) | 25.6% |
| c | $^{14}C$ benzoic acid ($H_2O$) | 89.5% |

These counting efficiencies are considered to be unusually high for solid scintillation counting compositions or elements. The high counting efficiency is believed at least partly due to the fact that the fluor is distributed uniformly and in the form of a loaded latex. Such fluor compositions are described in greater detail in U.S. patent application Ser. No. 641,000, filed Dec. 15, 1975, entitled "Scintillation Counting Compositions and Elements" by Tsang J. Chen, Raymond S. Miller and Edmund S. Perry.

The invention has been described in detail with particular reference to preferred embodiments thereof, but, it will be understood that variations and modifications can be effected within the spirit and scope of the invention.

I claim:

1. A process of preparing a polymeric latex composition comprising (1) providing an aqueous latex consisting essentially of water as a continuous phase and from 0.1 to 20 percent by weight, based on total weight of the latex, of polymer particles of from 0.02 to 0.2 micron in average diameter as a dispersed phase, the polymer particles being chosen from among those which, at 25° C., (a) are capable of forming a latex with water at a polymer particle concentration of from 10 to 20 weight percent, based on total weight of the latex, (b) exhibit no observable coagulation of the polymer particles when 100 ml of the latex is then mixed with an equal volume of a water-miscible organic solvent, stirred and allowed to stand for 10 minutes, and (c) contain from 2 to 25 percent by weight repeating units derived from hydrophilic ethenic monomers having a molecular weight at most of about 300, the monomers being capable of forming water-soluble homopolymers, (2) providing a solution consisting essentially of a hydrophobe which is a hydrophobic pesticide having a solubility in distilled water at 25° C. of less than 0.5 percent, based on the weight of the water, dissolved in the water-miscible organic solvent in a concentration of from 0.1 to 20 percent by weight, based on total weight of the solution, wherein the water-miscible organic solvent is selected from those which can be dissolved in distilled water at 20° C. to the extent of at least about 20 parts by volume in 80 parts by volume of water, having boiling points above about −10° C., do not detrimentally react with aqueous latexes containing the polymer particles and do not dissolve more than about 5 weight percent of the polymer particles at 20° C., (3) gradually adding the aqueous latex to the solution of the hydrophobe and the water-miscible organic solvent employing a volume ratio of the aqueous latex to the solution of the hydrophobe and the water-miscible organic solvent of from 1:4 to 4:1 and a weight ratio of hydrophobe to the polymer particles of from 1:40 to 3:1 while retaining the hydrophobe in solution and the polymer particles dispersed so that (a) the hydrophobe and the polymer particles are brought into intimate association and (b) the water-miscible organic solvent is diluted with water to reduce the solubility of the hydrophobe in the resulting continuous phase and thereby drive the equilibrium distribution of the hydrophobe away from the resulting continuous phase toward the polymer particles of the dispersed phase, with the result being the loading of the dissolved hydrophobe into the polymer particles.

2. A process of preparing a polymeric latex composition according to claim 1 wherein the aqueous latex and the water-miscible organic solvent containing the hydrophobe are blended in a volume ratio of from 1:2 to 2:1.

3. A process of preparing a polymeric latex composition according to claim 1 wherein the polymer particles are present in the aqueous latex in a concentration of greater than 2 percent by weight, based on total weight.

4. A process of preparing a polymeric latex composition according to claim 3 wherein the polymer particles are present in the aqueous latex in a concentration of from 10 to 20 percent by weight, based on total weight.

5. A process of preparing a polymeric latex composition according to claim 1 wherein the volume per second of the aqueous latex added is less than 20 percent of the initial volume of the water-miscible organic solvent containing hydrophobe dissolved therein.

6. A process of preparing a polymeric latex composition according to claim 5 wherein the volume per second of the aqueous latex blended is less than 10 percent of the initial volume of the water-miscible organic solvent containing hydrophobe dissolved therein.

7. A process of preparing a polymeric latex composition according to claim 1 including the additional step of adding water to the polymeric latex composition to reduce further the solubility of the hydrophobe in the resulting continuous phase and thereby further drive the equilibrium distribution of the hydrophobe away from the resulting continuous phase toward the polymer particles of the dispersed phase, so that additional loading of the polymer particles with the hydrophobe is achieved.

8. A process of preparing a polymeric latex composition according to claim 7 wherein the aqueous latex and the added water together are blended with the water-miscible organic solvent containing the hydrophobe in a volume ratio of latex and added water to organic solvent of less than 4:1.

9. A process of preparing a polymeric latex composition according to claim 1 wherein at least about half of the water-miscible organic solvent is removed from the polymeric latex composition so that the equilibrium distribution of the hydrophobe is driven further away from the resulting continuous phase toward the polymer particles, thereby further increasing the loading of the hydrophobe within the polymer particles.

10. A process of preparing a polymeric latex composition according to claim 1 wherein the water-miscible organic solvent is chosen from the class consisting of water soluble alcohols, ketones and amides, tetrahydrofuran, N-methyl-2-pyrrolidone, dimethyl sulfoxide and mixtures thereof.

11. A process of preparing a polymeric latex composition according to claim 1 wherein the polymer particles have an average diameter in the range of from 0.02 to 0.08 micron.

12. A process of preparing a polymeric latex composition comprising (1) providing an aqueous latex consisting essentially of water as a continuous phase and from 0.1 to 20 percent by weight, based on total weight of the latex, of polymer particles of from 0.02 to 0.2 micron in average diameter as a dispersed phase, the polymer consisting essentially of (a) repeating units forming from 60 to 95 percent by weight of the polymer derived from at least one of (i) ethenic monomers of the formula

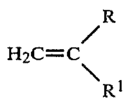

where

R is hydrogen, halogen or vinyl and $R^1$ is hydrogen, halogen or methyl or, when R is hydrogen, cyano;

(ii) styrene-type monomers of the formula

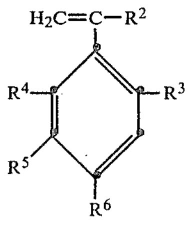

where $R^2$ is hydrogen or methyl, $R^3$, $R^4$ and $R^6$ are hydrogen or lower alkyl of from 1 to 5 carbon atoms, $R^5$ is hydrogen or with $R^4$ constitutes the atoms necessary to complete a fused benzene ring or one of $R^5$ and $R^6$ is halomethyl;

(iii) esters of 2-alkenoic acids having the formula

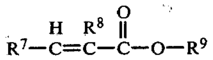

where $R^7$ is hydrogen or lower alkyl of from 1 to 5 carbon atoms, $R^8$ is hydrogen, chlorine or lower alkyl of from 1 to 5 carbon atoms and $R^9$ is alkyl or haloalkyl having from 1 to 20 carbon atoms, and (iv) vinyl acetate;

(b) repeating units forming from 5 to 25 percent by weight of the polymer derived from a hydrophilic ethenic monomer having a molecular weight of at most 300 of the formula

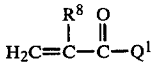

where $R^8$ is as defined above, $Q^1$ is —OM or a divalent organic radical which together with the carbonyl group of the formula forms an ester or amido linking group terminating in an ammonium or —$SO_3M$ solubilizing group and M is hydrogen, ammonium or alkali metal;

(c) repeating units forming from 0 to 10 percent by weight of the polymer derived from active methylene containing ethenic monomer exhibiting the formula

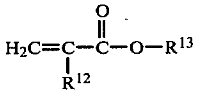

where $R^{12}$ is hydrogen, alkyl having from 1 to 12 carbon atoms or

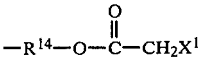

$R^{13}$ is alkyl having from 1 to 10 carbon atoms, cycloalkyl having from 3 to 10 carbon atoms, phenyl or

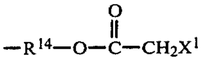

$R^{14}$ is alkylene having from 1 to 10 carbon atoms and $X^1$ is cyano or alkylcarbonyl having from 1 to 8 carbon atoms, provided that one and only one of $R^{12}$ and $R^{13}$ is always

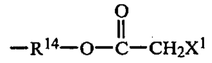

(d) repeating units forming from 0 to 3 percent by weight of the polymer derived from a crosslinking monomer having a molecular weight of at most about 300 and having at least two independently polymerizable vinyl groups;

(2) providing a solution consisting essentially of a hydrophobic pesticide having a solubility in distilled water at 25° C. of less than 0.5 percent, based on the weight of the water, dissolved in a water-miscible organic solvent in a concentration of from 0.1 to 20 percent by weight, based on total weight of the solution, wherein the water-miscible organic solvent is selected from those which can be dissolved in distilled water at 20° C. to the extent of at least about 20 parts by volume in 80 parts by volume of water, having boiling points above about −10° C., do not detrimentally react with aqueous latexes containing the polymer particles and do not dissolve more than about 5 weight percent of the polymer particles at 20° C., and (3) gradually adding the aqueous latex to the solution of the hydrophobe and the water-miscible organic solvent employing a volume ratio of the aqueous latex to the solution of the hydrophobe and the water-miscible organic solvent of from 1:4 to 4:1 and a weight ratio of hydrophobe to the polymer particles of from 1:40 to 3:1 while retaining the hydrophobe in solution and the polymer particles dispersed so that (a) the hydrophobe and the polymer particles are brought into intimate association and (b) the water-miscible organic solvent is diluted with water to reduce the solubility of the hydrophobe in the resulting continuous phase and thereby drive the equilibrium distribution of the hydrophobe away from the resulting continuous phase toward the polymer particles of the dispersed phase, with the result being the loading of the dissolved hydrophobe into the polymer particles.

13. A process of preparing a polymeric latex composition comprising (1) providing an aqueous latex consisting essentially of water as a continuous phase and from 0.1 to 20 percent by weight, based on total weight of the latex, of polymer particles of from 0.02 to 0.2 micron in average diameter as a dispersed phase, the polymer particles being chosen from among those which, at 25° C., (a) are capable of forming a latex with water at a polymer particle concentration of from 10 to 20 weight percent, based on total weight of the latex, (b) exhibit no observable coagulation of the polymer particles when 100 ml of the latex is then mixed with an equal volume of a water-miscible organic solvent, stirred and allowed to stand for 10 minutes, and (c) contain from 2 to 25 percent by weight repeating units derived from hydrophilic ethenic monomers having a molecular weight at most of about 300, the monomers being capable of forming water-soluble homopolymers, (2) providing a solution consisting essentially of a hydrophobe which is methyl parathion having a solubility in distilled water at 25° C. of less than 0.5 percent, based on the weight of the water, dissolved in the water-miscible organic solvent in a concentration of from 0.1 to 20 percent by weight, based on total weight of the solution, wherein the water-miscible organic solvent is selected from those which can be dissolved in distilled water at 20° C. to the extent of at least about 20 parts by volume in 80 parts by volume of water, having boiling points above about −10° C., do not detrimentally react with aqueous latexes containing the polymer particles and do not dissolve more than about 5 weight percent of the polymer particles at 20° C., (3) gradually adding the aqueous latex to the solution of the hydrophobe and the water-miscible organic solvent employing a volume ratio of the aqueous latex to the solution of the hydrophobe and the water-miscible organic solvent of from 1:4 to 4:1 and a weight ratio of hydrophobe to the polymer particles of from 1:40 to 3:1 while retaining the hydrophobe in solution and the polymer particles dispersed so that (a) the hydrophobe and the polymer particles are brought into intimate association and (b) the water-miscible organic solvent is diluted with water to reduce the solubility of the hydrophobe in the resulting continuous phase and thereby drive the equilibrium distribution of the hydrophobe away from the resulting continuous phase toward the polymer particles of the dispersed phase, with the result being the loading of the dissolved hydrophobe into the polymer particles.

* * * * *